US012627046B2

(12) United States Patent
Wang et al.

(10) Patent No.: US 12,627,046 B2
(45) Date of Patent: May 12, 2026

(54) RADIO FREQUENCY APPARATUS, ANTENNA AND ELECTRONIC DEVICE

(71) Applicants: Beijing BOE Sensor Technology Co., Ltd., Beijing (CN); BOE Technology Group Co., Ltd., Beijing (CN)

(72) Inventors: Yiming Wang, Beijing (CN); Xiaoqiang Yang, Beijing (CN); Feng Qu, Beijing (CN); Cuiwei Tang, Beijing (CN); Zhifeng Zhang, Beijing (CN); Wei Zhao, Beijing (CN); Lu Chen, Beijing (CN); Zixiang Lin, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 336 days.

(21) Appl. No.: 18/277,314

(22) PCT Filed: Nov. 14, 2022

(86) PCT No.: PCT/CN2022/131613

§ 371 (c)(1),
(2) Date: Aug. 15, 2023

(87) PCT Pub. No.: WO2024/103200

PCT Pub. Date: May 23, 2024

(65) Prior Publication Data

US 2025/0046994 A1 Feb. 6, 2025

(51) Int. Cl.
*H01Q 3/36* (2006.01)

(52) U.S. Cl.
CPC .................................... *H01Q 3/36* (2013.01)

(58) Field of Classification Search
CPC .......... H01Q 21/065; H01Q 3/36; H01Q 1/38; H01Q 9/0414; H01Q 1/48; H01Q 1/243;
(Continued)

(56) References Cited

U.S. PATENT DOCUMENTS

| | | | | |
|---|---|---|---|---|
| 11,962,054 B2 * | 4/2024 | Li | ............................ | H01Q 3/36 |
| 2021/0210851 A1 | 7/2021 | Wu et al. | | |
| 2022/0140800 A1 | 5/2022 | Fang et al. | | |

FOREIGN PATENT DOCUMENTS

| | | |
|---|---|---|
| CN | 104103875 A | 10/2014 |
| CN | 106154603 A | 11/2016 |

(Continued)

OTHER PUBLICATIONS

Extended Search Report dated Jun. 23, 2025 issued in corresponding European Application No. 22965393.6.

*Primary Examiner* — Lincoln D Donovan
*Assistant Examiner* — Tyler J Pereny
(74) *Attorney, Agent, or Firm* — Nath, Goldberg & Meyer; Joshua B. Goldberg

(57) ABSTRACT

The present disclosure provides a radio frequency apparatus, an antenna and an electronic device, and belongs to the field of communication technology. The radio frequency apparatus includes first and second dielectric substrates opposite to each other, first and second phase shifting structures between the first and second dielectric substrates; wherein the radio frequency apparatus further includes a first connection electrode and a second connection electrode; the first phase shifting structure and the second phase shifting structure each have a first end and a second end, the first ends of the first phase shifting structure and the second phase shifting structure are electrically connected to each other by the first connection electrode; the second ends of the first phase shifting structure and the second phase shifting struc- (Continued)

ture are electrically connected to each other by the second connection electrode, to form a ring circuit structure.

19 Claims, 31 Drawing Sheets

(58) Field of Classification Search
CPC .. H01Q 1/523; H01Q 19/104; H01Q 21/0006; H01Q 21/22; H01Q 3/46; H01Q 9/0435; H01Q 9/045; H01Q 1/22; H01Q 1/2283; H01Q 1/422; H01Q 1/50; H01Q 1/52; H01Q 11/14; H01Q 19/005; H01Q 19/062; H01Q 21/08; H01Q 21/28; H01Q 3/28; H01Q 3/44; H01Q 3/443; H01Q 5/42; H01P 1/184; H01P 1/182; H01P 1/18; H01P 1/181
See application file for complete search history.

(56) References Cited

FOREIGN PATENT DOCUMENTS

| | | | |
|---|---|---|---|
| CN | 110197939 | A | 9/2019 |
| CN | 112397854 | A | 2/2021 |
| CN | 112731715 | A | 4/2021 |
| CN | 114006167 | A | 2/2022 |
| CN | 114069231 | A | 2/2022 |
| CN | 114583453 | A | 6/2022 |
| CN | 114759322 | A | 7/2022 |
| EP | 3609017 | A1 | 2/2020 |
| EP | 3703182 | A1 | 9/2020 |
| EP | 4016724 | A1 | 6/2022 |
| JP | 2011-23624 | A | 2/2011 |
| WO | 2021/244015 | A1 | 12/2021 |
| WO | 2022/110013 | A1 | 6/2022 |

* cited by examiner

RADIO FREQUENCY APPARATUS, ANTENNA AND ELECTRONIC DEVICE

This is a National Phase Application filed under 35 U.S.C. 371 as a national stage of PCT/CN2022/131613, filed Nov. 14, 2022, the content of which is hereby incorporated by reference in its entirety.

TECHNICAL FIELD

The present disclosure relates to the field of communication technology, and in particular to a radio frequency apparatus, an antenna and an electronic device.

BACKGROUND

A radio frequency apparatus is an apparatus capable of adjusting a phase of a microwave signal, is widely applied to an electronic communication system, and is a core component in a phased array radar, a synthetic aperture radar, a radar electronic countermeasure, a satellite communication and a transceiver. Therefore, a radio frequency apparatus with a high performance play a vital role in these systems.

SUMMARY

The present disclosure is directed to at least one of the technical problems in the prior art, and provides a radio frequency apparatus, an antenna and an electronic apparatus.

In a first aspect, an embodiment of the present disclosure provides a radio frequency apparatus, including a first dielectric substrate and a second dielectric substrate opposite to each other, a first phase shifting structure and a second phase shifting structure between the first dielectric substrate and the second dielectric substrate: wherein the radio frequency apparatus further includes a first connection electrode and a second connection electrode: the first phase shifting structure and the second phase shifting structure each have a first end and a second end, the first end of the first phase shifting structure and the first end of the second phase shifting structure are electrically connected to each other by the first connection electrode; the second end of the first phase shifting structure and the second end of the second phase shifting structure are electrically connected to each other by the second connection electrode, to form a ring circuit structure.

In some examples, the first phase shifting structure includes at least one first phase shifting unit: the second phase shifting structure includes at least one second phase shifting unit: the at least one first phase shifting unit includes a first transmission line, a plurality of first patch electrodes at intervals, and a first tunable dielectric layer: the first transmission line is on a side of the first dielectric substrate close to the second dielectric substrate, the plurality of first patch electrodes are on a side of the second dielectric substrate close to the first dielectric substrate, and the first tunable dielectric layer is between a layer where the first transmission line is located and a layer where the plurality of first patch electrodes are located, and an orthographic projection of each of the plurality of first patch electrodes on the first dielectric substrate at least partially overlaps with an orthographic projection of the first transmission line on the first dielectric substrate: the at least one second phase shifting unit includes a second transmission line, a plurality of second patch electrodes at intervals, and a second tunable dielectric layer: the second transmission line is on a side of the first dielectric substrate close to the second dielectric substrate, the plurality of second patch electrodes are on a side of the second dielectric substrate close to the first dielectric substrate, and the second tunable dielectric layer is between a layer where the second transmission line is located and a layer where the plurality of second patch electrodes are located, and an orthographic projection of each of the plurality of second patch electrodes on the first dielectric substrate at least partially overlaps with an orthographic projection of the second transmission line on the first dielectric substrate; and the first transmission line has a first end and a second end opposite to each other in an extending direction of the first transmission line: the second transmission line has a first end and a second end opposite to each other in an extending direction of the second transmission line: the first ends of the first transmission line and the second transmission line are electrically connected to each other by the first connection electrode: the second ends of the first transmission line and the second transmission line are electrically connected to each other by the second connection electrode.

In some examples, the radio frequency apparatus further includes a first conductive layer on a side of the first dielectric substrate close to the second dielectric substrate, and a second conductive layer on a side of the second dielectric substrate close to the first dielectric substrate: wherein the first transmission line, the second transmission line, the first connection electrode and the second connection electrode are all in the first conductive layer; and the plurality of first patch electrodes and the plurality of second patch electrodes are in the second conductive layer.

In some examples, the radio frequency apparatus further includes a first conductive layer on a side of the first dielectric substrate close to the second dielectric substrate, a second conductive layer on a side of the second dielectric substrate close to the first dielectric substrate, and a third conductive layer on a side of the first dielectric substrate away from the second dielectric substrate: wherein the first transmission line and the second transmission line are in the first conductive layer: the plurality of first patch electrodes and the plurality of second patch electrodes are in the second conductive layer; and the first connection electrode and the second connection electrode are in the third conductive layer, and the first connection electrode is electrically connected to the first end of the first transmission line and the first end of the second transmission line through a first connection via extending through the first dielectric substrate: the second connection electrode is electrically connected to the second end of the first transmission line and the second end of the second transmission line through a second connection via extending through the first dielectric substrate.

In some examples, the first transmission line includes a first main line and a plurality of first branches, and the plurality of first branches are connected to at least one side of an extending direction of the first main line: at least some of the plurality of first branches and the first patch electrodes are in a one-to-one correspondence with each other, and orthographic projections of the first branches and the first patch electrodes corresponding to each other on the first dielectric substrate at least partially overlap with each other; and the second transmission line includes a second main line and a plurality of second branches, and the plurality of second branches are connected to at least one side of an extending direction of the second main line: at least some of the plurality of second branches and the second patch electrodes are in a one-to-one correspondence with each other, and orthographic projections of the second branches and the second patch electrodes corresponding to each other on the first dielectric substrate at least partially overlap with each other.

In some examples, the plurality of first branches are connected to both sides of the extending direction of the first main line and are in one-to-one correspondence with each other: orthographic projections of the first branches corresponding to each other on the first dielectric substrate at least partially overlap with an orthographic projection of the same first patch electrode on the first dielectric substrate; and the plurality of second branches are connected to both sides of the extending direction of the second main line and are in one-to-one correspondence with each other; orthographic projections of the second branches corresponding to each other on the first dielectric substrate at least partially overlap with an orthographic projection of the same second patch electrode on the first dielectric substrate.

In some examples, the plurality of first branches are connected to both sides of the extending direction of the first main line, connection nodes between the plurality of first branches and the first main line are staggered, and at least some first branches have different shapes; and the plurality of second branches are connected to both sides of the extending direction of the second main line, connection nodes each between each of the plurality of second branches and the second main line are staggered, and at least some second branches have different shapes.

In some examples, some of the plurality of first branches are in a one-to-one correspondence with the plurality of first patch electrodes, and orthographic projections of the first branch and the first patch electrode corresponding to each other on the first dielectric substrate at least partially overlap with each other; and/or some of the plurality of second branches are in a one-to-one correspondence with the plurality of second patch electrodes, and orthographic projections of the second branch and the second patch electrode corresponding to each other on the second dielectric substrate at least partially overlap with each other.

In some examples, the first connection electrode and the second connection electrode each have a width greater than a width of the first main line.

In some examples, the plurality of first patch electrodes are in a one-to-one correspondence with the plurality of second patch electrodes, and the first patch electrode and the second patch electrode corresponding to each other are connected together to have a one-piece structure.

In some examples, a gap between the first transmission line and the second transmission line is less than a line width of the first transmission line.

In some examples, the at least one first phase shifting unit includes a plurality of first phase shifting units, and the at least one second phase shifting unit includes a plurality of second phase shifting units: a first combiner, a second combiner, a third combiner and a fourth combiner: wherein the first combiner includes a first main path and a plurality of first branch paths electrically connected to the first main path: the second combiner includes a second main path and a plurality of second branch paths electrically connected to the second main path: the third combiner includes a third main path and a plurality of third branch paths electrically connected to the third main path: the fourth combiner includes a fourth main path and a plurality of fourth branch paths electrically connected to the fourth main path: the first ends of the first transmission lines in the plurality of first phase shifting units are connected to the first branch paths of the first combiner in a one-to-one correspondence: the second ends of the first transmission lines in the plurality of first phase shifting units are connected to the second branch paths of the second combiner in a one-to-one correspondence: the first ends of the second transmission lines in the plurality of second phase shifting units are connected to the third branch paths of the third combiner in a one-to-one correspondence: the second ends of the second transmission lines in the plurality of second phase shifting units are connected to the fourth branch paths of the fourth combiner in a one-to-one correspondence; and the first main path of the first combiner and the third main path of the third combiner are electrically connected to each other by the first connection electrode: the second main path of the second combiner and the fourth main path of the fourth combiner are electrically connected to each other by the second connection electrode.

In some examples, the first phase shifting structure includes at least one first phase shifting unit: the second phase shifting structure includes at least one second phase shifting unit: the at least one first phase shifting unit includes a first transmission line, a third transmission line and a first tunable dielectric layer: the first transmission line is on a side of the first dielectric substrate close to the second dielectric substrate, and the third transmission line is on a side of the second dielectric substrate close to the first dielectric substrate: the first tunable dielectric layer is between a layer where the first transmission line is located and a layer where the third transmission line is located, and orthographic projections of the first transmission line and the third transmission line on the first dielectric substrate at least partially overlap with each other: the at least one second phase shifting unit includes a second transmission line, a fourth transmission line and a second tunable dielectric layer: the second transmission line is on a side of the first dielectric substrate close to the second dielectric substrate, and the fourth transmission line is on a side of the second dielectric substrate close to the first dielectric substrate: the second tunable dielectric layer is between a layer where the second transmission line is located and a layer where the fourth transmission line is located, and orthographic projections of the second transmission line and the fourth transmission line on the first dielectric substrate at least partially overlap with each other; and the first transmission line, the second transmission line, the third transmission line and the fourth transmission line each have a first end and a second end opposite to each other in the respective extending directions: the first end of the first transmission line and the first end of the second transmission line are electrically connected to each other through the first connection electrode: the second end of the third transmission line and the second end of the fourth transmission line are electrically connected to each other through the second connection electrode.

In some examples, the radio frequency apparatus further includes a first conductive layer on a side of the first dielectric substrate close to the second dielectric substrate, and a second conductive layer on a side of the second dielectric substrate close to the first dielectric substrate: wherein the first transmission line, the second transmission line and the first connection electrode are all in the first conductive layer; and the third transmission line, the fourth transmission line and the second connection electrode are all in the second conductive layer.

In some examples, the first transmission line includes a first main line and a plurality of first branches, and the plurality of first branches are connected to at least one side of an extending direction of the first main line: the second transmission line includes a second main line and a plurality of second branches, and the plurality of second branches are connected to at least one side of an extending direction of the second main line: the third transmission line includes a third main line and a plurality of third branches, and the plurality of third branches are connected to at least one side of an extending direction of the third main line: the fourth transmission line includes a fourth main line and a plurality of fourth branches, and the plurality of fourth branches are connected to at least one side of an extending direction of the fourth main line; and orthographic projections of one first branch and one third branch on the first dielectric substrate at least partially overlap with each other: orthographic projections of one second branch and one fourth branch on the first dielectric substrate at least partially overlap with each other.

In some examples, the plurality of first branches are in a one-to-one correspondence with the plurality of third branches, and the plurality of second branches are in a one-to-one correspondence with the plurality of fourth branches.

In some examples, a width of the first connection electrode is greater than a width of the first main line, and a width of the second connection electrode is greater than a width of the third main line.

In some examples, the first phase shifting structure includes at least one first phase shifting unit: the second phase shifting structure includes at least one second phase shifting unit: the at least one first phase shifting unit includes a fifth main line, a plurality of fifth branches, a plurality of third patch electrodes, and a first tunable dielectric layer: the plurality of fifth branches are connected to one side of an extending direction of the fifth main line: the fifth main line, the plurality of fifth branches, and the plurality of third patch electrodes are all on a side of the first dielectric substrate close to the second dielectric substrate, and orthographic projections of the plurality of third patch electrodes and the plurality of fifth branches on the first dielectric substrate are alternately arranged: the first tunable dielectric layer is between the first dielectric substrate and the second dielectric substrate: the at least one second phase shifting unit includes a sixth main line, a plurality of sixth branches, a plurality of fourth patch electrodes, and a first tunable dielectric layer; the plurality of sixth branches are connected to one side of an extending direction of the sixth main line: the sixth main line, the plurality of sixth branches and the plurality of fourth patch electrodes are all on the side of the first dielectric substrate close to the second dielectric substrate, and orthographic projections of the plurality of fourth patch electrodes and the plurality of sixth branches on the first dielectric substrate are alternately arranged: the second tunable dielectric layer is between the first dielectric substrate and the second dielectric substrate; and the fifth main line has a first end and a second end opposite to each other in an extending direction of the fifth main line; and the sixth main line has a first end and a second end opposite to each other in an extending direction of the sixth main line: the first end of the fifth main line and the first end of the sixth main line are electrically connected to each other by the first connection electrode: the second end of the fifth main line and the second end of the sixth main line are electrically connected to each other by the second connection electrode.

In some examples, the radio frequency apparatus further includes a first conductive layer on a side of the first dielectric substrate close to the second dielectric substrate: wherein the first connection electrode, the second connection electrode, the fifth main line, the plurality of fifth branches, the plurality of third patch electrodes, the sixth main line, the plurality of sixth branches and the plurality of fourth patch electrodes are in the first conductive layer.

In some examples, the first connection electrode and the second connection electrode each have a width greater than a width of the fifth main line.

In some examples, the at least one first phase shifting unit further includes a plurality of fifth patch electrodes on a side of the second dielectric substrate close to the first dielectric substrate: orthographic projections of a fifth patch electrode and a fifth branch corresponding to each other on the first dielectric substrate at least partially overlap with each other; and the at least one second phase shifting unit further includes a plurality of sixth patch electrodes on a side of the second dielectric substrate close to the first dielectric substrate: orthographic projections of a sixth patch electrode and a sixth branch corresponding to each other on the first dielectric substrate at least partially overlap with each other.

An embodiment of the present disclosure provides an antenna, which includes the radio frequency apparatus in any one of the embodiments.

In some examples, the antenna further includes a third dielectric substrate, a fourth dielectric substrate, a first coupling layer, a second coupling layer, a first radiation electrode, and a second radiation electrode: the third dielectric substrate is on a side of the first dielectric substrate away from the second dielectric substrate, the first coupling layer is on a side of the third dielectric substrate close to the first dielectric substrate, and the first radiation electrode is on a side of the third dielectric substrate away from the first coupling layer: the first coupling layer has a first opening therein: orthographic projections of any two of the first opening, the first radiation electrode and the first connection electrode on the first dielectric substrate at least partially overlap with each other; and the fourth dielectric substrate is on a side of the second dielectric substrate away from the first dielectric substrate, the second coupling layer is on a side of the fourth dielectric substrate close to the second dielectric substrate, and the second radiation electrode is on a side of the fourth dielectric substrate away from the second coupling layer: the second coupling layer has a second opening therein: orthographic projections of any two of the second opening, the second radiation electrode and the second connection electrode on the first dielectric substrate at least partially overlap with each other.

In some examples, the antenna further includes a first radiation electrode and a second radiation electrode: the first radiation electrode is on a side of the first dielectric substrate away from the second dielectric substrate: orthographic projections of the first radiation electrode and the first connection electrode on the first dielectric substrate at least partially overlap with each other; and the second radiation electrode is on a side of the second dielectric substrate away from the first dielectric substrate: orthographic projections of the second radiation electrode and the second connection electrode on the first dielectric substrate at least partially overlap with each other.

In some examples, the antenna further includes a first waveguide structure and a second waveguide structure: the first waveguide structure is on a side of the first dielectric substrate away from the second dielectric substrate: orthographic projections of a first waveguide port of the first waveguide structure and the first connection electrode on the first dielectric substrate at least partially overlap with each other; and the second waveguide structure is on a side of the second dielectric substrate away from the first dielectric substrate: orthographic projections of a second waveguide port of the second waveguide structure and the second connection electrode on the first dielectric substrate at least partially overlap with each other.

In some examples, the antenna further includes a first coupling structure and a second coupling structure: wherein the first coupling structure is coupled to the first connection electrode: the second coupling structure is coupled to the second connection electrode.

In a third aspect, an embodiment of the present disclosure provides an antenna, including a radio frequency apparatus, a reference electrode layer and a feed structure; wherein the radio frequency apparatus includes a first dielectric substrate and a second dielectric substrate opposite to each other, a first phase shifting structure and a second phase shifting structure between the first dielectric substrate and the second dielectric substrate: the reference electrode layer is on a side of the first dielectric substrate away from the second dielectric substrate; and the radio frequency apparatus further includes a connection electrode: the first phase shifting structure and the second phase shifting structure each have a first end and a second end, the first end of the first phase shifting structure and the first end of the second phase shifting structure are electrically connected to each other by the connection electrode; the second end of the first phase shifting structure and the second end of the second phase shifting structure are electrically connected to each other by the feed structure, to form a ring circuit structure.

In some examples, the antenna further includes a fifth dielectric substrate, a coupling layer, and a radiation electrode: wherein the fifth dielectric substrate is on a side of the second dielectric substrate away from the first dielectric substrate, the coupling layer is on a side of the fifth dielectric substrate close to the second dielectric substrate, and the radiation electrode is on a side of the fifth dielectric substrate away from the second dielectric substrate: the coupling layer has an opening therein: orthographic projections of any two of the opening, the connection electrode and the radiation electrode on the first dielectric substrate at least partially overlap with each other.

In some examples, the antenna further includes a radiation electrode: wherein the radiation electrode is on a side of the second dielectric substrate away from the first dielectric substrate, and orthographic projections of the radiation electrode and the connection electrode on the first dielectric substrate at least partially overlap with each other.

In some examples, the antenna further includes a waveguide structure: wherein the waveguide structure is on a side of the second dielectric substrate away from the first dielectric substrate, and orthographic projections of a waveguide port of the waveguide structure and the connection electrode on the first dielectric substrate at least partially overlap with each other In some examples, the feed structure includes any one of a direct feed structure, a waveguide coupling feed structure and a microstrip feed structure.

In some examples, the first phase shifting structure includes at least one first phase shifting unit: the second phase shifting structure includes at least one second phase shifting unit: the at least one first phase shifting unit includes a first transmission line, a plurality of first patch electrodes at intervals, and a first tunable dielectric layer: the first transmission line is on a side of the first dielectric substrate close to the second dielectric substrate, the plurality of first patch electrodes are on a side of the second dielectric substrate close to the first dielectric substrate, and the first tunable dielectric layer is between a layer where the first transmission line is located and a layer where the plurality of first patch electrodes are located, and an orthographic projection of each of the plurality of first patch electrodes on the first dielectric substrate at least partially overlaps with an orthographic projection of the first transmission line on the first dielectric substrate: the at least one second phase shifting unit includes a second transmission line, a plurality of second patch electrodes at intervals, and a second tunable dielectric layer: the second transmission line is on a side of the first dielectric substrate close to the second dielectric substrate, the plurality of second patch electrodes are on a side of the second dielectric substrate close to the first dielectric substrate, and the second tunable dielectric layer is between a layer where the second transmission line is located and a layer where the plurality of second patch electrodes are located, and an orthographic projection of each of the plurality of second patch electrodes on the first dielectric substrate at least partially overlaps with an orthographic projection of the second transmission line on the first dielectric substrate; and the first transmission line has a first end and a second end opposite to each other in an extending direction of the first transmission line: the second transmission line has a first end and a second end opposite to each other in an extending direction of the second transmission line: the first ends of the first transmission line and the second transmission line are electrically connected to each other by the connection electrode: the second ends of the first transmission line and the second transmission line are electrically connected to each other by the feed structure.

In some examples, the antenna further includes a first conductive layer on a side of the first dielectric substrate close to the second dielectric substrate, and a second conductive layer on a side of the second dielectric substrate close to the first dielectric substrate: wherein the first transmission line, the second transmission line, the connection electrode are all in the first conductive layer; and the plurality of first patch electrodes and the plurality of second patch electrodes are in the second conductive layer.

In some examples, the antenna further includes a first conductive layer on a side of the first dielectric substrate close to the second dielectric substrate, a second conductive layer on a side of the second dielectric substrate close to the first dielectric substrate, and a third conductive layer on a side of the first dielectric substrate away from the second dielectric substrate: wherein the first transmission line and the second transmission line are in the first conductive layer: the plurality of first patch electrodes and the plurality of second patch electrodes are in the second conductive layer; and the connection electrode is in the third conductive layer, and is electrically connected to the first end of the first transmission line and the first end of =the second transmission line through a first connection via extending through the first dielectric substrate.

In some examples, the first transmission line includes a first main line and a plurality of first branches, and the plurality of first branches are connected to at least one side of an extending direction of the first main line: at least some of the plurality of first branches and the first patch electrodes are in a one-to-one correspondence with each other, and orthographic projections of the first branches and the first patch electrodes corresponding to each other on the first dielectric substrate at least partially overlap with each other; and the second transmission line includes a second main line and a plurality of second branches, and the plurality of second branches are connected to at least one side of an extending direction of the second main line: at least some of the plurality of second branches and the second patch electrodes are in a one-to-one correspondence with each other, and orthographic projections of the second branches and the second patch electrodes corresponding to each other on the first dielectric substrate at least partially overlap with each other.

In some examples, the plurality of first branches are connected to both sides of the extending direction of the first main line and are in one-to-one correspondence with each other: orthographic projections of the first branches corresponding to each other on the first dielectric substrate at least partially overlap with an orthographic projection of the same first patch electrode on the first dielectric substrate; and the plurality of second branches are connected to both sides of the extending direction of the second main line and are in one-to-one correspondence with each other; orthographic projections of the second branches corresponding to each other on the first dielectric substrate at least partially overlap with an orthographic projection of the same second patch electrode on the first dielectric substrate.

In some examples, the plurality of first branches are connected to both sides of the extending direction of the first main line, connection nodes between the plurality of first branches and the first main line are staggered, and at least some first branches have different shapes; and the plurality of second branches are connected to both sides of the extending direction of the second main line, connection nodes between the plurality of second branches and the second main line are staggered, and at least some second branches have different shapes.

In some examples, some of the plurality of first branches are in a one-to-one correspondence with the plurality of first patch electrodes, and orthographic projections of the first branch and the first patch electrode corresponding to each other on the first dielectric substrate at least partially overlap with each other; and/or some of the plurality of second branches are in a one-to-one correspondence with the plurality of second patch electrodes, and orthographic projections of the second branch and the second patch electrode corresponding to each other on the second dielectric substrate at least partially overlap with each other.

In some examples, the connection electrode has a width greater than a width of the first main line.

In some examples, the plurality of first patch electrodes are in a one-to-one correspondence with the plurality of second patch electrodes, and the first patch electrode and the second patch electrode corresponding to each other are connected together to have a one-piece structure.

In some examples, a gap between the first transmission line and the second transmission line is less than a line width of the first transmission line.

In some examples, the at least one first phase shifting unit includes a plurality of first phase shifting units, and the at least one second phase shifting unit includes a plurality of second phase shifting units: wherein the radio frequency apparatus further includes a first combiner, a second combiner, a third combiner and a fourth combiner; wherein the first combiner includes a first main path and a plurality of first branch paths electrically connected to the first main path: the second combiner includes a second main path and a plurality of second branch paths electrically connected to the second main path: the third combiner includes a third main path and a plurality of third branch paths electrically connected to the third main path: the fourth combiner includes a fourth main path and a plurality of fourth branch paths electrically connected to the fourth main path: the first ends of the first transmission lines in the plurality of first phase shifting units are connected to the first branch paths of the first combiner in a one-to-one correspondence: the second ends of the first transmission lines in the plurality of first phase shifting units are connected to the second branch paths of the second combiner in a one-to-one correspondence: the first ends of the second transmission lines in the plurality of second phase shifting units are connected to the third branch paths of the third combiner in a one-to-one correspondence: the second ends of the second transmission lines in the plurality of second phase shifting units are connected to the fourth branch paths of the fourth combiner in a one-to-one correspondence; and the first main path of the first combiner and the third main path of the third combiner are electrically connected to each other by the connection electrode: the second main path of the second combiner and the fourth main path of the fourth combiner are electrically connected to each other by the feed structure.

In some examples, the first phase shifting structure includes at least one first phase shifting unit: the second phase shifting structure includes at least one second phase shifting unit: the at least one first phase shifting unit includes a first transmission line, a third transmission line and a first tunable dielectric layer: the first transmission line is on a side of the first dielectric substrate close to the second dielectric substrate, and the third transmission line is on a side of the second dielectric substrate close to the first dielectric substrate: the first tunable dielectric layer is between a layer where the first transmission line is located and a layer where the third transmission line is located, and orthographic projections of the first transmission line and the third transmission line on the first dielectric substrate at least partially overlap with each other: the at least one second phase shifting unit includes a second transmission line, a fourth transmission line and a second tunable dielectric layer: the second transmission line is on a side of the first dielectric substrate close to the second dielectric substrate, and the fourth transmission line is on a side of the second dielectric substrate close to the first dielectric substrate: the second tunable dielectric layer is between a layer where the second transmission line is located and a layer where the fourth transmission line is located, and orthographic projections of the second transmission line and the fourth transmission line on the first dielectric substrate at least partially overlap with each other; and the first transmission line, the second transmission line, the third transmission line and the fourth transmission line each have a first end and a second end opposite to each other in the respective extending directions: the first end of the first transmission line and the first end of the second transmission line are electrically connected to each other through the connection electrode: the second end of the third transmission line and the second end of the fourth transmission line are electrically connected to each other through the feed structure.

In some examples, the antenna further includes a first conductive layer on a side of the first dielectric substrate close to the second dielectric substrate, and a second conductive layer on a side of the second dielectric substrate close to the first dielectric substrate: wherein the first transmission line, the second transmission line and the connection electrode are all in the first conductive layer; and the third transmission line and the fourth transmission line are both in the second conductive layer.

In some examples, the first transmission line includes a first main line and a plurality of first branches, and the plurality of first branches are connected to at least one side of an extending direction of the first main line: the second transmission line includes a second main line and a plurality of second branches, and the plurality of second branches are connected to at least one side of an extending direction of the second main line: the third transmission line includes a third main line and a plurality of third branches, and the plurality of third branches are connected to at least one side of an extending direction of the third main line: the fourth transmission line includes a fourth main line and a plurality of fourth branches, and the plurality of fourth branches are connected to at least one side of an extending direction of the fourth main line; and orthographic projections of one first branch and one third branch on the first dielectric substrate at least partially overlap with each other: orthographic projections of one second branch and one fourth branch on the first dielectric substrate at least partially overlap with each other.

In some examples, the plurality of first branches are in a one-to-one correspondence with the plurality of third branches, and the plurality of second branches are in a one-to-one correspondence with the plurality of fourth branches.

In some examples, a width of the connection electrode is greater than a width of the first main line.

In some examples, the first phase shifting structure includes at least one first phase shifting unit: the second phase shifting structure includes at least one second phase shifting unit: the at least one first phase shifting unit includes a fifth main line, a plurality of fifth branches, a plurality of third patch electrodes, and a first tunable dielectric layer: the plurality of fifth branches are connected to one side of an extending direction of the fifth main line: the fifth main line, the plurality of fifth branches, and the plurality of third patch electrodes are all on a side of the first dielectric substrate close to the second dielectric substrate, and orthographic projections of the plurality of third patch electrodes and the plurality of fifth branches on the first dielectric substrate are alternately arranged: the first tunable dielectric layer is between the first dielectric substrate and the second dielectric substrate: the at least one second phase shifting unit includes a sixth main line, a plurality of sixth branches, a plurality of fourth patch electrodes, and a first tunable dielectric layer: the plurality of sixth branches are connected to one side of an extending direction of the sixth main line: the sixth main line, the plurality of sixth branches and the plurality of fourth patch electrodes are all on the side of the first dielectric substrate close to the second dielectric substrate, and orthographic projections of the plurality of fourth patch electrodes and the plurality of sixth branches on the first dielectric substrate are alternately arranged: the second tunable dielectric layer is between the first dielectric substrate and the second dielectric substrate; and the fifth main line has a first end and a second end opposite to each other in an extending direction of the fifth main line; and the sixth main line has a first end and a second end opposite to each other in an extending direction of the sixth main line: the first end of the fifth main line and the first end of the sixth main line are electrically connected to each other by the connection electrode: the second end of the fifth main line and the second end of the sixth main line are electrically connected to each other by the feed structure.

In some examples, the antenna further includes a first conductive layer on a side of the first dielectric substrate close to the second dielectric substrate: wherein the connection electrode, the fifth main line, the plurality of fifth branches, the plurality of third patch electrodes, the sixth main line, the plurality of sixth branches and the plurality of fourth patch electrodes are in the first conductive layer.

In some examples, a width of the connection electrode is greater than a width of the fifth main line.

In some examples, the at least one first phase shifting unit further includes a plurality of fifth patch electrodes on a side of the second dielectric substrate close to the first dielectric substrate: orthographic projections of a fifth patch electrode and a fifth branch corresponding to each other on the first dielectric substrate at least partially overlap with each other; and the at least one second phase shifting unit further includes a plurality of sixth patch electrodes on a side of the second dielectric substrate close to the first dielectric substrate: orthographic projections of a sixth patch electrode and a sixth branch corresponding to each other on the first dielectric substrate at least partially overlap with each other.

In a fourth aspect, an embodiment of the present disclosure provides an antenna, including a radio frequency apparatus and a reflective electrode layer: wherein the radio frequency apparatus includes a first dielectric substrate and a second dielectric substrate opposite to each other, a first phase shifting structure and a second phase shifting structure between the first dielectric substrate and the second dielectric substrate: the reflective electrode layer is on a side of the first dielectric substrate away from the second dielectric substrate; and the radio frequency apparatus further includes a connection electrode: the first phase shifting structure and the second phase shifting structure each have a first end and a second end, the first end of the first phase shifting structure and the first end of the second phase shifting structure are electrically connected to each other by the connection electrode, to form a ring circuit structure with the reflective electrode layer.

In some examples, the antenna further includes a fifth dielectric substrate, a coupling layer, and a radiation electrode: wherein the fifth dielectric substrate is on a side of the second dielectric substrate away from the first dielectric substrate, the coupling layer is on a side of the fifth dielectric substrate close to the second dielectric substrate, and the radiation electrode is on a side of the fifth dielectric substrate away from the second dielectric substrate: the coupling layer has an opening therein: orthographic projections of any two of the opening, the connection electrode and the radiation electrode on the first dielectric substrate at least partially overlap with each other.

In some examples, the antenna further includes a radiation electrode: wherein the radiation electrode is on a side of the second dielectric substrate away from the first dielectric substrate, and orthographic projections of the radiation electrode and the connection electrode on the first dielectric substrate at least partially overlap with each other.

In some examples, the antenna further includes a waveguide structure: wherein the waveguide structure is on a side of the second dielectric substrate away from the first dielectric substrate, and orthographic projections of a waveguide port of the waveguide structure and the connection electrode on the first dielectric substrate at least partially overlap with each other.

In some examples, the first phase shifting structure includes at least one first phase shifting unit: the second phase shifting structure includes at least one second phase shifting unit: the at least one first phase shifting unit includes a first transmission line, a plurality of first patch electrodes at intervals, and a first tunable dielectric layer: the first transmission line is on a side of the first dielectric substrate close to the second dielectric substrate, the plurality of first patch electrodes are on a side of the second dielectric substrate close to the first dielectric substrate, and the first tunable dielectric layer is between a layer where the first transmission line is located and a layer where the plurality of first patch electrodes are located, and an orthographic projection of each of the plurality of first patch electrodes on the first dielectric substrate at least partially overlaps with an orthographic projection of the first transmission line on the first dielectric substrate: the at least one second phase shifting unit includes a second transmission line, a plurality of second patch electrodes at intervals, and a second tunable dielectric layer: the second transmission line is on a side of the first dielectric substrate close to the second dielectric substrate, the plurality of second patch electrodes are on a side of the second dielectric substrate close to the first dielectric substrate, and the second tunable dielectric layer is between a layer where the second transmission line is located and a layer where the plurality of second patch electrodes are located, and an orthographic projection of each of the plurality of second patch electrodes on the first dielectric substrate at least partially overlaps with an orthographic projection of the second transmission line on the first dielectric substrate; and the first transmission line has a first end and a second end opposite to each other in an extending direction of the first transmission line: the second transmission line has a first end and a second end opposite to each other in an extending direction of the second transmission line: the first ends of the first transmission line and the second transmission line are electrically connected to each other by the connection electrode.

In some examples, the antenna further includes a first conductive layer on a side of the first dielectric substrate close to the second dielectric substrate, and a second conductive layer on a side of the second dielectric substrate close to the first dielectric substrate; wherein the first transmission line, the second transmission line, the connection electrode are all in the first conductive layer; and the plurality of first patch electrodes and the plurality of second patch electrodes are in the second conductive layer.

In some examples, the antenna further includes a first conductive layer on a side of the first dielectric substrate close to the second dielectric substrate, a second conductive layer on a side of the second dielectric substrate close to the first dielectric substrate, and a third conductive layer on a side of the first dielectric substrate away from the second dielectric substrate: wherein the first transmission line and the second transmission line are in the first conductive layer: the plurality of first patch electrodes and the plurality of second patch electrodes are in the second conductive layer; and the connection electrode is in the third conductive layer, and is electrically connected to the first end of the first transmission line and the first end of the second transmission line through a first connection via extending through the first dielectric substrate.

In some examples, the first transmission line includes a first main line and a plurality of first branches, and the plurality of first branches are connected to at least one side of an extending direction of the first main line: at least some of the plurality of first branches and the first patch electrodes are in a one-to-one correspondence with each other, and orthographic projections of the first branches and the first patch electrodes corresponding to each other on the first dielectric substrate at least partially overlap with each other; and the second transmission line includes a second main line and a plurality of second branches, and the plurality of second branches are connected to at least one side of an extending direction of the second main line: at least some of the plurality of second branches and the second patch electrodes are in a one-to-one correspondence with each other, and orthographic projections of the second branches and the second patch electrodes corresponding to each other on the first dielectric substrate at least partially overlap with each other.

In some examples, the plurality of first branches are connected to both sides of the extending direction of the first main line and are in one-to-one correspondence with each other: orthographic projections of the first branches corresponding to each other on the first dielectric substrate at least partially overlap with an orthographic projection of the same first patch electrode on the first dielectric substrate; and the plurality of second branches are connected to both sides of the extending direction of the second main line and are in one-to-one correspondence with each other; orthographic projections of the second branches corresponding to each other on the first dielectric substrate at least partially overlap with an orthographic projection of the same second patch electrode on the first dielectric substrate.

In some examples, the plurality of first branches are connected to both sides of the extending direction of the first main line, connection nodes between the plurality of first branches and the first main line are staggered, and at least some first branches have different shapes; and the plurality of second branches are connected to both sides of the extending direction of the second main line, connection nodes between the plurality of second branches and the second main line are staggered, and at least some second branches have different shapes.

In some examples, some of the plurality of first branches are in a one-to-one correspondence with the plurality of first patch electrodes, and orthographic projections of the first branch and the first patch electrode corresponding to each other on the first dielectric substrate at least partially overlap with each other; and/or some of the plurality of second branches are in a one-to-one correspondence with the plurality of second patch electrodes, and orthographic projections of the second branch and the second patch electrode corresponding to each other on the second dielectric substrate at least partially overlap with each other.

In some examples, the connection electrode has a width greater than a width of the first main line.

In some examples, the plurality of first patch electrodes are in a one-to-one correspondence with the plurality of second patch electrodes, and the first patch electrode and the second patch electrode corresponding to each other are connected together to have a one-piece structure.

In some examples, a gap between the first transmission line and the second transmission line is less than a line width of the first transmission line.

In some examples, the at least one first phase shifting unit includes a plurality of first phase shifting units, and the at least one second phase shifting unit includes a plurality of second phase shifting units: wherein the radio frequency apparatus further includes a first combiner, a second combiner, a third combiner and a fourth combiner; wherein the first combiner includes a first main path and a plurality of first branch paths electrically connected to the first main path: the second combiner includes a second main path and a plurality of second branch paths electrically connected to the second main path: the third combiner includes a third main path and a plurality of third branch paths electrically connected to the third main path: the fourth combiner includes a fourth main path and a plurality of fourth branch paths electrically connected to the fourth main path: the first ends of the first transmission lines in the plurality of first phase shifting units are connected to the first branch paths of the first combiner in a one-to-one correspondence: the second ends of the first transmission lines in the plurality of first phase shifting units are connected to the second branch paths of the second combiner in a one-to-one correspondence: the first ends of the second transmission lines in the plurality of second phase shifting units are connected to the third branch paths of the third combiner in a one-to-one correspondence: the second ends of the second transmission lines in the plurality of second phase shifting units are connected to the fourth branch paths of the fourth combiner in a one-to-one correspondence; and the first main path of the first combiner and the third main path of the third combiner are electrically connected to each other by the connection electrode: the second main path of the second combiner and the fourth main path of the fourth combiner are electrically connected to each other by the feed structure.

In some examples, the first phase shifting structure includes at least one first phase shifting unit: the second phase shifting structure includes at least one second phase shifting unit: the at least one first phase shifting unit includes a first transmission line, a third transmission line and a first tunable dielectric layer: the first transmission line is on a side of the first dielectric substrate close to the second dielectric substrate, and the third transmission line is on a side of the second dielectric substrate close to the first dielectric substrate: the first tunable dielectric layer is between a layer where the first transmission line is located and a layer where the third transmission line is located, and orthographic projections of the first transmission line and the third transmission line on the first dielectric substrate at least partially overlap with each other: the at least one second phase shifting unit includes a second transmission line, a fourth transmission line and a second tunable dielectric layer: the second transmission line is on a side of the first dielectric substrate close to the second dielectric substrate, and the fourth transmission line is on a side of the second dielectric substrate close to the first dielectric substrate: the second tunable dielectric layer is between a layer where the second transmission line is located and a layer where the fourth transmission line is located, and orthographic projections of the second transmission line and the fourth transmission line on the first dielectric substrate at least partially overlap with each other; and the first transmission line, the second transmission line, the third transmission line and the fourth transmission line each have a first end and a second end opposite to each other in the respective extending directions: the first end of the first transmission line and the first end of the second transmission line are electrically connected to each other through the connection electrode.

In some examples, the antenna further includes a first conductive layer on a side of the first dielectric substrate close to the second dielectric substrate, and a second conductive layer on a side of the second dielectric substrate close to the first dielectric substrate: wherein the first transmission line, the second transmission line and the connection electrode are all in the first conductive layer; and the third transmission line and the fourth transmission line are all in the second conductive layer.

In some examples, the first transmission line includes a first main line and a plurality of first branches, and the plurality of first branches are connected to at least one side of an extending direction of the first main line: the second transmission line includes a second main line and a plurality of second branches, and the plurality of second branches are connected to at least one side of an extending direction of the second main line: the third transmission line includes a third main line and a plurality of third branches, and the plurality of third branches are connected to at least one side of an extending direction of the third main line: the fourth transmission line includes a fourth main line and a plurality of fourth branches, and the plurality of fourth branches are connected to at least one side of an extending direction of the fourth main line; and orthographic projections of one first branch and one third branch on the first dielectric substrate at least partially overlap with each other: orthographic projections of one second branch and one fourth branch on the first dielectric substrate at least partially overlap with each other.

In some examples, the plurality of first branches are in a one-to-one correspondence with the plurality of third branches, and the plurality of second branches are in a one-to-one correspondence with the plurality of fourth branches.

In some examples, a width of the connection electrode is greater than a width of the first main line.

In some examples, the first phase shifting structure includes at least one first phase shifting unit: the second phase shifting structure includes at least one second phase shifting unit: the at least one first phase shifting unit includes a fifth main line, a plurality of fifth branches, a plurality of third patch electrodes, and a first tunable dielectric layer: the plurality of fifth branches are connected to one side of an extending direction of the fifth main line: the fifth main line, the plurality of fifth branches, and the plurality of third patch electrodes are all on a side of the first dielectric substrate close to the second dielectric substrate, and orthographic projections of the plurality of third patch electrodes and the plurality of fifth branches on the first dielectric substrate are alternately arranged: the first tunable dielectric layer is between the first dielectric substrate and the second dielectric substrate: the at least one second phase shifting unit includes a sixth main line, a plurality of sixth branches, a plurality of fourth patch electrodes, and a first tunable dielectric layer: the plurality of sixth branches are connected to one side of an extending direction of the sixth main line: the sixth main line, the plurality of sixth branches and the plurality of fourth patch electrodes are all on the side of the first dielectric substrate close to the second dielectric substrate, and orthographic projections of the plurality of fourth patch electrodes and the plurality of sixth branches on the first dielectric substrate are alternately arranged: the second tunable dielectric layer is between the first dielectric substrate and the second dielectric substrate; and the fifth main line has a first end and a second end opposite to each other in an extending direction of the fifth main line; and the sixth main line has a first end and a second end opposite to each other in an extending direction of the sixth main line: the first end of the fifth main line and the first end of the sixth main line are electrically connected to each other by the connection electrode.

In some examples, the antenna further includes a first conductive layer on a side of the first dielectric substrate close to the second dielectric substrate: wherein the connection electrode, the fifth main line, the plurality of fifth branches, the plurality of third patch electrodes, the sixth main line, the plurality of sixth branches and the plurality of fourth patch electrodes are in the first conductive layer.

In some examples, a width of the connection electrode is greater than a width of the fifth main line.

In some examples, the at least one first phase shifting unit further includes a plurality of fifth patch electrodes on a side of the second dielectric substrate close to the first dielectric substrate: orthographic projections of a fifth patch electrode and a fifth branch corresponding to each other on the first dielectric substrate at least partially overlap with each other; and the at least one second phase shifting unit further includes a plurality of sixth patch electrodes on a side of the second dielectric substrate close to the first dielectric substrate: orthographic projections of a sixth patch electrode and a sixth branch corresponding to each other on the first dielectric substrate at least partially overlap with each other.

In a fifth aspect, an embodiment of the present disclosure provides an electronic device, including the antenna in any one of the embodiments.

DETAIL DESCRIPTION OF EMBODIMENTS

In order to enable one of ordinary skill in the art to better understand the technical solutions of the present disclosure, the present disclosure will be described in further detail with reference to the accompanying drawings and the detailed description.

Unless defined otherwise, technical or scientific terms used herein shall have the ordinary meaning as understood by one of ordinary skill in the art to which the present disclosure belongs. The terms “first”, “second”, and the like used in the present disclosure are not intended to indicate any order, quantity, or importance, but rather are used for distinguishing one element from another. Further, the term “a”, “an”, “the”, or the like used herein does not denote a limitation of quantity, but rather denotes the presence of at least one element. The term of “comprising”, “including”, or the like, means that the element or item preceding the term contains the element or item listed after the term and its equivalent, but does not exclude other elements or items. The term “connected”, “coupled”, or the like is not limited to physical or mechanical connections, but may include electrical connections, whether direct or indirect connections. The terms “upper”, “lower”, “left”, “right”, and the like are used only for indicating relative positional relationships, and when the absolute position of an object being described is changed, the relative positional relationships may also be changed accordingly.

Figure 1:
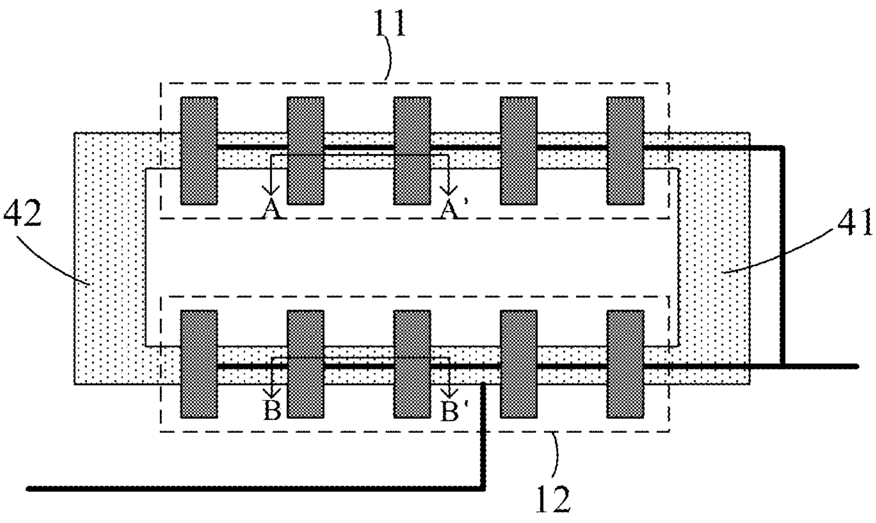
FIG. 1 is a schematic diagram of a structure of a phase shifter according to an embodiment of the present disclosure.

In a first aspect, an embodiment of the present disclosure provides a radio frequency apparatus. In the embodiment of the present disclosure, as an example, the radio frequency apparatus is a phase shifter. FIG. 1 is a schematic diagram of a structure of a phase shifter according to an embodiment of the present disclosure. As shown in FIG. 1, the phase shifter includes a first dielectric substrate 10, a second dielectric substrate 20, a first phase shifting structure 11, a second phase shifting structure 12, a first connection electrode 41, and a second connection electrode 42. The first phase shifting structure 11 and the second phase shifting structure 12 are both arranged between the first dielectric substrate 10 and the second dielectric substrate 20. The first phase shifting structure 11 and the second phase shifting structure 12 each have a first end and a second end, the first end of the first phase shifting structure 11 and the first end of the second phase shifting structure 12 are electrically connected to each other by the first connection electrode 41: the second end of the first phase shifting structure 11 and the second end of the second phase shifting structure 12 are electrically connected to each other by the second connection electrode 42, to form a ring circuit structure. The first phase shifting structure 11 and the second phase shifting structure 12 have opposite transmission directions for microwave signals.

It should be noted that the first phase shifting structure 11 and the second phase shifting structure 12 are electrically connected to each other through the first connection electrode 41 and the second connection electrode 41, to form the ring circuit structure of the phase shifter; and it is required to ensure that the first phase shifting structure 11 and the second phase shifting structure 12 have the opposite transmission directions for the microwave signals. At this time, the first phase shifting structure 11 and the second phase shifting structure 12 may have various relative position relationship therebetween. In FIG. 1, as an example, only the first end (right end) of the first phase shifting structure 11 and the first end (right end) of the second phase shifting structure 12 are arranged side by side, and the second end (left end) of the first phase shifting structure 11 and the second end (left end) of the second phase shifting structure 12 are arranged side by side.

In the embodiment of the present disclosure, the first phase shifting structure 11 and the second phase shifting structure 12 in the phase shifter form the ring circuit structure through the first connection electrode 41 and the second connection electrode 42. At this time, the phase shifter is applied to an antenna, the first connection electrode 41 and the second connection electrode 42 may be used as a feed structure 200, so that the phase shifter and a radiation structure in the antenna can be compactly connected with each other, which is beneficial to realizing a design of a miniaturization of the antenna.

In some examples, the first phase shifting structure 11 includes one or more first phase shifting units, and the second phase shifting structure 12 includes one or more second phase shifting units. When the number of the first phase shifting units is one, a first end and a second end of the first phase shifting unit serve as the first end and the second end of the first phase shifting structure 11, respectively. When the number of the first phase shifting units is more, first ends of the plurality of first phase shifting units are connected together as the first end of the first phase shifting structure 11, and second ends of the plurality of first phase shifting units are connected together as the second end of the first phase shifting structure 11. Similarly, when the number of the second phase shifting units is one, a first end and a second end of the second phase shifting unit serve as the first end and the second end of the second phase shifting structure 12, respectively. When the number of the second phase shifting units is more, first ends of the plurality of second phase shifting units are connected together as the first end of the second phase shifting structure 12, and second ends of the plurality of second phase shifting units are connected together as the second end of the second phase shifting structure 12.

Figure 2:
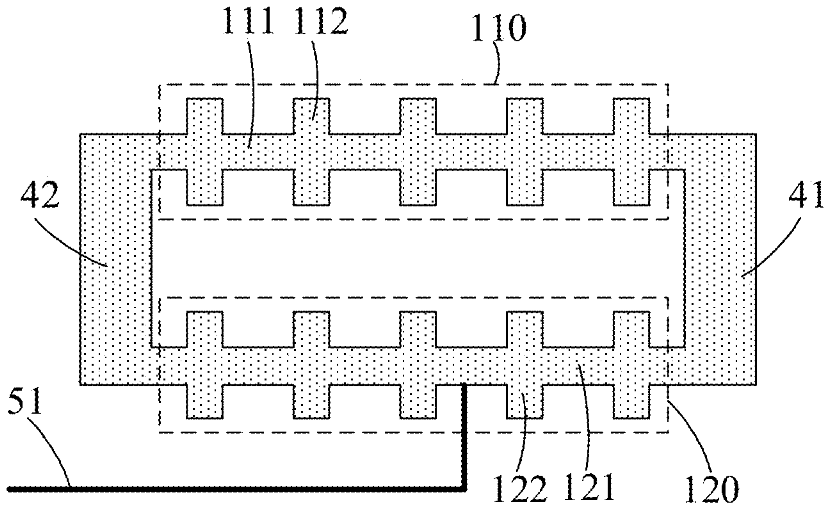
FIG. 2 is a schematic diagram of a first transmission line and a second transmission line in the phase shifter shown in FIG. 1.
Figure 3:
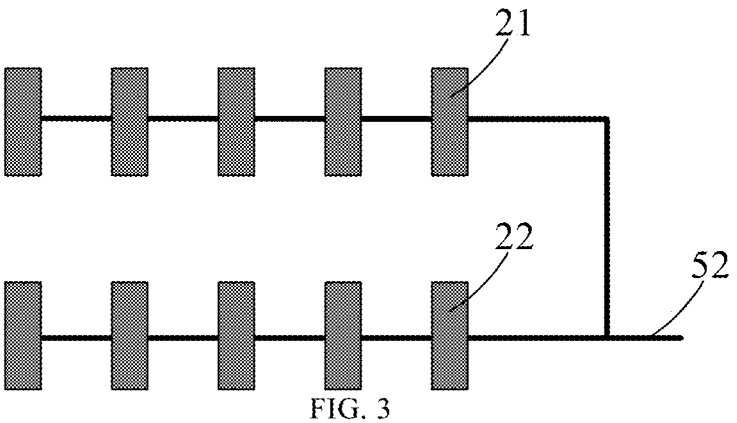
FIG. 3 is a schematic diagram of a first patch electrode and a second patch electrode in the phase shifter shown in FIG. 1.
Figure 4:
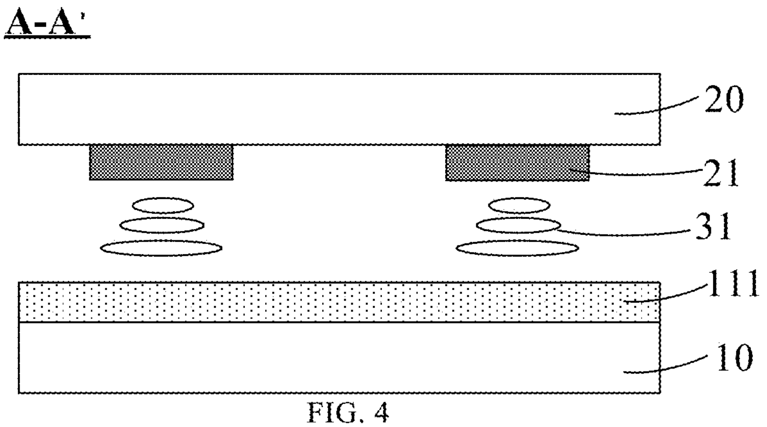
FIG. 4 is a cross-sectional view along a line A-A' of FIG. 1.

Further, FIG. 2 is a schematic diagram of a first transmission line 110 and a second transmission line 120 in the phase shifter shown in FIG. 1. FIG. 3 is a schematic diagram of a first patch electrode and a second patch electrode in the phase shifter shown in FIG. 1. FIG. 4 is a cross-sectional view along a line A-A' of FIG. 1. As shown in connection with FIGS. 2 to 4, for any first phase shifting unit, the first phase shifting unit may include a first transmission line 110, a plurality of first patch electrodes 21 arranged at intervals, and a first tunable dielectric layer 31. The first transmission line 110 is disposed on a side of the first dielectric substrate 10 close to the second dielectric substrate 20, the plurality of first patch electrodes 21 arranged at intervals are disposed on a side of the second dielectric substrate 20 close to the first dielectric substrate 10, and the first tunable dielectric layer 31 is disposed between a layer where the first transmission line 110 is located and a layer where the plurality of first patch electrodes 21 arranged at intervals are located. An orthographic projection of each of the plurality of first patch electrodes 21 on the first dielectric substrate 10 overlaps with an orthographic projection of the first transmission line 110 on the first dielectric substrate 10. The first tunable dielectric layer 31 includes, but is not limited to, a first liquid crystal layer 30 composed of liquid crystal molecules. In the embodiment of the present disclosure, as an example, the first tunable dielectric layer 31 is the first liquid crystal layer 30. A first bias voltage is applied to the first transmission line 110 through a first driving line 51 and a second bias voltage is applied to the first patch electrodes 21 through a second driving line 52, an electric field is formed between the first transmission line 110 and the first patch electrodes 21, to drive liquid crystal molecules therebetween to rotate, thereby changing a dielectric constant of the first liquid crystal layer 30, to adjust a phase of a transmitted microwave signal.

Figure 5:
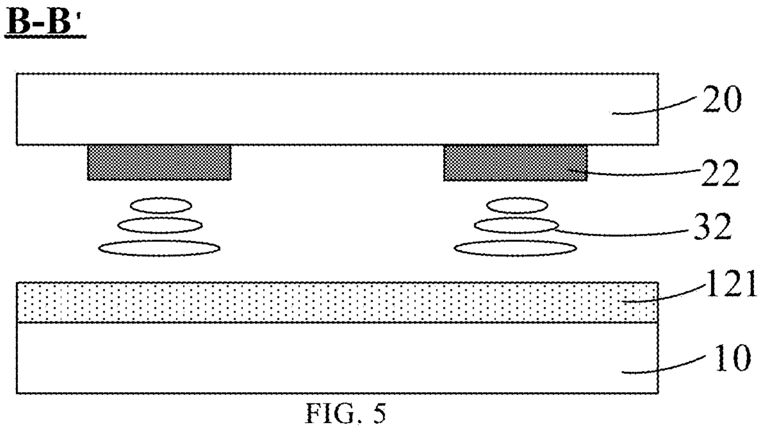
FIG. 5 is a cross-sectional view along a line B-B' of FIG. 1.

FIG. 5 is a cross-sectional view along a line B-B' of FIG. 1. As shown in connection with FIGS. 2, 3 and 5, for any second phase shifting unit, the second phase shifting unit may include a second transmission line 120, a plurality of second patch electrodes 22 arranged at intervals, and a second tunable dielectric layer 32. The second transmission line 120 is disposed on a side of the first dielectric substrate 10 close to the second dielectric substrate 20, the plurality of second patch electrodes 22 arranged at intervals are disposed on a side of the second dielectric substrate 20 close to the first dielectric substrate 10, and the second tunable dielectric layer 32 is disposed between a layer where the second transmission line 120 is located and a layer where the plurality of second patch electrodes 22 arranged at intervals are located. An orthographic projection of each of the plurality of second patch electrodes 22 on the first dielectric substrate 10 overlaps with an orthographic projection of the second transmission line 120 on the first dielectric substrate 10. The second tunable dielectric layer 32 includes, but is not limited to, a second liquid crystal layer 30 composed of liquid crystal molecules. When the second tunable dielectric layer 32 is formed by the second liquid crystal layer 30 composed of liquid crystal molecules, the second liquid crystal layer 30 may be located in the same liquid crystal layer 30 as the first liquid crystal layer 30. In the embodiment of the present disclosure, as an example, the second tunable dielectric layer 32 is the second liquid crystal layer 30. The first bias voltage is applied to the second transmission line 120 through the first driving line 51 and the second bias voltage is applied to the second patch electrodes 22 through the second driving line 52, an electric field is formed between the second transmission line 120 and the second patch electrodes 22, to drive liquid crystal molecules therebetween to rotate, thereby changing a dielectric constant of the second liquid crystal layer 30, to adjust a phase of a transmitted microwave signal.

In the above case, the first transmission line 110 has a first end and a second end oppositely disposed in an extending direction of the first transmission line 110: the second transmission line 120 has a first end and a second end oppositely disposed in an extending direction of the second transmission line 120. The first connection electrode 41 electrically connects the first ends of the first transmission line 110 and the second transmission line 120, and the second connection electrode 42 electrically connects the second ends of the first transmission line 110 and the second transmission line 120.

It should be noted that the extending direction of the first transmission line 110 refers to an extending direction of a main body of the first transmission line 110. In other words, a length direction of the first transmission line 110 is also the extending direction of the first transmission line 110. Similarly, the extending direction of the second transmission line 120 refers to an extending direction of a main body of the second transmission line 120. In other words, a length direction of the second transmission line 120 is also the extending direction of the second transmission line 120.

In some examples, the first transmission line 110, the second transmission line 120, the first patch electrodes 21, and the second patch electrodes 22 may be made of a metal material, such as copper. The first driving line 51 for applying the first bias voltage to the first transmission line 110 and the second transmission line 120 may be made of a transparent conductive material, such as indium tin oxide. The second driving line 52 for applying the second bias voltage to the first patch electrodes 21 and the second patch electrodes 22 may be made of a transparent conductive material, such as indium tin oxide.

Further, the first driving line 51 may be disposed on a side of the layer where the first transmission line 110 and the second transmission line 120 are located close to the first dielectric substrate 10: the second driving line 52 may be disposed on a side of the layer where the first patch electrodes 21 and the second patch electrodes 22 are located close to the second dielectric substrate 20.

Furthermore, in order to prevent the first transmission line 110, the second transmission line 120, the first patch electrodes 21 and the second patch electrodes 22 from contacting the liquid crystal layer 30 formed by the liquid crystal molecules, a first protective layer is formed on the side of the layer where the first transmission line 110 and the second transmission line 120 are located away from the first dielectric substrate 10, and a second protective layer is formed on the side of the layer where the first patch electrodes 21 and the second patch electrodes 22 are located away from the second dielectric substrate 20. In addition, in order to maintain a cell gap of the liquid crystal layer 30, it is necessary to form post spacers PS between the first protective layer and the second protective layer.

Figure 6:
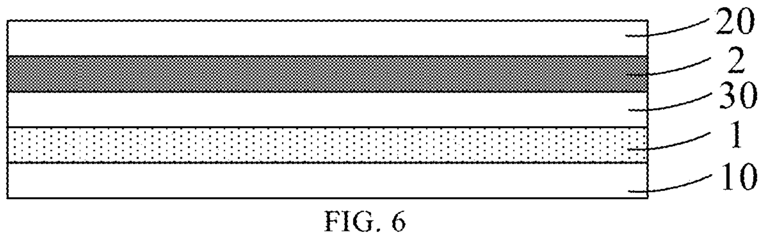
FIG. 6 is a schematic diagram illustrating layers of a phase shifter according to an embodiment of the present disclosure.

In one example, FIG. 6 is a schematic diagram illustrating layers of a phase shifter according to an embodiment of the present disclosure. As shown in FIG. 6, the phase shifter includes a first conductive layer 1 disposed on a side of the first dielectric substrate 10 close to the second dielectric substrate 20, and a second conductive layer 2 disposed on a side of the second dielectric substrate 20 close to the first dielectric substrate 10. The first transmission line 110, the second transmission line 120) and the first connection electrode 41 and the second connection electrode 42 are located in the first conductive layer 1. The first patch electrodes 21 and the second patch electrodes 22 are located in the second conductive layer 2. That is, the first transmission line 110, the second transmission line 120, and the first connection electrode 41 and the second connection electrode 42 are disposed in the same layer, and are made of the same material: the first patch electrodes 21 and the second patch electrodes 22 are disposed in the same layer, and are made of the same material. In this case, the lightweight and thinness of the phase shifter can be advantageously realized.

Figure 7:
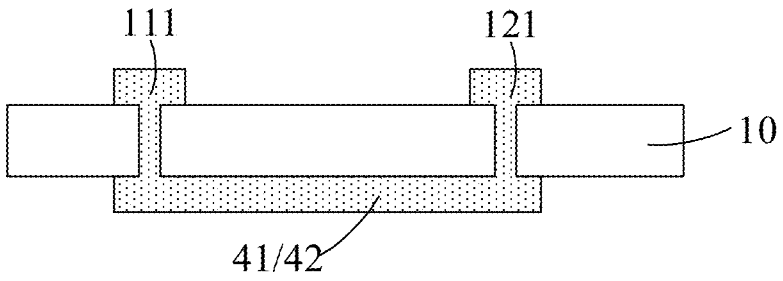
FIG. 7 is a schematic diagram illustrating layers of a phase shifter according to an embodiment of the present disclosure.

In another example, FIG. 7 is another schematic diagram illustrating layers of a phase shifter according to an embodiment of the present disclosure. As shown in FIG. 7, the phase shifter includes the first conductive layer 1 disposed on a side of the first dielectric substrate 10 close to the second dielectric substrate 20, the second conductive layer 2 disposed on a side of the second dielectric substrate 20 close to the first dielectric substrate 10, and a third conductive layer disposed on a side of the first dielectric substrate 10 away from the second dielectric substrate 20. The first transmission line 110 and the second transmission line 120 are located in the first conductive layer 1. The first patch electrodes 21 and the second patch electrodes 22 are located in the second conductive layer 2. The first and second connection electrodes 41 and 42 are located in the third conductive layer. At this time, the first connection electrode 41 is electrically connected to the first ends of the first and second transmission lines 110 and 120 through two first connection vias extending through the first dielectric substrate 10, respectively. The second connection electrode 42 is electrically connected to the second end of the first transmission line 110 and the second end of the second transmission line 120 through two second connection vias extending through the first dielectric substrate 10, respectively. That is, the first transmission line 110 and the second transmission line 120 are disposed in the same layer, and are made of the same material: the first patch electrodes 21 and the second patch electrodes 22 are arranged in the same layer and made of the same material: the first connection electrode 41 and the second connection electrode 42 are disposed in the same layer and made of the same material. In this case, the first transmission line 110 and the second transmission line 120 may be formed through one patterning process, the first patch electrodes 21 and the second patch electrodes 22 are formed through one patterning process, and the first connection electrode 41 and the second connection electrode 42 are formed through one patterning process.

Further, in order to increase an overlapping area of the first transmission line 110 and the first patch electrodes 21, and an overlapping area of the second transmission line 120 and the second patch electrodes 22, the following technical solutions are provided.

Specifically, referring to FIGS. 2 and 3, the first transmission line 110 includes a first main line 111 and a plurality of first branches 112. The second transmission line 120 includes a second main line 121 and a plurality of second branches 122. The first main line 111 has a first end and a second end oppositely disposed in an extending direction of the first main line 111: the second main line 121 has a first end and a second end oppositely disposed in an extending direction of the second main line 121. The first end and the second end of the first main line 111 serve as the first end and the second end of the first transmission line 110, respectively: the first end and the second end of the second main line 121 serve as the first end and the second end of the second transmission line 120, respectively. First branches 112 are connected to at least one side of the extending direction of the first main line 111. At least some of the plurality of first branches 112 and the first patch electrodes 21 are arranged in a one-to-one correspondence, and orthographic projections of the first branches 112 and the first patch electrodes 21 corresponding to each other on the first dielectric substrate 10 at least partially overlap with each other. Second branches 122 are connected to at least one side of the extending direction of the second main line 121. At least some of the plurality of second branches 122 and the second patch electrodes 22 are arranged in a one-to-one correspondence, and orthographic projections of the second branches 122 and the second patch electrodes 22 corresponding to each other on the first dielectric substrate 10 at least partially overlap with each other.

In one example, as shown in FIGS. 1 to 3, the first main line 111 in the first transmission line 110 is provided with first branches 112 on both sides of the extending direction of the first main line 111 and in one-to-one correspondence with each other; orthographic projections of the first branches 112 corresponding to each other on the first dielectric substrate 10 at least partially overlap with an orthographic projection of the same first patch electrode 21 on the first dielectric substrate 10. Similarly, the second main line 121 in the second transmission line 120 is provided with second branches 122 on both sides of the extending direction of the second main line 121 and in one-to-one correspondence with each other: orthographic projections of the second branches 122 corresponding to each other on the first dielectric substrate 10 at least partially overlap with an orthographic projection of the same second patch electrode 22 on the first dielectric substrate 10.

Figure 8:
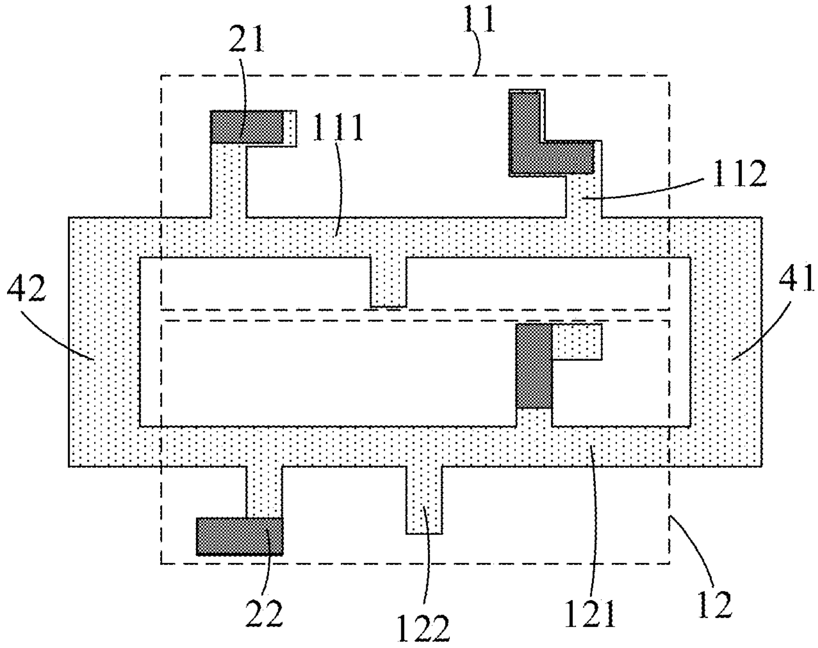
FIG. 8 is a schematic diagram of a structure of a phase shifter according to an embodiment of the present disclosure.
Figure 9:
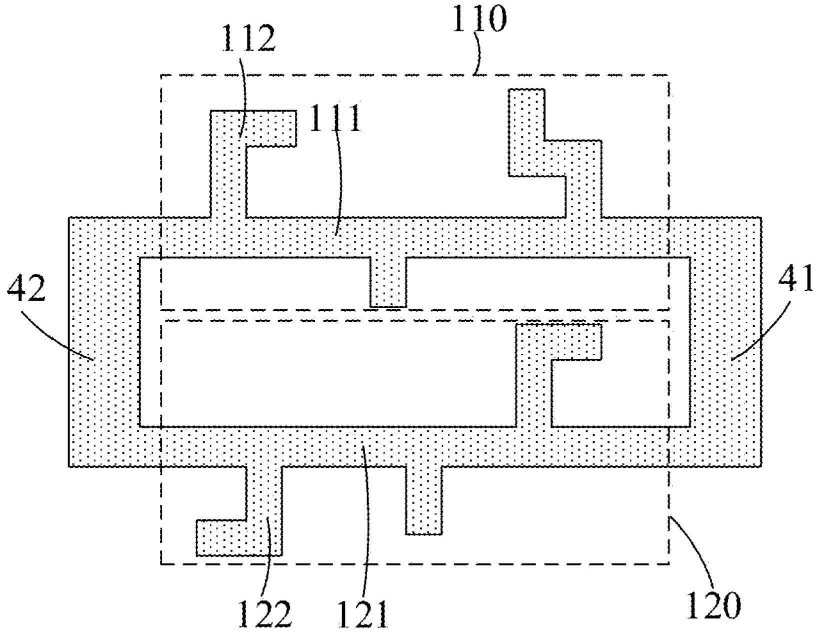
FIG. 9 is a schematic diagram of a first transmission line and a second transmission line in the phase shifter shown in FIG. 8.

In another example, FIG. 8 is a schematic diagram of another structure of a phase shifter according to an embodiment of the present disclosure. FIG. 9 is a schematic diagram of a first transmission line 110 and a second transmission line 120 in the phase shifter shown in FIG. 8. As shown in FIGS. 8 and 9, in the phase shifter, the first main line 111 in the first transmission line 110 is provided with first branches 112 on both sides of the extending direction of the first main line 111, and connection nodes between the first branches 112 and the first main line 111 (one connection position between each of the first branches 112 and the first main line 111 is equivalent to one connection node) are staggered. That is, the first branches 112 connected to both sides of the extending direction of the first main line 111 are staggered, other than in one-to-one correspondence with each other. Orthographic projections of at least part of the plurality of first branches 112 and the first patch electrodes 21 on the first dielectric substrate 10 overlap with each other. Similarly, the second main line 121 in the second transmission line 120 is provided with second branches 122 on both sides of the extending direction of the second main line 121, and connection nodes between the second branches 122 and the second main line 121 (one connection position between each of the second branches 122 and the second main line 121 is equivalent to one connection node) are staggered. That is, the second branches 122 connected to both sides of the extending direction of the second main line 121 are staggered, other than in one-to-one correspondence with each other. Orthographic projections of at least part of the plurality of second branches 122 and the second patch electrodes 22 on the first dielectric substrate 10 overlap with each other.

For example: referring to FIG. 8, only some of the first branches 112 and the first patch electrodes 21 are disposed in a one-to-one correspondence, and orthographic projections of the first branch 112 and the first patch electrode 21 corresponding to each other on the first dielectric substrate 10 at least partially overlap with each other. Similarly, only some of the second branches 122 and the second patch electrodes 22 are disposed in a one-to-one correspondence, and orthographic projections of the second branch 122 and the second patch electrode 22 corresponding to each other on the first dielectric substrate 10 at least partially overlap with each other.

With continued reference to FIG. 8, at least some of the first branches 112 connected to the first main line 111 have different shapes. Similarly, at least some of the second branches 122 connected to the second main line 121 have different shapes. In this case, by designing the first branches 112 and the second branches 122, capacitors formed by the first branches 112 and the first patch electrodes 21, and capacitors formed by the second branches 122 and the second patch electrodes 22 may be equivalent to variable capacitors, to adjust a phase shifting amount of the phase shifter.

It should be noted that only a few shapes of the first branches 112 and the second branches 122 are shown in FIG. 9, which does not limit the shapes of the first branches 112 and the second branches 122 in the embodiment of the present disclosure.

In some examples, regardless of any of the above structures, each of widths of the first and second connection electrodes 41 and 42 are smaller than a line width of the first main line 111 of the first transmission line 110. By selecting the first connection electrode 41 and the second connection electrode 42 having appropriate widths, a coupling efficiency of microwave signals of an antenna adopting the phase shifter can be effectively improved, and a transmission loss can be reduced.

It should be noted that the widths of the first connection electrode 41 and the second connection electrode 42 may be equal to each other or different from each other. In the embodiment of the present disclosure, as an example, the widths of the first connection electrode 41 and the second connection electrode 42 are equal to each other. A line width of the second main line 121 of the second transmission line 120 may be equal to the line width of the first main line 111 of the first transmission line 110. Alternatively, the line width of the second main line 121 may not be equal to the line width of the first main line 111, but the widths of the first connection electrode 41 and the second connection electrode 42 are both smaller than the line width of the second main line 121. In the embodiment of the present disclosure, as an example, the line widths of the first main line 111 and the second main line 121 are equal to each other.

Figure 10:
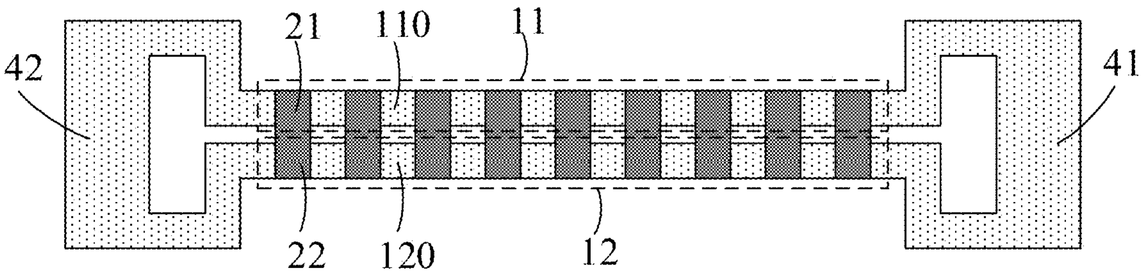
FIG. 10 is a schematic diagram of a structure of a phase shifter according to an embodiment of the present disclosure.

In some examples, FIG. 10 is a schematic diagram of another structure of a phase shifter according to an embodiment of the present disclosure. As shown in FIG. 10, in the phase shifter, the first patch electrodes 21 of the first phase shifting unit and the second patch electrodes 22 of the second phase shifting unit are arranged in a one-to-one correspondence, and the first patch electrodes 21 and second patch electrodes 22 corresponding to each other are connected together to have a one-piece structure.

Further, with continued reference to FIG. 10, the number of the first phase shifting units is one and the number of the second phase shifting units is one. At this time, a gap between the first transmission line 110 in the first phase shifting unit and the second transmission line 120 in the second phase shifting unit is smaller than the line width of the first transmission line 110. In this case, a strong coupling is formed between the first transmission line 110 and the second transmission line 120.

Further, the gap between the first transmission line 110 and the second transmission line 120 is small, so that in order to ensure that sizes of the first connection electrode 41 and the second connection electrode 42 satisfy the feed condition, the first end of the first transmission line 110 is electrically connected to the first connection electrode 41 through a first extension, and the second end of the first transmission line 110 is electrically connected to the second connection electrode 42 through a second extension. Similarly, the first end of the second transmission line 120 is electrically connected to the first connection electrode 41 through a third extension, and the second end of the second transmission line 120 is electrically connected to the second connection electrode 42 through a fourth extension.

Figure 11:
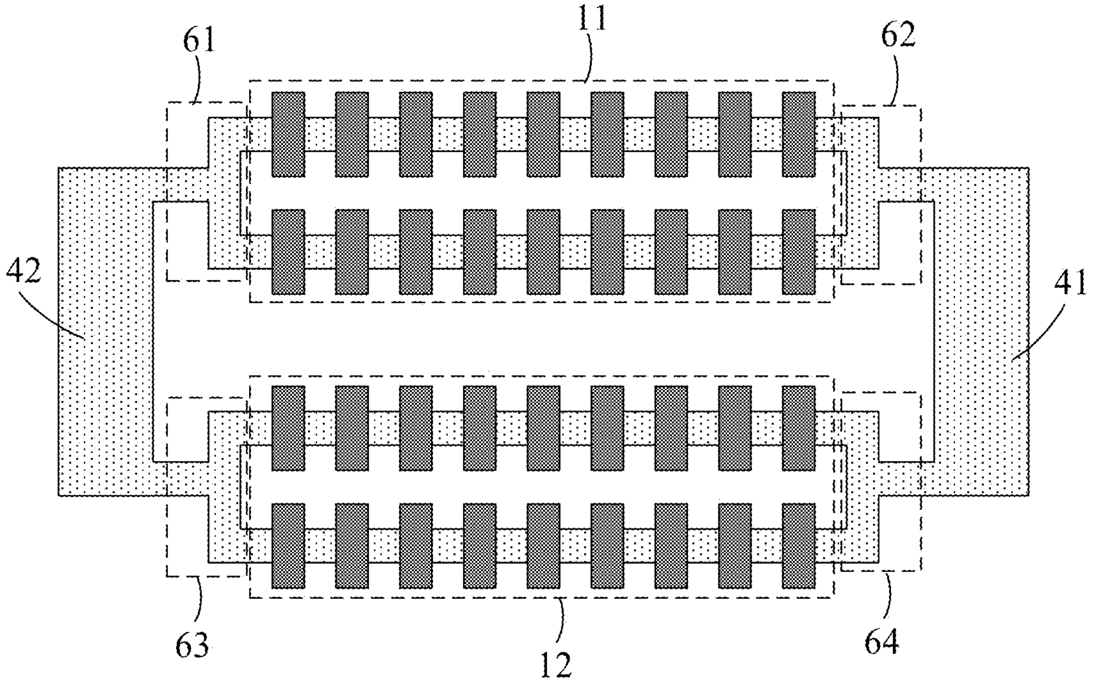
FIG. 11 is a schematic diagram of a structure of a phase shifter according to an embodiment of the present disclosure.

In some examples, FIG. 11 is a schematic diagram of another structure of a phase shifter according to an embodiment of the present disclosure. As shown in FIG. 11, the phase shifter includes a plurality of first phase shifting units and a plurality of second phase shifting units: in addition to the above structure, the phase shifter further includes a first combiner 61, a second combiner 62, a third combiner 63, and a fourth combiner 64; the first combiner 61 includes a first main path and a plurality of first branch paths electrically connected to the first main path: the second combiner 62 includes a second main path and a plurality of second branch paths electrically connected to the second main path: the third combiner 63 includes a third main path and a plurality of third branch paths electrically connected to the third main path: the fourth combiner 64 includes a fourth main path and a plurality of fourth branch paths electrically connected to the fourth main path: the first ends of the first transmission lines 110 in the first phase shifting units are connected to the first branch paths of the first combiner 61 in a one-to-one correspondence: the second ends of the first transmission lines 110 in the first phase shifting units are connected to the second branch paths of the second combiner 62 in a one-to-one correspondence: the first ends of the second transmission lines 120 in the second phase shifting units are connected to the third branch paths of the third combiner 63 in a one-to-one correspondence: the second ends of the second transmission lines 120 in the second phase shifting units are connected to the fourth branch paths of the fourth combiner 64 in a one-to-one correspondence: the first main path of the first combiner 61 and the third main path of the third combiner 63 are electrically connected to each other by the first connection electrode 41: the second main path of the second combiner 62 and the fourth main path of the fourth combiner 64 are electrically connected to each other by the second connection electrode 42.

For example: referring to FIG. 11, as an example, the phase shifter includes two first phase shifting units and two second phase shifting units, each first phase shifting unit includes the first transmission line 110 and the first patch electrodes 21, and each second phase shifting unit includes the second transmission line 120 and the second patch electrodes 22. The first combiner 61, the second combiner 62, the third combiner 63, and the fourth combiner 64 may all adopt a one-to-two power divider, such as a Balun combiner.

Figure 12:
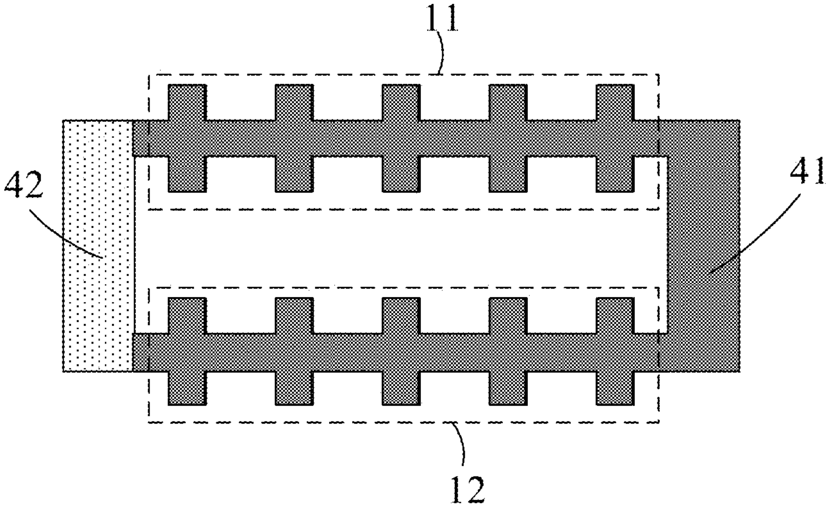
FIG. 12 is a schematic diagram of a structure of a phase shifter according to an embodiment of the present disclosure.
Figure 13:
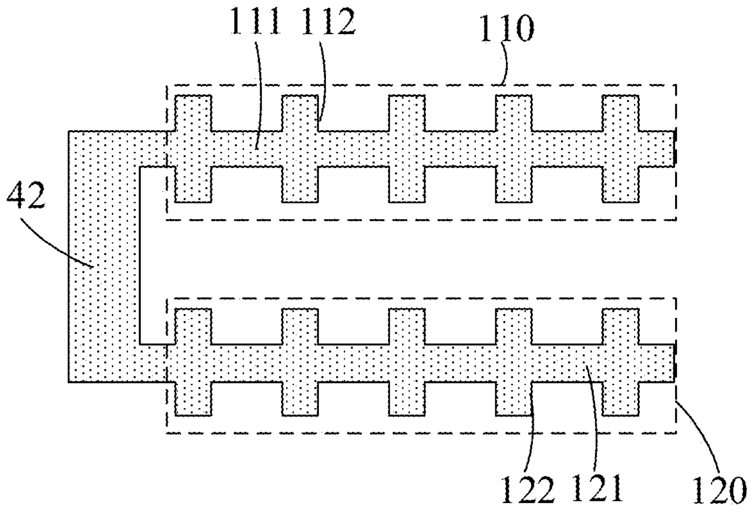
FIG. 13 is a schematic diagram of a first transmission line and a second transmission line in the phase shifter shown in FIG. 12.
Figure 14:
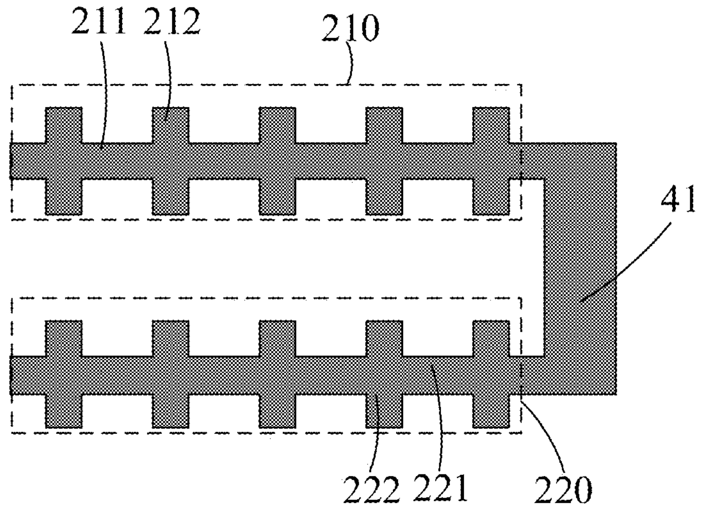
FIG. 14 is a schematic diagram of a third transmission line and a fourth transmission line in the phase shifter shown in FIG. 12.

In some examples, FIG. 12 is a schematic diagram of another structure of a phase shifter according to an embodiment of the present disclosure. FIG. 13 is a schematic diagram of a first transmission line 110 and a second transmission line 120 in the phase shifter shown in FIG. 12. FIG. 14 is a schematic diagram of a third transmission line 210 and a fourth transmission line 220 in the phase shifter shown in FIG. 12. As shown in FIGS. 12 to 14, in the phase shifter, the first phase shifting unit includes the first transmission line 110, a third transmission line 210, and the first tunable dielectric layer 31. The first transmission line 110 is arranged on a side of the first dielectric substrate 10 close to the second dielectric substrate 20, and the third transmission line 210 is arranged on a side of the second dielectric substrate 20 close to the first dielectric substrate 10: the first tunable dielectric layer 31 is disposed between a layer where the first transmission line 110 is located and a layer where the third transmission line 210 is located, and orthographic projections of the first transmission line 110 and the third transmission line 210 on the first dielectric substrate 10 at least partially overlap with each other. The second phase shifting unit includes the second transmission line 120, a fourth transmission line 220, and the second tunable dielectric layer 32: the second transmission line 120 is disposed on a side of the first dielectric substrate 10 close to the second dielectric substrate 20, and the fourth transmission line 220 is disposed on a side of the second dielectric substrate 20 close to the first dielectric substrate 10; the second tunable dielectric layer 32 is disposed between a layer where the second transmission line 120 is located and a layer where the fourth transmission line 220 is located, and orthographic projections of the second transmission line 120 and the fourth transmission line 220 on the first dielectric substrate 10 at least partially overlap with each other: the first transmission line 110, the second transmission line 120, the third transmission line 210 and the fourth transmission line 220 each have a first end and a second end oppositely disposed in the respective extending directions: the first end of the first transmission line 110 and the first end of the second transmission line 120 are electrically connected to each other through the first connection electrode 41: the second end of the third transmission line 210 and the second end of the fourth transmission line 220) are electrically connected to each other through the second connection electrode 42.

It should be noted that like in the above examples, in this example, the first and second tunable dielectric layers 31 and 32 may be composed of liquid crystal molecules, and thus may be a common liquid crystal layer 30.

Further, the phase shifter includes a first conductive layer 1 disposed on a side of the first dielectric substrate 10 close to the second dielectric substrate 20, and a second conductive layer 2 disposed on a side of the second dielectric substrate 20 close to the first dielectric substrate 10. The first transmission line 110, the second transmission line 120) and the first connection electrode 41 are located in the first conductive layer 1: the third transmission line 210, the fourth transmission line 220 and the second connection electrode 42 are located in the second conductive layer 2. That is, the first transmission line 110, the second transmission line 120, and the first connection electrode 41 are disposed in the same layer, and made of the same material: the third transmission line 210, the fourth transmission line 220 and the second connection electrode 42 are disposed in the same layer and made of the same material. In this case, the lightweight and thinness of the phase shifter can be advantageously realized. Alternatively, the first connection electrode 41 may also be disposed on a side of the first dielectric substrate 10) away from the second dielectric substrate 20. In this case, the first connection electrode 41 may be electrically connected to the first end of the first transmission line 110 and the first end of the second transmission line 120 through vias extending through the first dielectric substrate 10, respectively. Similarly, the second connection electrode 42 may also be disposed on a side of the second dielectric substrate 20 away from the first dielectric substrate 10. In this case, the second connection electrode 42 may be electrically connected to the second end of the third transmission line 210 and the second end of the fourth transmission line 220 through vias extending through the second dielectric substrate 20, respectively.

In some examples, in order to increase an overlapping area of the first transmission line 110 and the third transmission line 210, and an overlapping area of the second transmission line 120 and the fourth transmission line 220, the structures of the first transmission line 110, the second transmission line 120, the third transmission line 210, and the fourth transmission line 220 are designed.

Specifically, the first transmission line 110 includes the first main line 111 and the plurality of first branches 112, and the first branches 112 are connected to at least one side of the extending direction of the first main line 111. The first main line 111 has the first end and the second end disposed oppositely in the extending direction of the first main line 111, the first end of the first main line 111 serves as the first end of the first transmission line 110, that is, the first end of the first main line 111 is electrically connected to the first connection electrode 41.

The second transmission line 120 includes the second main line 121 and the plurality of second branches 122, and the second branches 112 are connected to at least one side of the extending direction of the second main line 111. The second main line 121 has the first end and the second end disposed oppositely in the extending direction of the second main line 121, the second end of the second main line 121 serves as the second end of the second transmission line 110, that is, the second end of the second main line 121 is electrically connected to the second connection electrode 42.

The third transmission line 210 includes a third main line 211 and a plurality of third branches 212, and the third branches 212 are connected to at least one side of an extending direction of the third main line 211. The third main line 211 has a first end and a second end disposed oppositely in the extending direction of the third main line 211, the first end of the third main line 121 serves as the first end of the third transmission line 110, that is, the first end of the third main line 211 is electrically connected to the first connection electrode 41.

The fourth transmission line 220 includes a fourth main line 221 and a plurality of fourth branches 222, and the fourth branches 222 are connected to at least one side of an extending direction of the fourth main line 221. The fourth main line 221 has a first end and a second end disposed oppositely in the extending direction of the fourth main line 221, the second end of the fourth main line 221 serves as the second end of the fourth transmission line 220, that is, the second end of the fourth main line 221 is electrically connected to the second connection electrode 42.

Orthographic projections of one first branch 112 and one third branch 212 on the first dielectric substrate 10 at least partially overlap with each other: Orthographic projections of one second branch 122 and one fourth branch 222 on the first dielectric substrate 10 at least partially overlap with each other. For example: the first branches 112 are provided on both sides of the extending direction of the first main line 111 and in one-to-one correspondence with each other: the third branches 212 are provided on both sides of the extending direction of the third main line 211 and in one-to-one correspondence with each other: the first branches 112 and the third branches 212 are in one-to-one correspondence with each other: orthographic projections of the first branch 112 and the third branch 212 corresponding to each other on the first dielectric substrate completely overlap with each other. Similarly, the second branches 122 are provided on both sides of the extending direction of the second main line 121 and in one-to-one correspondence with each other: the fourth branches 222 are provided on both sides of the extending direction of the fourth main line 221 and in one-to-one correspondence with each other: the second branches 122 and the fourth branches 222 are in one-to-one correspondence with each other: orthographic projections of the second branch 122 and the fourth branch 212 corresponding to each other on the first dielectric substrate 10 completely overlap with each other.

Further, the first main line 111 and the third main line 211 have the same width or substantially the same width, and the first connection electrode 41 has a width larger than the width of the first main line 111. The second main line 121 and the fourth main line 221 have the same width or substantially the same width, and the second connection electrode 42 has a width larger than the width of the second main line 121. By selecting the first connection electrode 41 and the second connection electrode 42 having appropriate widths, a coupling efficiency of microwave signals of an antenna adopting the phase shifter can be effectively improved, and a transmission loss can be reduced.

It should be noted that in FIGS. 12 to 14, as an example, only the first main line 111, the second main line 121, the third main line 211, and the fourth main line 221 have the same width. However, in an actual product, the widths of the first main line 111, the second main line 121, the third main line 211, and the fourth main line 221 may be different from each other, and may be specifically designed according to specific product requirements. Similarly, in FIGS. 12 to 14, as an example, only the first connection electrode 41 and the second connection electrode 42 have the same width. However, in an actual product, the widths of the first connection electrode 41 and the second connection electrode 42 may be different from each other, and may be specifically designed according to specific product requirements.

Figure 15:
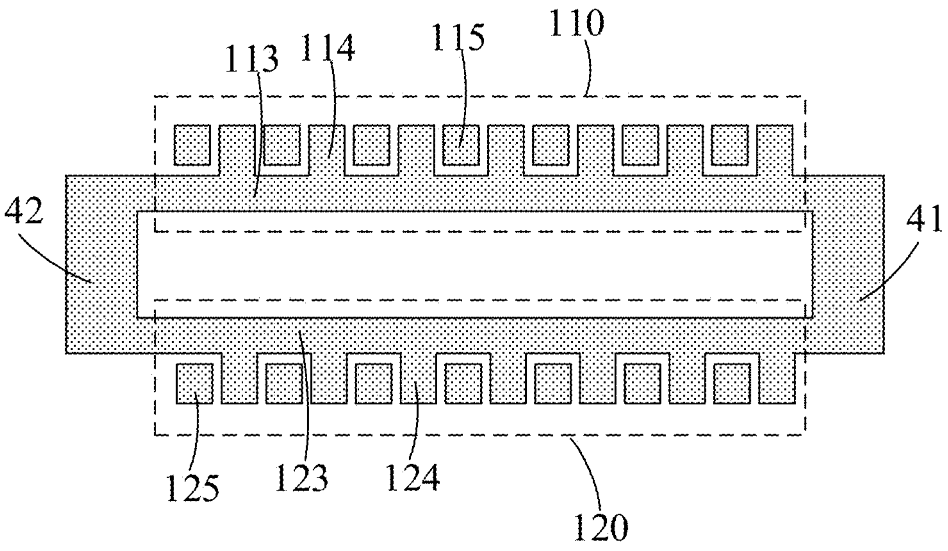
FIG. 15 is a schematic diagram of a structure of a phase shifter according to an embodiment of the present disclosure.

In some examples, FIG. 15 is a schematic diagram of another structure of a phase shifter according to an embodiment of the present disclosure. As shown in FIG. 15, the first phase shifting unit includes a fifth main line 113, a plurality of fifth branches 114, a plurality of third patch electrodes 115, and the first tunable dielectric layer 31: the plurality of fifth branches 114 are connected to one side of an extending direction of the fifth main line 113: the fifth main line 113, the plurality of fifth branches 114, and the plurality of third patch electrodes 115 are all disposed on the side of the first dielectric substrate 10 close to the second dielectric substrate 20, and orthographic projections of the plurality of third patch electrodes 115 and the plurality of fifth branches 114 on the first dielectric substrate 10 are alternately disposed. The first tunable dielectric layer 31 is disposed between the first dielectric substrate 10 and the second dielectric substrate 20. In this case, an electric field between the fifth branches 114 and the third patch electrodes 115 is formed by applying a first bias voltage to the fifth main line 113 and a second bias voltage to the third patch electrodes 115, to change the dielectric constant of the first tunable dielectric layer 31, thereby achieving the phase shifting of the microwave signal.

The second phase shifting unit includes a sixth main line 123, a plurality of sixth branches 124, a plurality of fourth patch electrodes 125, and the first tunable dielectric layer 31: the plurality of sixth branches 124 are connected to one side of an extending direction of the sixth main line 123: the sixth main line 123, the plurality of sixth branches 124 and the plurality of fourth patch electrodes 125 are all disposed on the side of the first dielectric substrate 10 close to the second dielectric substrate 20, and orthographic projections of the plurality of fourth patch electrodes 125 and the plurality of sixth branches 124 on the first dielectric substrate 10 are alternately disposed: the second tunable dielectric layer 32 is disposed between the first dielectric substrate 10 and the second dielectric substrate 20. In this case, an electric field between the sixth branches 124 and the fourth patch electrodes 125 is formed by applying a first bias voltage to the sixth main line 123 and a second bias voltage to the fourth patch electrodes 125, to change the dielectric constant of the second tunable dielectric layer 32, thereby achieving the phase shifting of the microwave signal.

The fifth main line 113 has a first end and a second end oppositely disposed in an extending direction of the fifth main line 113; and the sixth main line 123 has a first end and a second end oppositely disposed in an extending direction of the sixth main line 123. The first and second ends of the fifth main line 113 serve as the first and second ends of the first phase shifting unit, respectively, and the first and second ends of the sixth main line 123 serve as the first and second ends of the second phase shifting unit, respectively. That is, the first end of the fifth main line 113 and the first end of the sixth main line 123 are electrically connected to each other by the first connection electrode 41: the second end of the fifth main line 113 and the second end of the sixth main line 123 are electrically connected to each other by the second connection electrode 42.

In some examples, the phase shifter includes a first conductive layer 1 disposed on the side of the first dielectric substrate 10 close to the second dielectric substrate 20. The fifth main line 113, the fifth branches 114, the third patch electrodes 115, the sixth main line 123, the sixth branches 124, the fourth patch electrodes 125, the first connection electrode 41, and the second connection electrode 42 are all located in the first conductive layer 1. That is, the fifth main line 113, the fifth branches 114, the third patch electrodes 115, the sixth main line 123, the sixth branches 124, the fourth patch electrodes 125, the first connection electrode 41, and the second connection electrode 42 are located in the same layer. With the design, the lightweight and thinness of the phase shifter can be advantageously realized and the manufacturing process is simple, and the production cost can be reduced.

In some examples, the fifth main line 113 and the sixth main line 123 have the same width or substantially the same width. The width of each of the first and second connection electrodes 41 and 42 is greater than the width of the fifth main line 113. By selecting the first connection electrode 41 and the second connection electrode 42 having appropriate widths, a coupling efficiency of microwave signals of an antenna adopting the phase shifter can be effectively improved, and a transmission loss can be reduced. It should be noted that the widths of the first connection electrode 41 and the second connection electrode 42 may be equal to each other or different from each other, the widths of the fifth main line 113 and the sixth main line 123 may be equal to each other or different from each other. In the embodiment of the present disclosure, as an example, the widths of the first connection electrode 41 and the second connection electrode 42 are equal to each other, the widths of the fifth main line 113 and the sixth main line 123 are equal to each other, which does not limit the protection scope of the embodiment of the present disclosure.

Figure 16:
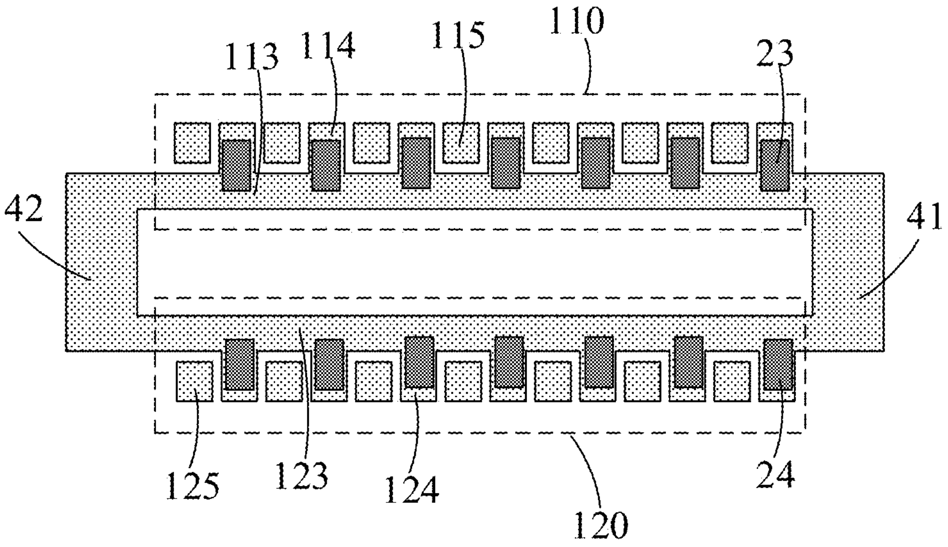
FIG. 16 is a schematic diagram of a structure of a phase shifter according to an embodiment of the present disclosure.

In some examples, FIG. 16 is a schematic diagram of another structure of a phase shifter according to an embodiment of the present disclosure. As shown in FIG. 16, unlike the phase shifter shown in FIG. 15, in addition to the above structure, the first phase shifting unit in the phase shifter further includes a plurality of fifth patch electrodes 23 disposed on the side of the second dielectric substrate 20 close to the first dielectric substrate 10. In addition to the above structure, the second phase shifting unit further includes a plurality of sixth patch electrodes 24 disposed on the side of the second dielectric substrate 20 close to the first dielectric substrate 10. Orthographic projections of a fifth patch electrode 23 and a fifth branch 114 corresponding to each other on the first dielectric substrate 10 at least partially overlap with each other. Orthographic projections of a sixth patch electrode 24 and a sixth branch 124 corresponding to each other on the first dielectric substrate 10 at least partially overlap with each other. In this case, when the fifth main line 113 and the sixth main line 123 are applied with the first bias voltage, the third patch electrodes 115 and the fourth patch electrodes 125 are applied with the second bias voltage, and the fifth patch electrodes 23 and the sixth patch electrodes 24 are applied with a third bias voltage, the fifth branches may form a horizontal electric field with the third patch electrodes 115 and a vertical electric field with the fifth patch electrodes 23, the dielectric constant of the first tunable dielectric layer 31 is changed under the driving of the mixed electric fields: the sixth branches may form a horizontal electric field with the fourth patch electrodes 125 and a vertical electric field with the sixth patch electrodes 24, and the dielectric constant of the second tunable dielectric layer 32 is changed under the driving of the mixed electric fields: thereby realizing the adjustment for the phase of the microwave signal. Since the first and second tunable dielectric layers 31 and 32 are both made of liquid crystal molecules, they may be the same layer.

In the above, only a few exemplary structures of the phase shifter are given, which does not limit the scope of the embodiment of the present disclosure. Any phase shifter having the ring circuit structure formed by the first phase shifting structure 11, the second phase shifting structure 12, the first connection electrode 41, and the second connection electrode 42 is within the scope of the embodiment of the present disclosure.

In a second aspect, an embodiment of the present disclosure provides an antenna, which includes the phase shifter. The first connection electrode 41 and the second connection electrode 42 in the phase shifter serve as not only the feed structure 200, but also a radiation electrode 83. The antenna in the embodiment of the present disclosure not only has a simple structure, but also can reduce loss. Meanwhile, the first phase shifting structure 11, the second phase shifting structure 12, the first connection electrode 41 and the second connection electrode 42 in the phase shifter form the ring circuit structure, so that the problem of mutual coupling between units is effectively avoided when the antenna is used in an antenna array.

The antenna in the embodiment of the present disclosure is described below with reference to specific examples. In the following examples, as an example, a structure of the phase shifter adopts only the phase shifter shown in FIG. 1. As an example, the first phase shifting structure 11 includes one first phase shifting unit, and the second phase shifting structure 12 includes only one second phase shifting structure 12. The first phase shifting unit includes the first transmission line 110 arranged on the side of the first dielectric substrate 10 close to the second dielectric substrate 20, the plurality of first patch electrodes 21 arranged on the side of the second dielectric substrate 20 close to the first dielectric substrate 10, and the first tunable dielectric layer 31 arranged between a layer where the first transmission line 110 is located and a layer where the first patch electrodes 21 are located: the second phase shifting unit includes the second transmission line 120 disposed on the side of the first dielectric substrate 10 close to the second dielectric substrate 20, the plurality of second patch electrodes 22 disposed on the side of the second dielectric substrate 20 close to the first dielectric substrate 10, and the second tunable dielectric layer 32 disposed between the layer where the second transmission line 120 is located and the layer where the second patch electrodes 22 are located. Specifically, the first transmission line 110 includes the first main line 111 and the plurality of first branches 112. The second transmission line 120 includes the second main line 121 and the plurality of second branches 122. The first main line 111 has the first end and the second end oppositely disposed in an extending direction of the first main line 111: the second main line 121 has the first end and the second end oppositely disposed in an extending direction of the second main line 121. The first end and the second end of the first main line 111 serve as the first end and the second end of the first transmission line 110, respectively: the first end and the second end of the second main line 121 serve as the first end and the second end of the second transmission line 120, respectively. The first main line 111 in the first transmission line 110 is provided with first branches 112 on both sides of the extending direction of the first main line 111 and in one-to-one correspondence: orthographic projections of the first branches 112 corresponding to each other on the first dielectric substrate 10 at least partially overlap with an orthographic projection of the same first patch electrode 21 on the first dielectric substrate 10. Similarly, the second main line 121 in the second transmission line 120 is provided with second branches 122 on both sides of the extending direction of the second main line 121 and in one-to-one correspondence with each other: orthographic projections of the second branches 122 corresponding to each other on the first dielectric substrate 10 at least partially overlap with an orthographic projection of the same second patch electrode 22 on the first dielectric substrate 10. It should be understood that the phase shifter in any one of the above embodiments may be applied to the antenna of the embodiments of the present disclosure, which is not listed here.

Figure 17:
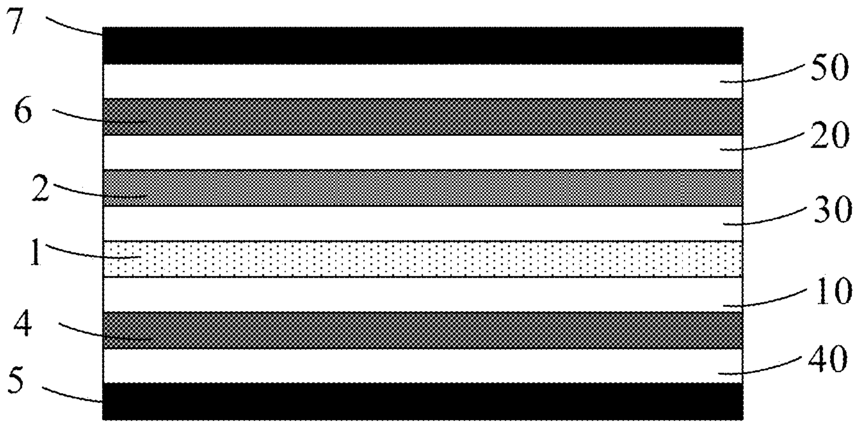
FIG. 17 is a schematic diagram illustrating layers of an antenna according to an embodiment of the present disclosure.
Figure 18:
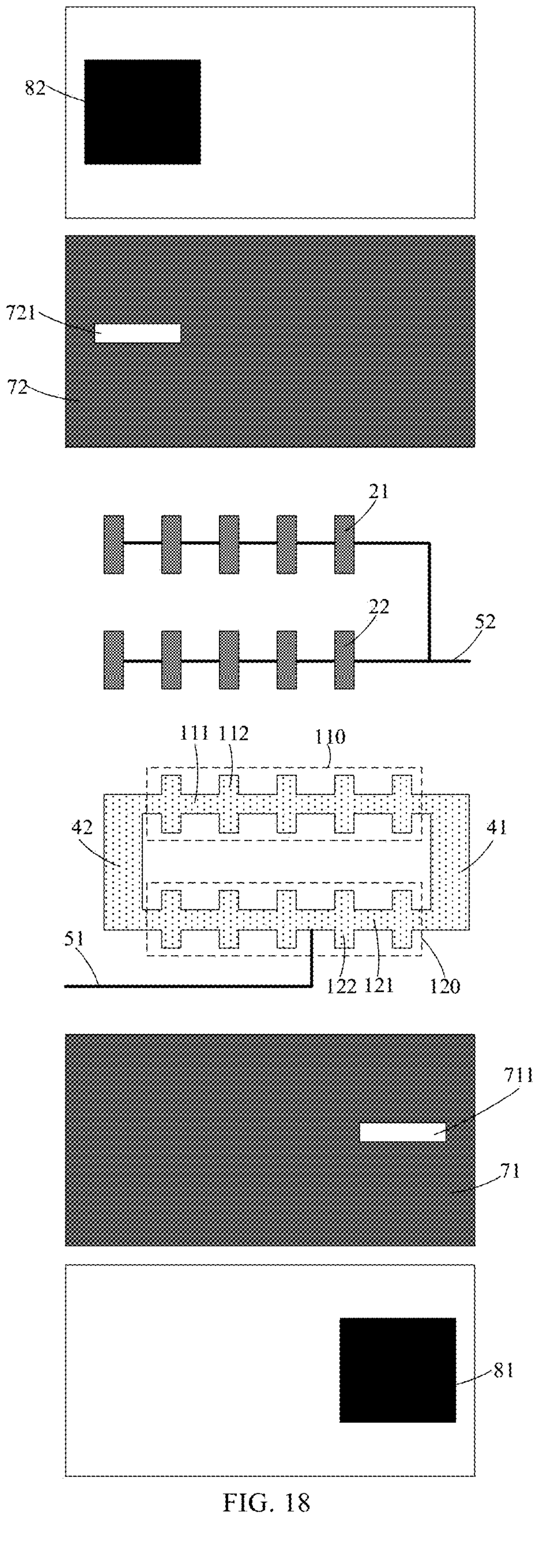
FIG. 18 is a schematic diagram illustrating main layers of the antenna shown in FIG. 17.

In a first example: FIG. 17 is a schematic diagram illustrating layers of an antenna according to an embodiment of the present disclosure. FIG. 18 is a schematic diagram illustrating main layers of the antenna shown in FIG. 17. As shown in FIGS. 17 and 18, the antenna is a transmission antenna, and includes the phase shifter, a third dielectric substrate 40, a fourth dielectric substrate 50, a first coupling layer 73, a second coupling layer 73, a first radiation electrode 81, and a second radiation electrode 82. The third dielectric substrate 40 is disposed on a side of the first dielectric substrate 10 away from the second dielectric substrate 20 of the phase shifter, the first coupling layer 73 is disposed on a side of the third dielectric substrate 40 close to the first dielectric substrate 10, and the first radiation electrode 81 is disposed on a side of the third dielectric substrate 40 away from the first dielectric substrate 10. The fourth dielectric substrate 50 is disposed on a side of the second dielectric substrate 20 away from the first dielectric substrate 10, the second coupling layer 72 is disposed on a side of the fourth dielectric substrate close to the second dielectric substrate 20, and the second radiation electrode 82 is disposed on a side of the fourth dielectric substrate 50 away from the second dielectric substrate 20. The first coupling layer 71 has a first opening therein and the second coupling layer 72 has a second opening therein. Orthographic projections of any two of the first opening, the first connection electrode 41 and the first radiation electrode 81 on the first dielectric substrate 10 at least partially overlap with each other; orthographic projections of any two of the second opening, the second connection electrode 42 and the second radiation electrode 82 on the first dielectric substrate 10 at least partially overlap with each other.

Specifically, as shown in FIG. 17, the antenna includes the first dielectric substrate 10, the second dielectric substrate 20, the third dielectric substrate 40, the fourth dielectric substrate 50, the first conductive layer 1, the second conductive layer 2, a fourth conductive layer 4, a fifth conductive layer 5, a sixth conductive layer 6, and a seventh conductive layer 7. The first conductive layer 1 includes the first transmission line 110, the second transmission line 120, the first connection electrode 41, and the second connection electrode 42 of the phase shifter: the second conductive layer 2 includes the first patch electrodes 21 and the second patch electrodes 22 of the phase shifter: the fourth conductive layer 4 includes the first coupling layer 71: the fifth conductive layer 5 includes the first radiation electrode 81: the sixth conductive layer 6 includes the second coupling layer 72: the seventh conductive layer 7 includes the second radiation electrode 82.

In some examples, each of the first radiation electrode 81 and the second radiation electrode 82 may be a patch electrode having any shape, and may also be a pixel surface, a vibrator, a conductor surface with a slit under radiation, or the like.

Figure 19:
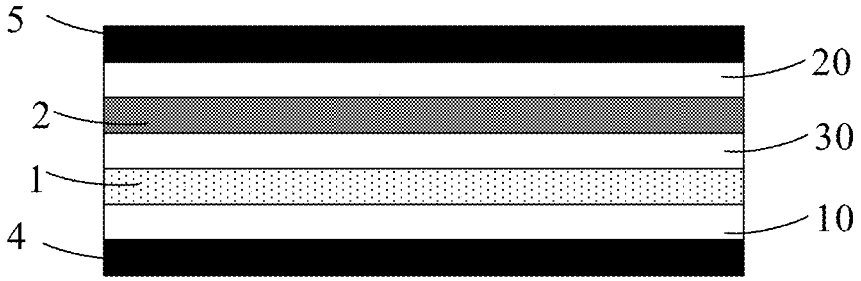
FIG. 19 is a schematic diagram illustrating layers of an antenna according to an embodiment of the present disclosure.
Figure 20:
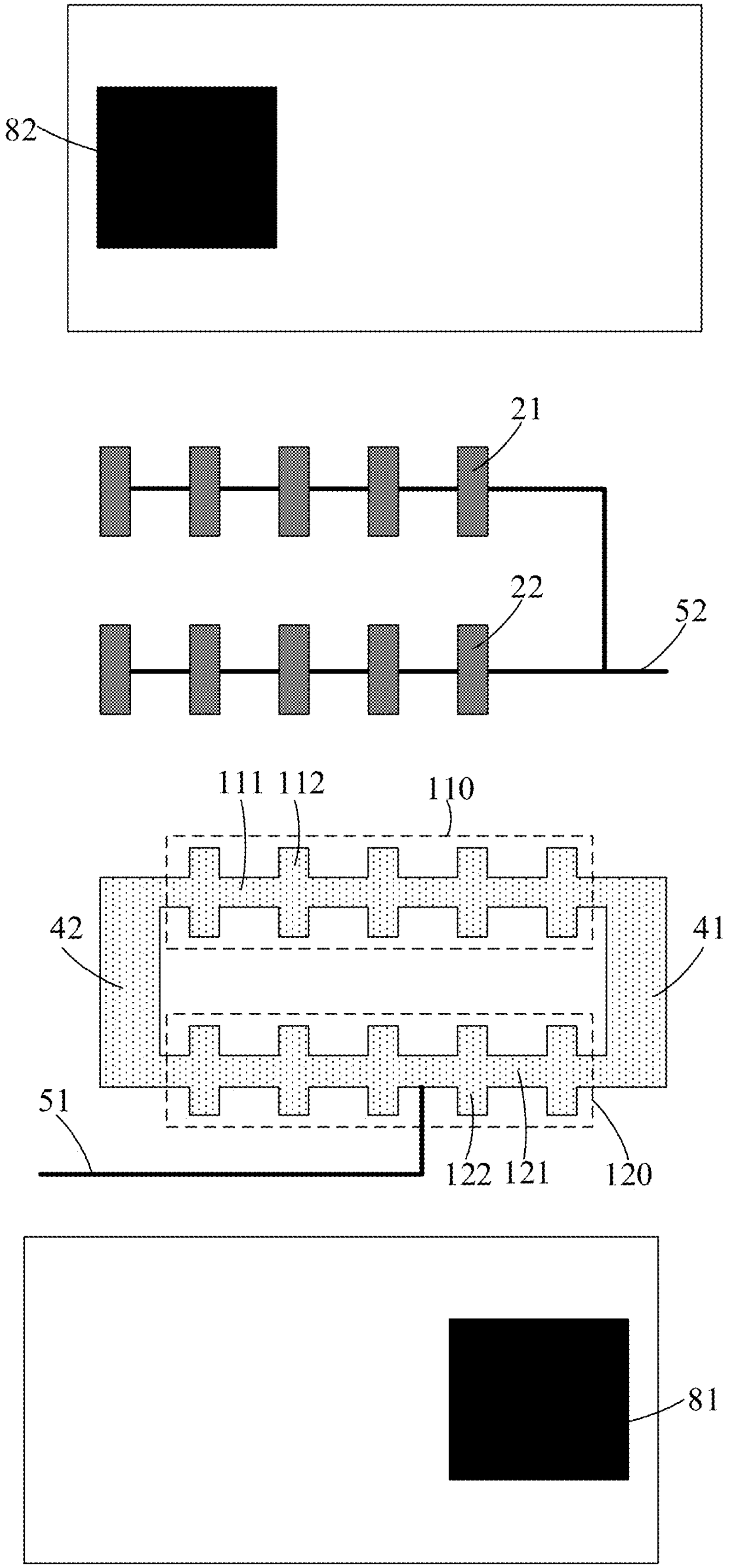
FIG. 20 is a schematic diagram illustrating main layers of the antenna shown in FIG. 19.

In a second example: FIG. 19 is another schematic diagram illustrating layers of an antenna according to an embodiment of the present disclosure. FIG. 20 is a schematic diagram illustrating main layers of the antenna shown in FIG. 19. As shown in FIGS. 19 and 20, the second example differs from the first example only in that the first coupling layer 71 and the second coupling layer 72 may not be provided in the antenna in the second example. The first radiation electrode 81 of the antenna is arranged on the side of the first dielectric substrate 10 away from the second dielectric substrate 20: an orthographic projection of the first radiation electrode 81 on the first dielectric substrate at least partially overlaps with an orthographic projection of the first connection electrode 41 in the phase shifter on the first dielectric substrate 10; the second radiation electrode 82 is arranged on the side of the second dielectric substrate 20 away from the first dielectric substrate 10: an orthographic projection of the second radiation electrode 82 on the first dielectric substrate 10 at least partially overlaps with an orthographic projection of the second connection electrode 42 in the phase shifter on the first dielectric substrate 10. That is, the first connection electrode 41 in the phase shifter is directly coupled to the first radiation electrode 81, and the second connection electrode 42 is directly coupled to the second radiation electrode 82.

Figure 21:
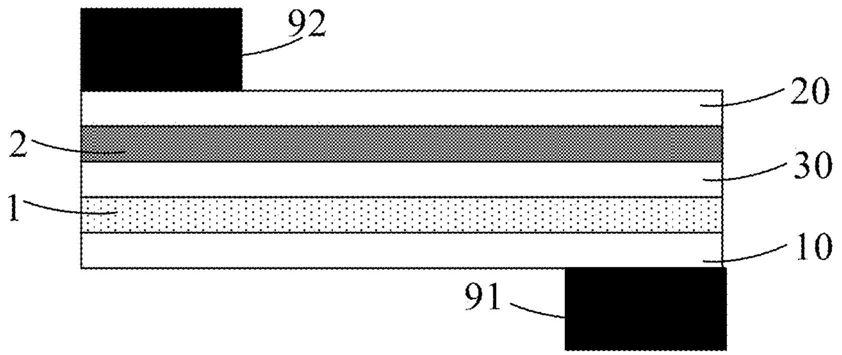
FIG. 21 is a schematic diagram illustrating layers of an antenna according to an embodiment of the present disclosure.
Figure 22:
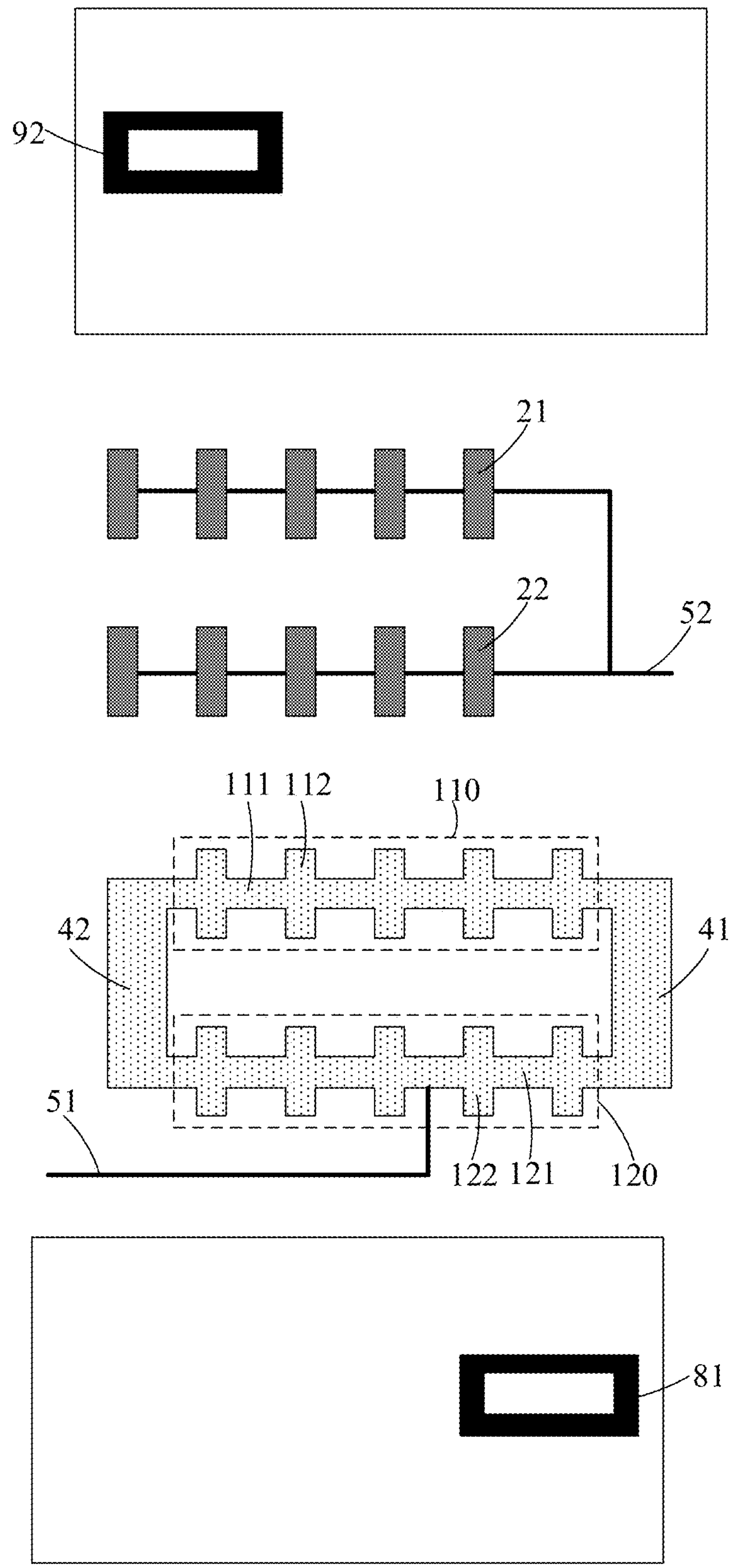
FIG. 22 is a schematic diagram illustrating main layers of the antenna shown in FIG. 21.

In a third example: FIG. 21 is another schematic diagram illustrating layers of an antenna according to an embodiment of the present disclosure. FIG. 22 is a schematic diagram illustrating main layers of the antenna shown in FIG. 21. As shown in FIGS. 21 and 22, the structure in the third example is substantially the same as that in the second example, except that the first and second radiation electrodes 81 and 82 in the second example are replaced with a first waveguide structure 91 and a second waveguide structure 92 in the antenna in the third example. That is, the first waveguide structure 91 is disposed on the side of the first dielectric substrate 10 away from the second dielectric substrate 20, an orthographic projection of a first waveguide port of the first waveguide structure 91 on the first dielectric substrate 10 at least partially overlaps with the orthographic projection of the first connection electrode 41 on the first dielectric substrate 10; the second waveguide structure 92 is arranged on the side of the second dielectric substrate 20 away from the first dielectric substrate 10; an orthographic projection of a second waveguide port of the second waveguide structure 92 on the first dielectric substrate 10 at least partially overlaps with the orthographic projection of the second connection electrode 42 on the first dielectric substrate 10.

In some examples, the first waveguide structure 91 and the second waveguide structure 92 may each employ a metal waveguide, a substrate integrated waveguide, a resonant cavity, or the like.

Figure 23:
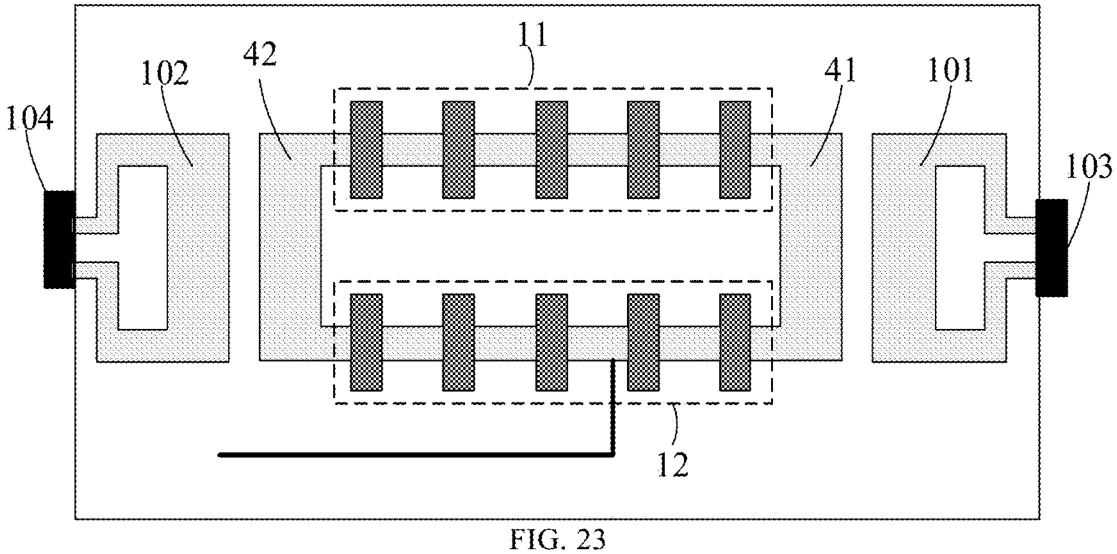
FIG. 23 is a schematic diagram of a structure of an antenna according to an embodiment of the present disclosure.

FIG. 23 is a schematic diagram of another structure of an antenna according to an embodiment of the present disclosure. As shown in FIG. 23, in the embodiment of the present disclosure, no matter which structure is adopted by the antenna, the antenna of the embodiment of the present disclosure may further include a first coupling structure 101 and a second coupling structure 102: the first coupling structure 101 is coupled to the first connection electrode 41: the second coupling structure 102 is coupled to the second connection electrode 42. External devices are connected to the first coupling structure 101 and the second coupling structure 102 via a first port 103 and a second port 104, respectively, for applying an external signal to the phase shifter.

For example: the first coupling structure, the second coupling structure, the first connection electrode 41, and the second connection electrode 42 are disposed in the same layer. Alternatively, the first coupling structure and the first connection electrode 41 may also be disposed in different layers, and the second coupling structure and the second connection electrode 42 may also be disposed in different layers.

Figure 24:
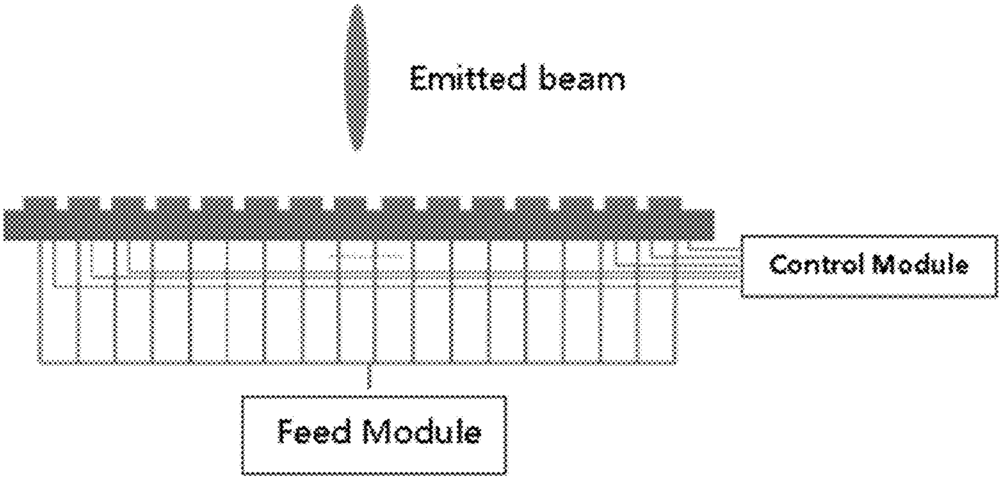
FIG. 24 is a schematic diagram of an antenna array according to an embodiment of the present disclosure.
Figure 25:
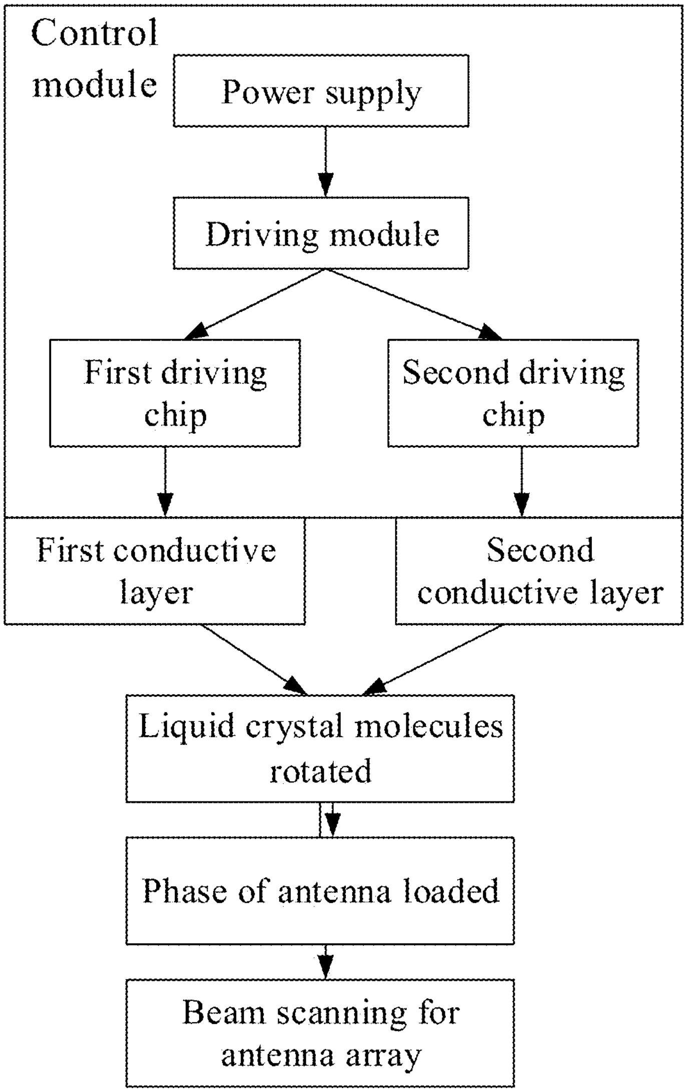
FIG. 25 is a flowchart illustrating scanning of the antenna array shown in FIG. 24.

Accordingly, the embodiment of the present disclosure provides an antenna array. FIG. 24 is a schematic diagram of an antenna array according to an embodiment of the present disclosure. FIG. 25 is a flowchart illustrating scanning of the antenna array shown in FIG. 24. As shown in FIGS. 24 and 25, the antenna array includes a plurality of antennas, each of which is the antenna in the above embodiment, a feed module and a control module. The plurality of antennas are arranged according to a certain period, a first connecting part and a second connecting part of each antenna are respectively connected to an output end of a power divider network through leads, and an input end of the power divider network is connected to the feed module. At a certain time, if a wave beam is required to be emitted towards a specified direction, each antenna needs to be loaded with different phases according to a theoretical calculation formula of a phased array. A voltage output by a power supply in the control module is output to a voltage transformation and driving module, and then is output to a first driving chip and a second driving chip, and the first driving chip and the second driving chip load voltages to the first conductive layer 1 and the second conductive layer 2 through the first driving line 51 and the second driving line 52 electrically connected to the first driving line and the second driving line, respectively, so that the liquid crystal layer 30 is rotated, and phase loading of each antenna is realized. At the next moment, if energy needs to be radiated toward other directions, the phase is assigned in the same way. In this way, a direction of the emitted beam can be dynamically adjusted, and the beam scanning is finished.

Figure 26:
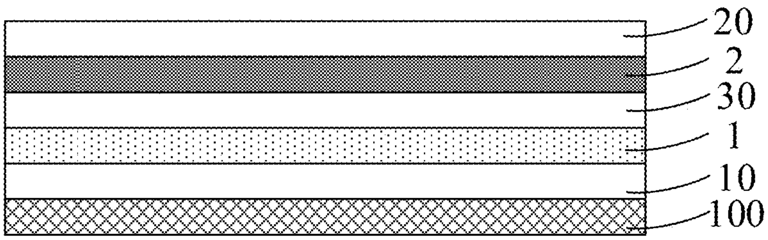
FIG. 26 is a schematic diagram illustrating layers of an antenna according to an embodiment of the present disclosure.
Figure 27:
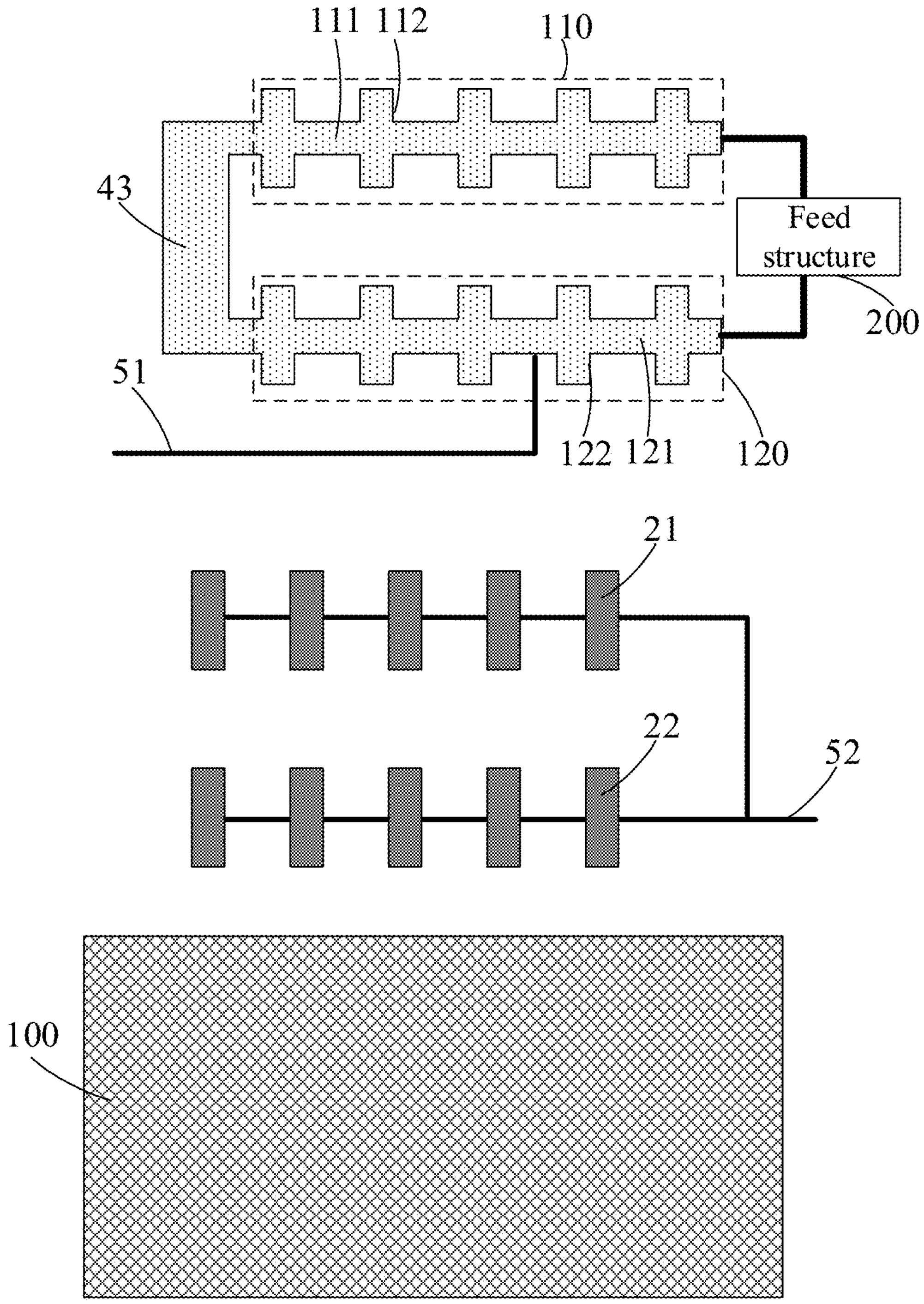
FIG. 27 is a schematic diagram illustrating main layers of the antenna shown in FIG. 26.

In a third aspect, an embodiment of the present disclosure provides an antenna. FIG. 26 is a schematic diagram illustrating layers of an antenna according to an embodiment of the present disclosure. FIG. 27 is a schematic diagram illustrating main layers of the antenna shown in FIG. 26. As shown in FIGS. 26 and 27, the antenna includes the phase shifter, a reference electrode layer 100 and a feed structure 200. The phase shifter includes the first dielectric substrate 10 and the second dielectric substrate opposite to each other, a connection electrode 43, and the first phase shifting structure 11 and the second phase shifting structure 12 between the first dielectric substrate 10 and the second dielectric substrate 20. The reference electrode layer 100 is disposed on the side of the first dielectric substrate 10 away from the second dielectric substrate 20. The first phase shifting structure and the second phase shifting structure 12 each have the first end and the second end: the first end of the first phase shifting structure and the first end of the second phase shifting structure 12 are electrically connected to each other through the connection electrode 43, the second end of the first phase shifting structure and the second end of the second phase shifting structure 12 are electrically connected to each other through the feed structure 200, to form a ring circuit structure. The first phase shifting structure 11 and the second phase shifting structure 12 have opposite transmission directions for microwave signals.

In the embodiment of the present disclosure, the first end of the first phase shifting structure 11 and the first end of the second phase shifting structure 12 are electrically connected to each other through the connection electrode 43, the second end of the first phase shifting structure 11 and the second end of the second phase shifting structure 12 are electrically connected to each other through the feed structure 200, to form the ring circuit structure, so that the mutual coupling between antennas can be effectively avoided when the antenna is used for forming the antenna array. Meanwhile, the first end of the first phase shifting structure 11 and the first end of the second phase shifting structure 12 of the phase shifter are electrically connected to each other through the connection electrode 43, the connection electrode 43 may also be used as the feed structure 200 and/or the radiation electrode 83, so that the structure of the antenna is more compact, which is beneficial to realizing a miniaturization of the antenna.

In some examples, the feeding mode of the feed structure 200 includes, but is not limited to, any one of a direct feeding mode, a waveguide coupling feeding mode, and a microstrip coupling feeding mode.

Figure 28:
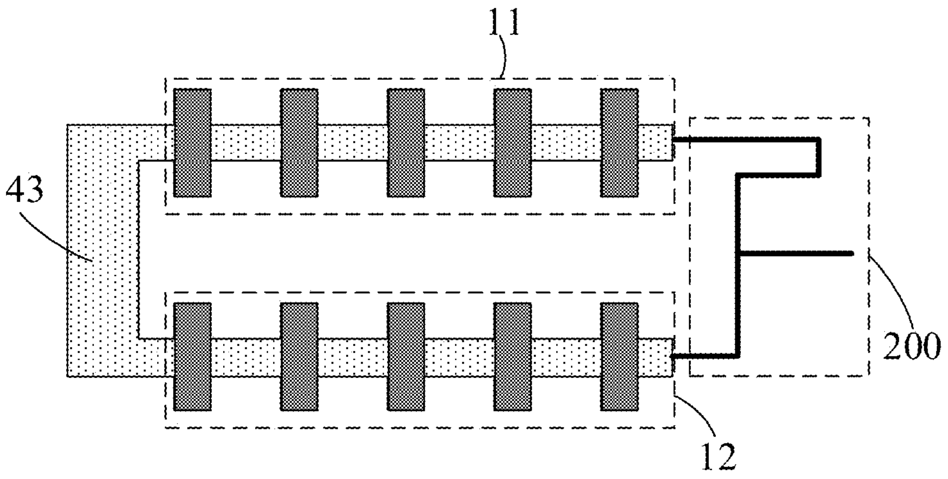
FIG. 28 is a schematic diagram of an antenna in a direct feeding mode according to an embodiment of the present disclosure.

Specifically, FIG. 28 is a schematic diagram of an antenna using a direct feeding mode according to an embodiment of the present disclosure. As shown in FIG. 28, when the feeding mode of the feed structure 200 is the direct feeding mode, the feed structure 200 may include a one-to-two power divider, where two branches of the one-to-two power divider have different line lengths and a phase difference of 90° therebetween and are electrically connected to the second end of the first phase shifting structure 11 and the second end of the second phase shifting structure 12, respectively. For example: the one-to-two power divider has a Balun structure.

Figure 29:
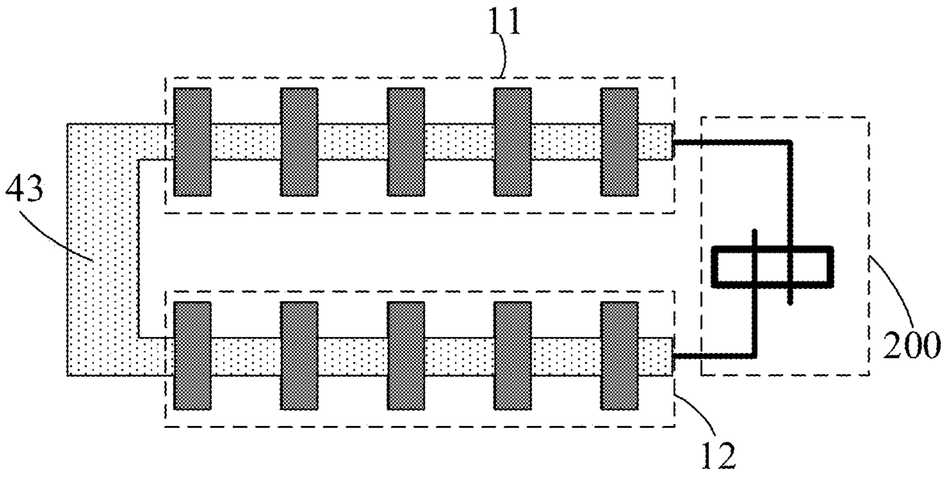
FIG. 29 is a schematic diagram of an antenna in a waveguide coupling feeding mode according to an embodiment of the present disclosure.

FIG. 29 is a schematic diagram of an antenna using a waveguide coupling feeding mode according to an embodiment of the present disclosure. As shown in FIG. 29, when the feeding mode of the feed structure 200 is the waveguide coupling feeding mode, the feed structure 200 may include a coupling waveguide. The coupling waveguide may be arranged on the side of the second dielectric substrate 20 away from the first dielectric substrate 10. The second end of the first phase shifting structure 11 and the second end of the second phase shifting structure 12 are electrically connected to a first delay line and a second delay line, respectively, and an orthographic projection of each of the first delay line and the second delay line on the first dielectric substrate 10 at least partially overlaps with an orthographic projection of a waveguide port of the coupling waveguide on the first dielectric substrate 10, so that the microwave signal is conveniently fed into the phase shifter.

Figure 30:
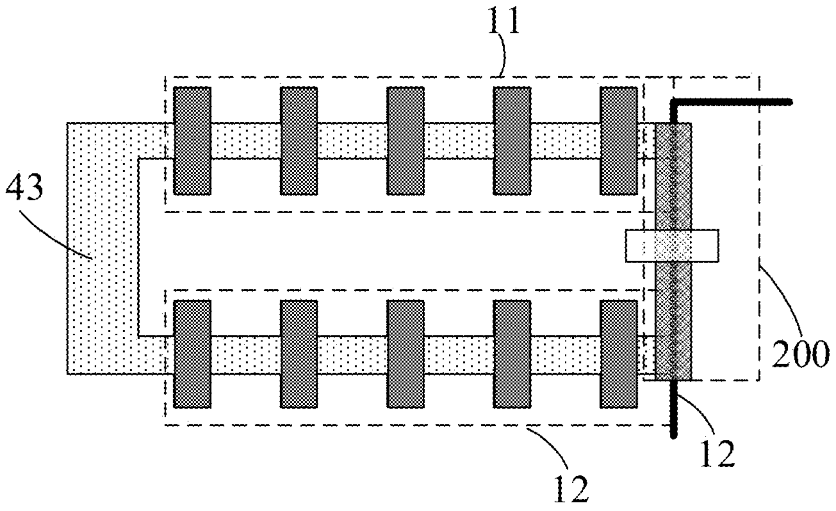
FIG. 30 is a schematic diagram of an antenna in a microstrip coupling feeding mode according to an embodiment of the present disclosure.

FIG. 30 is a schematic diagram of an antenna using a microstrip coupling feeding mode according to an embodiment of the present disclosure. As shown in FIG. 30, when the feeding mode of the feed structure 200 is the microstrip coupling feeding mode, the feed structure 200 may include a microstrip line, a first transmission electrode, and a second transmission electrode: the microstrip line is electrically connected to the second end of the first phase shifting structure 11 and the second end of the second phase shifting structure 12, the first transmission electrode is disposed on the side of the second dielectric substrate 20 close to the first dielectric substrate 10, and the second transmission electrode is disposed on the side of the second dielectric substrate 20 away from the first dielectric substrate 10. A transmission opening is arranged in the first transmission electrode, and orthographic projections of any two of the transmission opening, the microstrip line and the second transmission electrode on the first dielectric substrate 10 overlap with each other.

The first phase shifting structure 11 and the second phase shifting structure 12 in the embodiment of the present disclosure may both adopt the same structure in the phase shifter, and therefore, the description thereof is not repeated herein. In the embodiment of the present disclosure, as an example, only the first phase shifting structure 11 includes one first phase shifting unit, and the second phase shifting structure 12 includes only one second phase shifting structure 12. The first phase shifting unit includes the first transmission line 110 arranged on the side of the first dielectric substrate 10 close to the second dielectric substrate 20, the plurality of first patch electrodes 21 arranged on the side of the second dielectric substrate 20 close to the first dielectric substrate 10, and the first tunable dielectric layer 31 arranged between the layer where the first transmission line 110 is located and the layer where the first patch electrodes 21 are located: the second phase shifting unit includes the second transmission line 120) disposed on the side of the first dielectric substrate 10 close to the second dielectric substrate 20, the plurality of second patch electrodes 22 disposed on the side of the second dielectric substrate 20 close to the first dielectric substrate 10, and the second tunable dielectric layer 32 disposed between the layer where the second transmission line 120 is located and the layer where the second patch electrodes 22 are located. Specifically, the first transmission line 110 includes the first main line 111 and the plurality of first branches 112. The second transmission line 120 includes the second main line 121 and the plurality of second branches 122. The first main line 111 has the first end and the second end disposed oppositely in the extending direction of the first main line 111. The second main line 121 has the first end and the second end disposed oppositely in the extending direction of the second main line 121. The first end and the second end of the first main line 111 serve as the first end and the second end of the first transmission line 110, respectively: the first end and the second end of the second main line 121 serve as the first end and the second end of the second transmission line 120, respectively. The first main line 111 in the first transmission line 110 is provided with first branches 112 on both sides of the extending direction of the first main line 111 and in one-to-one correspondence with each other: orthographic projections of the first branches 112 corresponding to each other on the first dielectric substrate 10 at least partially overlap with an orthographic projection of the same first patch electrode 21 on the first dielectric substrate 10. Similarly, the second main line 121 in the second transmission line 120 is provided with second branches 122 on both sides of the extending direction of the second main line 121 and in one-to-one correspondence with each other: orthographic projections of the second branches 122 corresponding to each other on the first dielectric substrate 10 at least partially overlap with an orthographic projection of the same second patch electrode 22 on the first dielectric substrate 10.

The antenna in the embodiment of the present disclosure is described below with reference to specific examples. In the following examples, as an example, a structure of the phase shifter adopts only the phase shifter shown in FIG. 1. However, it should be understood that any of the above phase shifters may be applied to the antenna according to the embodiment of the present disclosure, which is not listed here.

Figure 31:
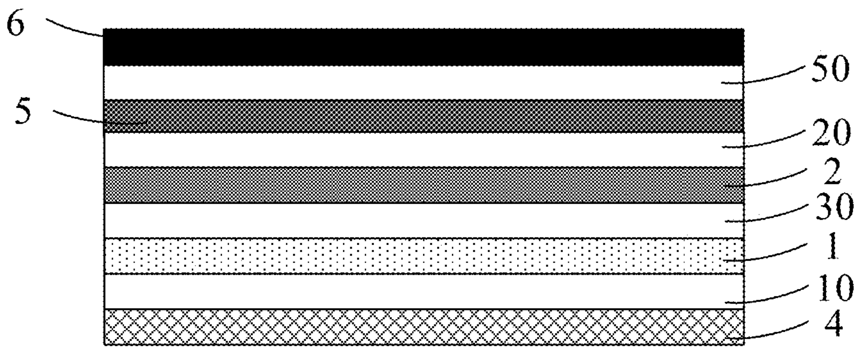
FIG. 31 is a schematic diagram illustrating layers of an antenna according to an embodiment of the present disclosure.
Figure 32:
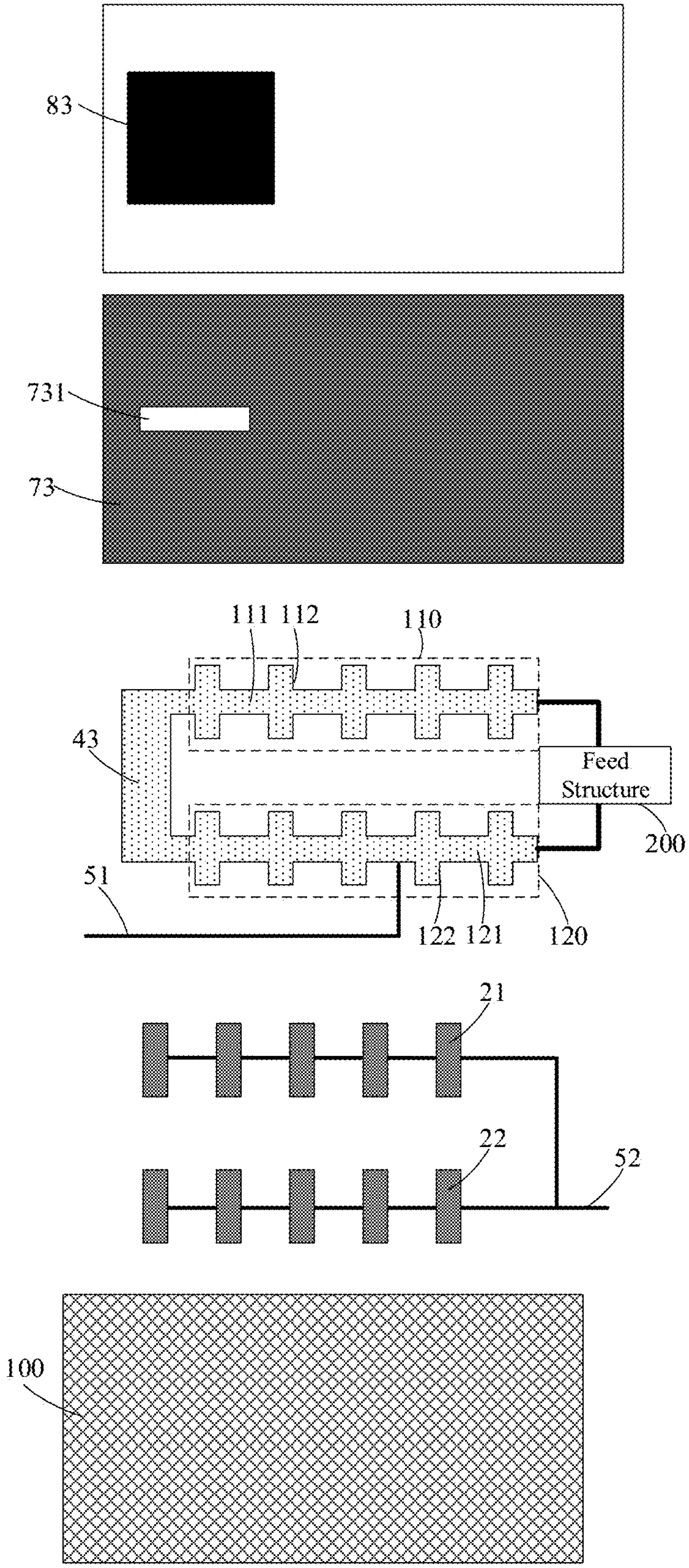
FIG. 32 is a schematic diagram illustrating main layers of the antenna shown in in FIG. 31.

In a first example: FIG. 31 is another schematic diagram illustrating layers of an antenna according to an embodiment of the present disclosure. FIG. 32 is a schematic diagram illustrating main layers of the antenna shown in in FIG. 31. As shown in FIGS. 31 and 32, the antenna is a transmission antenna including a phase shifter, a fifth dielectric substrate, a coupling layer 73, a radiation electrode 83, and a reference electrode layer 100. The fifth dielectric substrate is arranged on the side of the second dielectric substrate 20 away from the first dielectric substrate 10, the coupling layer 73 is arranged on a side of the fifth dielectric substrate close to the second dielectric substrate 20, and the radiation electrode 83 is arranged on a side of the fifth dielectric substrate away from the second dielectric substrate 20: the coupling layer 73 has an opening therein: orthographic projections of any two of the opening, the connection electrode 43, and the radiation electrode 83 on the first dielectric substrate 10 at least partially overlap with each other.

Specifically, as shown in FIG. 31, the antenna includes the first dielectric substrate 10, the second dielectric substrate 20, the fifth dielectric substrate, the first conductive layer 1, the second conductive layer 2, the fourth conductive layer 4, the fifth conductive layer 5, and the sixth conductive layer 6. The first conductive layer 1 includes the first transmission line 110, the second transmission line 120, and the connection electrode 43 of the phase shifter: the second conductive layer 2 includes the first patch electrodes 21 and the second patch electrodes 22 of the phase shifter: the fourth conductive layer 4 includes the reference electrode layer 100; the fifth conductive layer 5 includes the coupling layer 73: the sixth conductive layer 6 includes the radiation electrode 83.

In some examples, the radiation electrode 83 may be a patch electrode having any shape, and may also be a pixel surface, a vibrator, a conductor surface with a slit under radiation, or the like.

Figure 33:
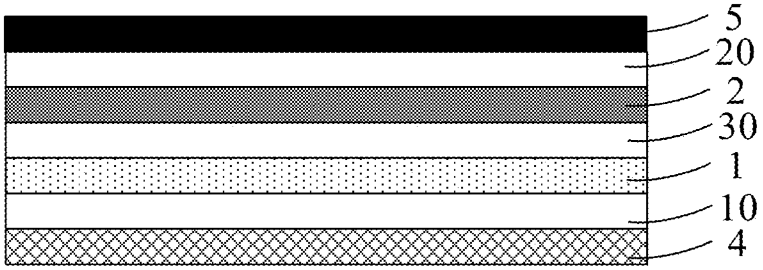
FIG. 33 is a schematic diagram illustrating layers of an antenna according to an embodiment of the present disclosure.
Figure 34:
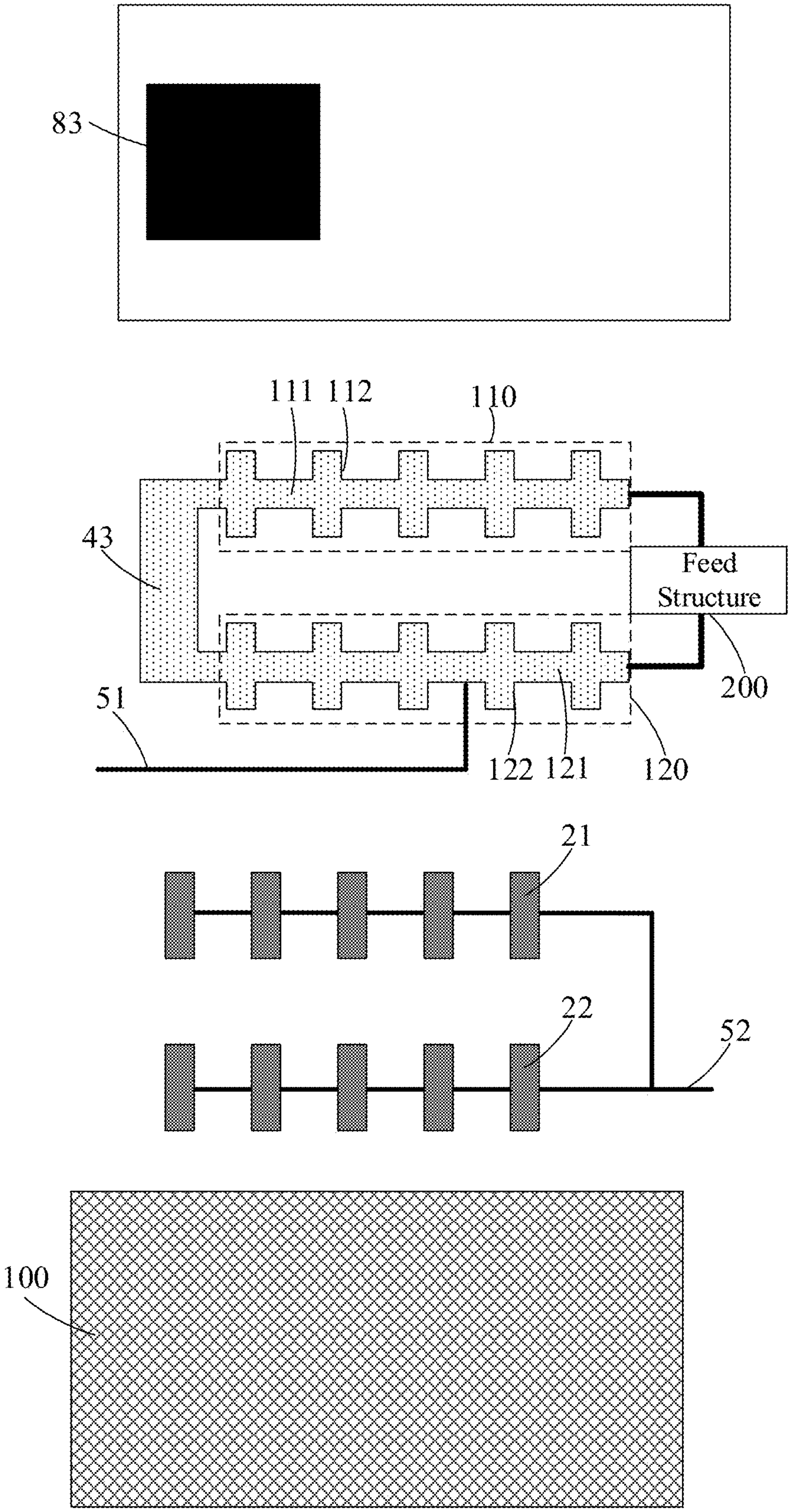
FIG. 34 is a schematic diagram illustrating main layers of the antenna shown in FIG. 31.

In a second example: FIG. 33 is another schematic diagram illustrating layers of an antenna according to an embodiment of the present disclosure. FIG. 34 is a schematic diagram illustrating main layers of the antenna shown in FIG. 31. As shown in FIGS. 33 and 34, the second example differs from the first example only in that the coupling layer 73 may not be provided in the antenna in the second example. The radiation electrode 83 of the antenna is arranged on the side of the second dielectric substrate 20 away from the first dielectric substrate 10. An orthographic projection of the radiation electrode 83 on the first dielectric substrate 10 at least partially overlaps with an orthographic projection of the connection electrode 43 in the phase shifter on the first dielectric substrate 10. That is, the connection electrode 43 in the phase shifter is directly coupled to the radiation electrode 83.

Figure 35:
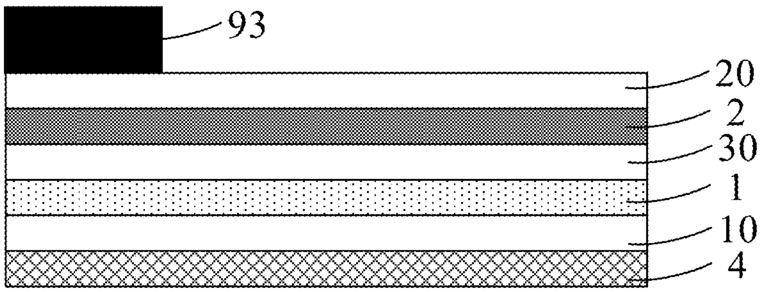
FIG. 35 is a schematic diagram illustrating layers of an antenna according to an embodiment of the present disclosure.
Figure 36:
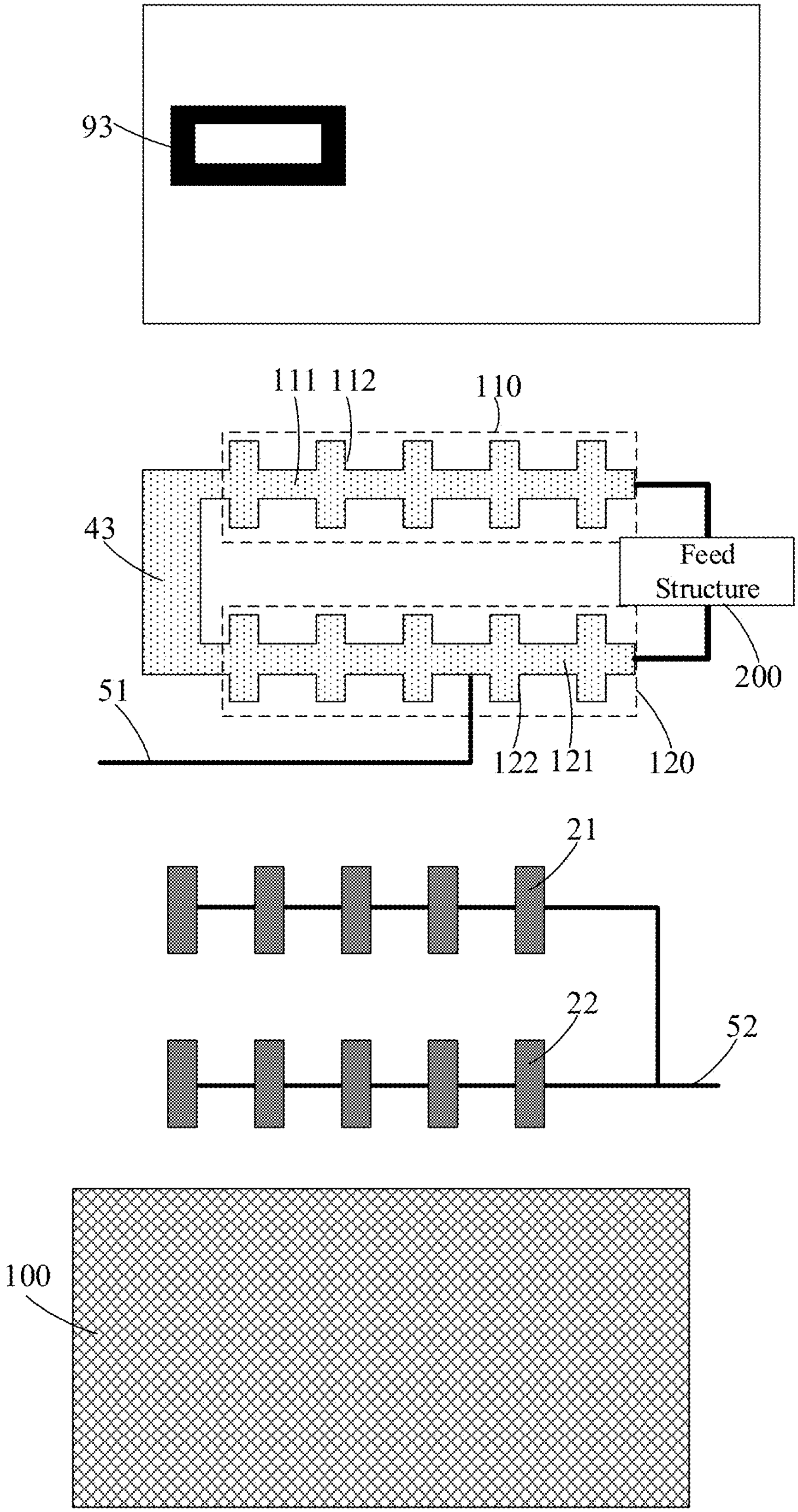
FIG. 36 is a schematic diagram illustrating main layers of the antenna shown in FIG. 35.

In a third example: FIG. 35 is another schematic diagram illustrating layers of an antenna according to an embodiment of the present disclosure. FIG. 36 is a schematic diagram illustrating main layers of the antenna shown in FIG. 35. As shown in FIGS. 35 and 36, the structure in the third example is substantially the same as that in the second example, except that the radiation electrode 83 in the second example is replaced with a waveguide structure 93 in the antenna in the third example. That is, the waveguide structure 93 is disposed on the side of the second dielectric substrate 20 away from the first dielectric substrate 10, an orthographic projection of a waveguide port of the waveguide structure 93 on the first dielectric substrate 10 at least partially overlaps with an orthographic projection of the connection electrode 43 on the first dielectric substrate 10.

In some examples, the waveguide structure 93 may employ a metal waveguide, a substrate integrated waveguide, a resonant cavity, or the like.

Figure 37:
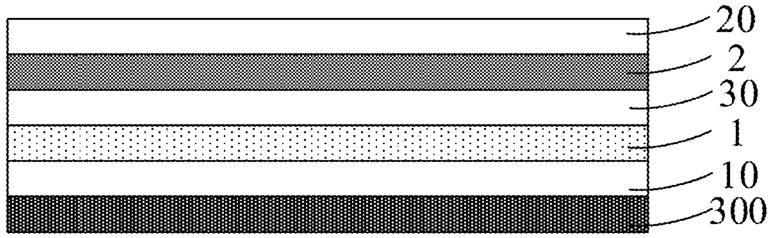
FIG. 37 is a schematic diagram illustrating layers of an antenna according to an embodiment of the present disclosure.
Figure 38:
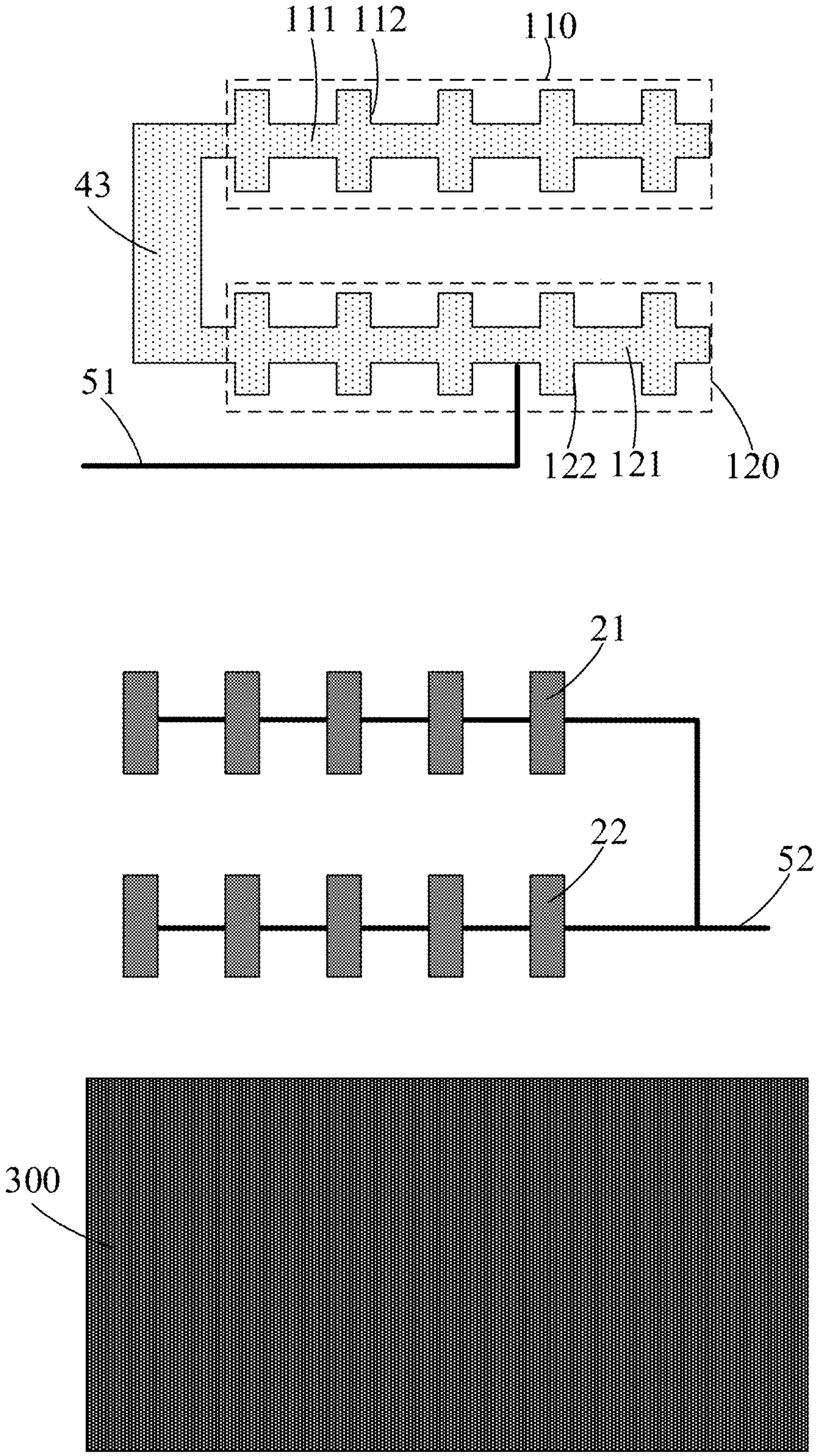
FIG. 38 is a schematic diagram illustrating main layers of the antenna shown in FIG. 37.

In a fourth aspect, FIG. 37 is a schematic diagram illustrating layers of an antenna according to an embodiment of the present disclosure. FIG. 38 is a schematic diagram illustrating main layers of the antenna shown in FIG. 37. As shown in FIGS. 37 and 38, an embodiment of the present disclosure provides an antenna, which is a reflecting antenna, including a phase shifter, a reflective electrode layer 300. The phase shifter includes the first dielectric substrate 10 and the second dielectric substrate 20 opposite to each other, the connection electrode 43, and the first phase shifting structure 11 and the second phase shifting structure 12 between the first dielectric substrate 10 and the second dielectric substrate 20. The reference electrode layer 100 is disposed on the side of the first dielectric substrate 10 away from the second dielectric substrate 20. The first phase shifting structure 11 and the second phase shifting structure 12 each have the first end and the second end: the first end of the first phase shifting structure 11 and the first end of the second phase shifting structure 12 are electrically connected to each other through the connection electrode 43, the second end of the first phase shifting structure and the second end of the second phase shifting structure 12 are suspended and are coupled to the reflective electrode layer 300 to form a ring circuit structure. The first phase shifting structure 11 and the second phase shifting structure 12 have opposite transmission directions for microwave signals.

In the embodiment of the present disclosure, the first end of the first phase shifting structure 11 and the first end of the second phase shifting structure 12 of the phase shifter are electrically connected to each other through the connection electrode 43, the second end of the first phase shifting structure 11 and the second end of the second phase shifting structure 12 are suspended and are coupled to the reflective electrode layer 300, to form the ring circuit structure, so that the mutual coupling between antennas can be effectively avoided when the antenna is used for forming the antenna array. Meanwhile, the first end of the first phase shifting structure 11 and the first end of the second phase shifting structure 12 of the phase shifter are electrically connected to each other through the connection electrode 43, the connection electrode 43 may also be used as the feed structure 200 and/or the radiation electrode 83, so that the structure of the antenna is more compact, which is beneficial to realizing a miniaturization of the antenna.

The first phase shifting structure 11 and the second phase shifting structure 12 in the embodiment of the present disclosure may both adopt the same structure in the phase shifter, and therefore, the description thereof is not repeated herein. In the embodiment of the present disclosure, as an example, only the first phase shifting structure 11 includes one first phase shifting unit, and the second phase shifting structure 12 includes only one second phase shifting structure 12. The first phase shifting unit includes the first transmission line 110 arranged on the side of the first dielectric substrate 10 close to the second dielectric substrate 20, the plurality of first patch electrodes 21 arranged on the side of the second dielectric substrate 20 close to the first dielectric substrate 10, and the first tunable dielectric layer 31 arranged between the layer where the first transmission line 110 is located and the layer where the first patch electrodes 21 are located: the second phase shifting unit includes the second transmission line 120 disposed on the side of the first dielectric substrate 10 close to the second dielectric substrate 20, the plurality of second patch electrodes 22 disposed on the side of the second dielectric substrate 20 close to the first dielectric substrate 10, and the second tunable dielectric layer 32 disposed between the layer where the second transmission line 120 is located and the layer where the second patch electrodes 22 are located. Specifically, the first transmission line 110 includes the first main line 111 and the plurality of first branches 112. The second transmission line 120 includes the second main line 121 and the plurality of second branches 122. The first main line 111 has the first end and the second end disposed oppositely in the extending direction of the first main line 111. The second main line 121 has the first end and the second end disposed oppositely in the extending direction of the second main line 121. The first end and the second end of the first main line 111 serve as the first end and the second end of the first transmission line 110, respectively: the first end and the second end of the second main line 121 serve as the first end and the second end of the second transmission line 120, respectively. The first main line 111 in the first transmission line 110 is provided with first branches 112 on both sides of the extending direction of the first main line 111 and in one-to-one correspondence with each other: orthographic projections of the first branches 112 corresponding to each other on the first dielectric substrate 10 at least partially overlap with an orthographic projection of the same first patch electrode 21 on the first dielectric substrate 10. Similarly, the second main line 121 in the second transmission line 120 is provided with second branches 122 on both sides of the extending direction of the second main line 121 and in one-to-one correspondence with each other: orthographic projections of the second branches 122 corresponding to each other on the first dielectric substrate 10 at least partially overlap with an orthographic projection of the same second patch electrode 22 on the first dielectric substrate 10.

The antenna in the embodiment of the present disclosure is described below with reference to specific examples. In the following examples, as an example, a structure of the phase shifter adopts only the phase shifter shown in FIG. 1. However, it should be understood that any of the above phase shifters may be applied to the antenna according to the embodiment of the present disclosure, which is not listed here.

Figure 39:
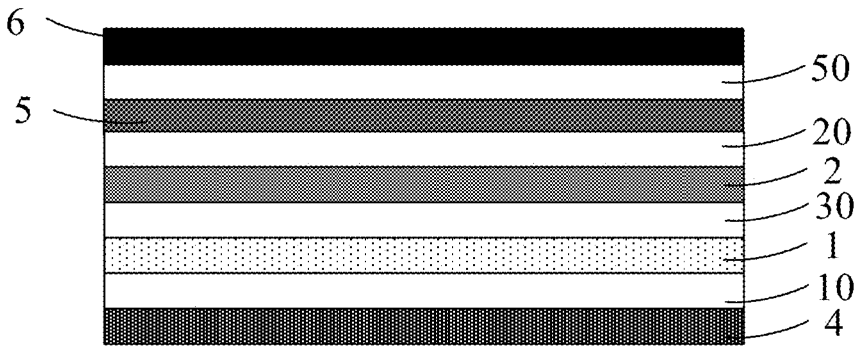
FIG. 39 is a schematic diagram illustrating layers of an antenna according to an embodiment of the present disclosure.
Figure 40:
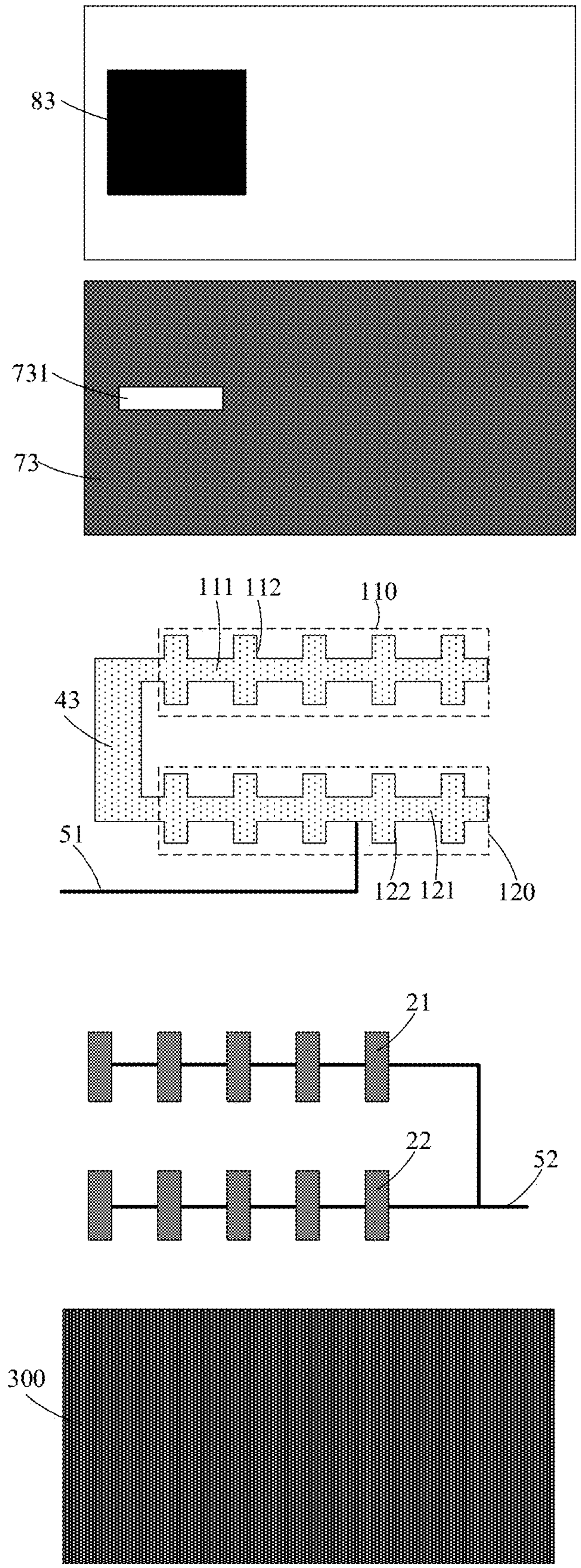
FIG. 40 is a schematic diagram illustrating main layers of the antenna shown in FIG. 39.

In a first example: FIG. 39 is another schematic diagram illustrating layers of an antenna according to an embodiment of the present disclosure. FIG. 40 is a schematic diagram illustrating main layers of the antenna shown in FIG. 39. As shown in FIGS. 39 and 40, the antenna is a transmission antenna including a phase shifter, a fifth dielectric substrate, a coupling layer 73, a radiation electrode 83, and a reference electrode layer 100. The fifth dielectric substrate is arranged on the side of the second dielectric substrate 20 away from the first dielectric substrate 10, the coupling layer 73 is arranged on a side of the fifth dielectric substrate close to the second dielectric substrate 20, and the radiation electrode 83 is arranged on a side of the fifth dielectric substrate away from the second dielectric substrate 20: the coupling layer 73 has an opening 731 therein; orthographic projections of any two of the opening, the connection electrode 43, and the radiation electrode 83 on the first dielectric substrate 10 at least partially overlap with each other.

Specifically, as shown in FIG. 39, the antenna includes the first dielectric substrate 10, the second dielectric substrate 20, the fifth dielectric substrate, the first conductive layer 1, the second conductive layer 2, the fourth conductive layer 4, the fifth conductive layer 5, and the sixth conductive layer 6. The first conductive layer 1 includes the first transmission line 110, the second transmission line 120, and the connection electrode 43 of the phase shifter: the second conductive layer 2 includes the first patch electrodes 21 and the second patch electrodes 22 of the phase shifter: the fourth conductive layer 4 includes the reference electrode layer 100; the fifth conductive layer 5 includes the coupling layer 73: the sixth conductive layer 6 includes the radiation electrode 83.

In some examples, the radiation electrode 83 may be a patch electrode having any shape, and may also be a pixel surface, a vibrator, a conductor surface with a slit under radiation, or the like.

Figure 41:
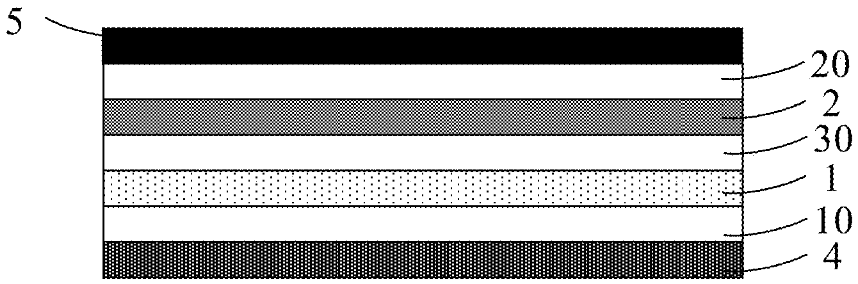
FIG. 41 is a schematic diagram illustrating layers of an antenna according to an embodiment of the present disclosure.
Figure 42:
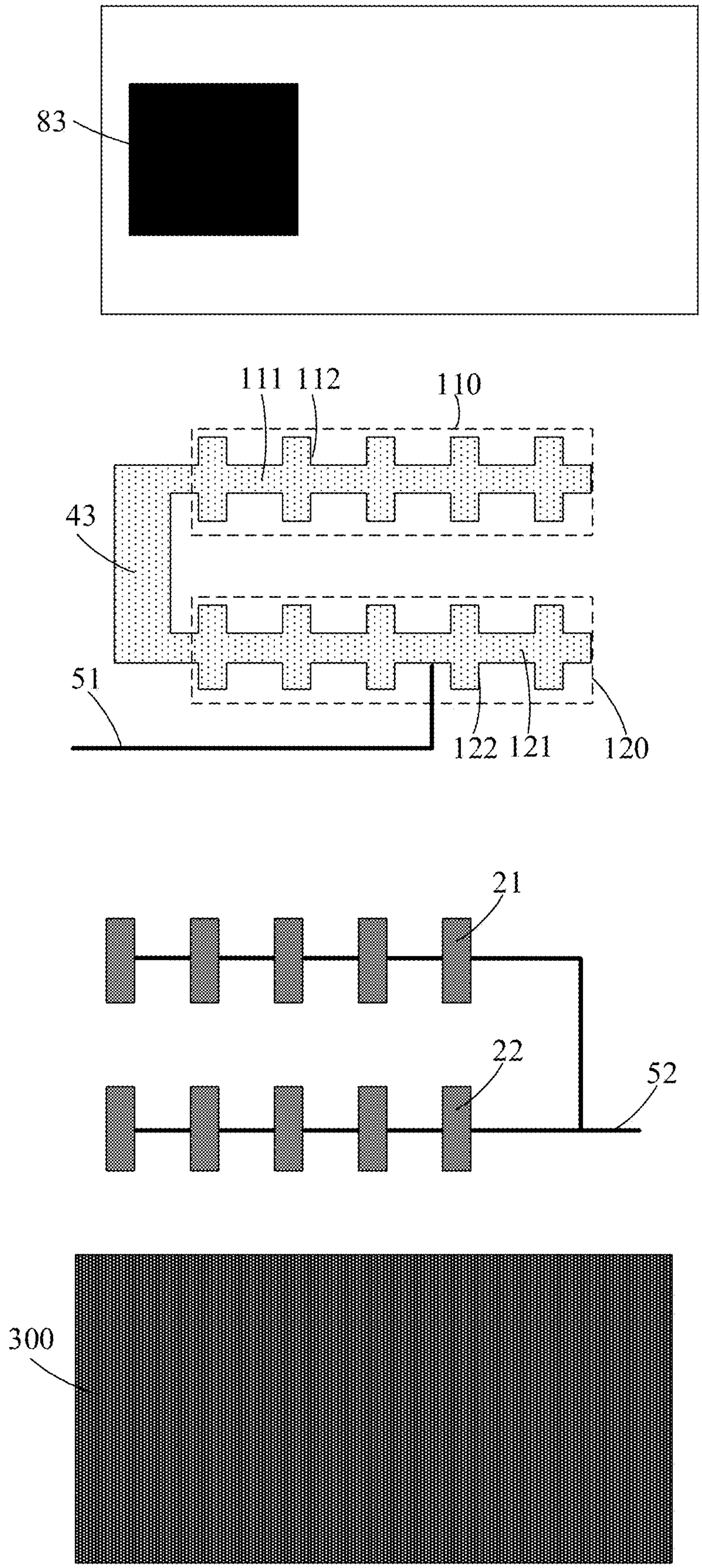
FIG. 42 is a schematic diagram illustrating main layers of the antenna shown in FIG. 41.

In a second example: FIG. 41 is another schematic diagram illustrating layers of an antenna according to an embodiment of the present disclosure. FIG. 42 is a schematic diagram illustrating main layers of the antenna shown in FIG. 41. As shown in FIGS. 41 and 42, the second example differs from the first example only in that the coupling layer 73 may not be provided in the antenna in the second example. The radiation electrode 83 of the antenna is arranged on the side of the second dielectric substrate 20 away from the first dielectric substrate 10. An orthographic projection of the radiation electrode 83 on the first dielectric substrate 10 at least partially overlaps with an orthographic projection of the connection electrode 43 in the phase shifter on the first dielectric substrate 10. That is, the connection electrode 43 in the phase shifter is directly coupled to the radiation electrode 83.

Figure 43:
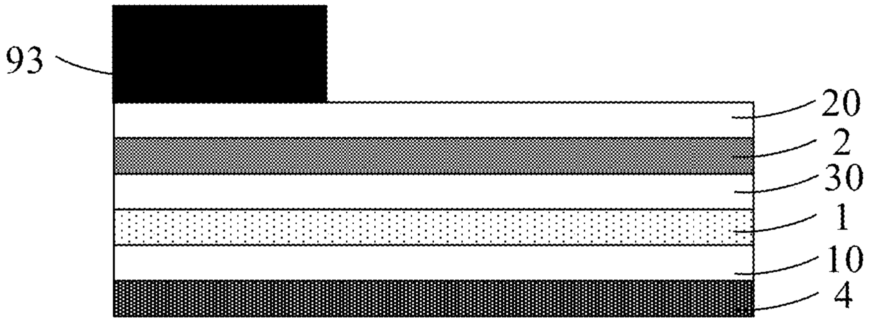
FIG. 43 is a schematic diagram illustrating layers of an antenna according to an embodiment of the present disclosure.
Figure 44:
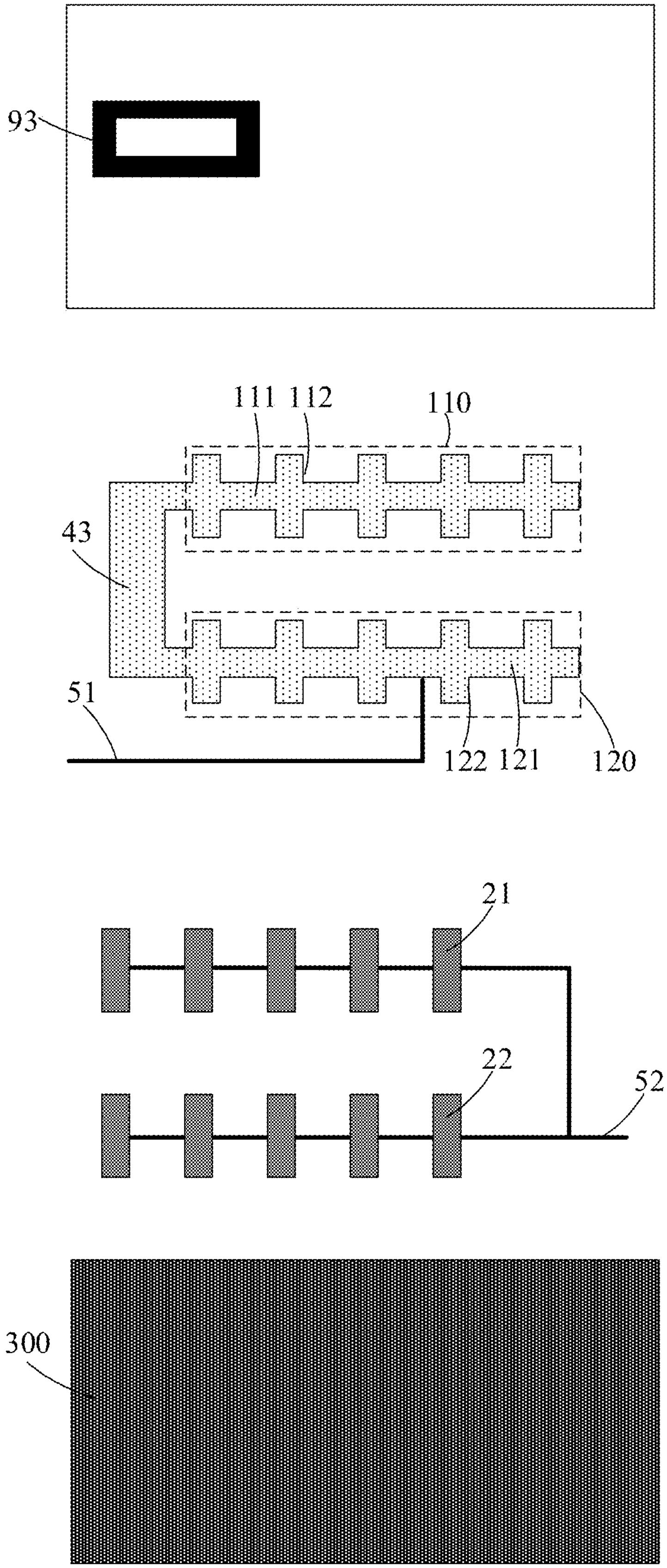
FIG. 44 is a schematic diagram illustrating main layers of the antenna shown in FIG. 43.

In a third example: FIG. 43 is another schematic diagram illustrating layers of an antenna according to an embodiment of the present disclosure. FIG. 44 is a schematic diagram illustrating main layers of the antenna shown in FIG. 43. As shown in FIGS. 43 and 44, the structure in the third example is substantially the same as that in the second example, except that the radiation electrode 83 in the second example is replaced with a waveguide structure 93 in the antenna in the third example. That is, the waveguide structure 93 is disposed on the side of the second dielectric substrate 20 away from the first dielectric substrate 10, an orthographic projection of a waveguide port of the waveguide structure 93 on the first dielectric substrate 10 at least partially overlaps with an orthographic projection of the connection electrode 43 on the first dielectric substrate 10.

In some examples, the waveguide structure 93 may employ a metal waveguide, a substrate integrated waveguide, a resonant cavity, or the like.

Figure 45:
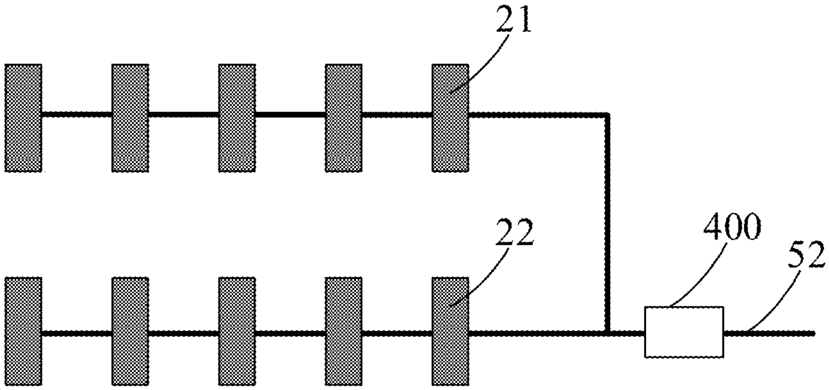
FIG. 45 is a schematic diagram illustrating components on a second dielectric substrate according to an embodiment of the present disclosure.
Figure 46:
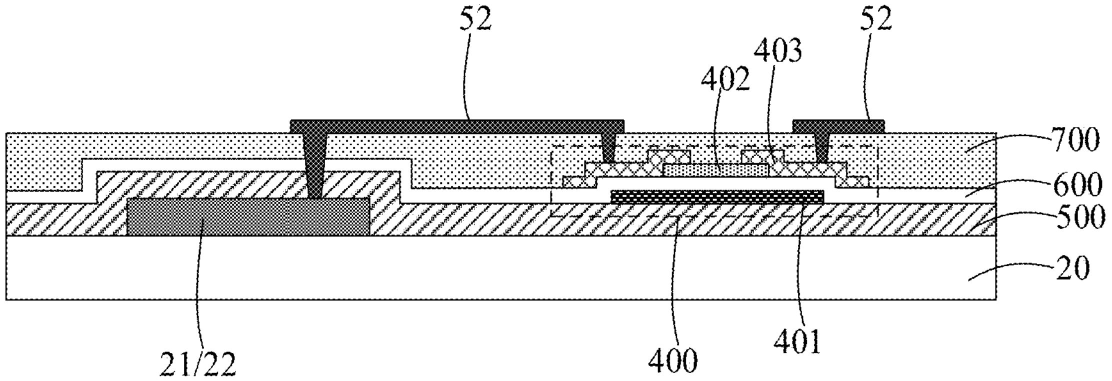
FIG. 46 is a cross-sectional view of components on a second dielectric substrate according to an embodiment of the present disclosure.

In addition, FIG. 45 is a schematic diagram of components on a second dielectric substrate according to an embodiment of the present disclosure. FIG. 46 is a cross-sectional view of components on a second dielectric substrate according to an embodiment of the present disclosure. Referring to FIGS. 45 and 46, in the phase shifter and the antenna according to any of the above examples of the present disclosure, the first patch electrodes 21 in the first phase shifting unit and the second patch electrodes 22 in the second phase shifting unit may be both provided with the second bias voltage through the same second driving line 52 provided with a switch unit 400. Whether the second bias voltage on the second driving line 52 may be written into the first patch electrodes 21 and the second patch electrodes 22 is controlled by controlling on/off of the switch unit 400. The switch unit 400 includes, but is not limited to, a thin film transistor. In FIG. 46, in the embodiment of the present disclosure, as an example, the switch unit 400 is the thin film transistor, and the thin film transistor is a bottom gate thin film transistor.

Referring to FIG. 46, the first patch electrodes 21 and the second patch electrodes 22 are disposed on the second dielectric substrate 20, a first insulating layer 500 is disposed on a side of the first patch electrodes 21 and the second patch electrodes 22 away from the second dielectric substrate 20, and a gate electrode 401, a gate insulating layer 600, an active layer 402, a source electrode 403/drain electrode 404 of the thin film transistor, a passivation layer 700, and a second driving line 52 are sequentially disposed on a side of the first insulating layer 500 away from the second dielectric substrate 10. The second driving line 52 is electrically connected to the first/second patch electrodes 21/22 through a first via extending through the first insulating layer 500, the gate insulating layer 600 and the passivation layer 700, and is electrically connected to the drain electrode 403 of the thin film transistor through a second via extending through the passivation layer 700.

In FIG. 46, the first patch electrodes 21 and the second patch electrodes 22 are closer to the second dielectric substrate 10 than the thin film transistor. Such the arrangement is due to the fact that the first patch electrodes 21 and the second patch electrodes 22 are usually made of a metal material with a larger thickness, and thus, the first patch electrodes 21 and the second patch electrodes 22 may be formed through a process, including, but not limited to, electroplating. In order to prevent the electroplating solution from damaging components on the second dielectric substrate 20, the first patch electrodes 21 and the second patch electrodes 22 are formed firstly. However, according to the product requirements, if the requirement for the thicknesses of the first patch electrodes 21 and the second patch electrodes 22 is not high, it is also possible to form the first patch electrodes 21 and the second patch electrodes 22 and metal electrodes of the thin film transistor in a one-step process, or form the first patch electrodes 21 and the second patch electrodes 22 after forming the layers of the thin film transistor.

In a fifth aspect, an embodiment of the present disclosure provides an electronic device, which includes the antenna array in any one of the embodiments.

The electronic device provided by the embodiment of the present disclosure further includes a transceiver unit, a radio frequency transceiver, a signal amplifier, a power amplifier, and a filtering unit. The antenna in the electronic device may be used as a transmitting antenna or a receiving antenna. The transceiver unit may include a baseband and a receiving terminal, where the baseband provides a signal in at least one frequency band, such as 2G signal, 3G signal, 4G signal, 5G signal, or the like; and transmits the signal in the at least one frequency band to the radio frequency transceiver. After the signal is received by an antenna in an antenna system and is processed by the filtering unit, the power amplifier, the signal amplifier, and the radio frequency transceiver, the antenna may transmit the signal to the receiving terminal (such as an intelligent gateway or the like) in the transceiver unit.

Further, the radio frequency transceiver is connected to the transceiver unit and is configured to modulate the signals transmitted by the transceiver unit or demodulate the signals received by the antenna and then transmit the signals to the transceiver unit. Specifically, the radio frequency transceiver may include a transmitting circuit, a receiving circuit, a modulating circuit, and a demodulating circuit. After the transmitting circuit receives multiple types of signals provided by the baseband, the modulating circuit may modulate the multiple types of signals provided by the baseband, and then transmit the modulated signals to the antenna. The signals received by the antenna are transmitted to the receiving circuit of the radio frequency transceiver, and transmitted by the receiving circuit to the demodulating circuit, and demodulated by the demodulating circuit and then transmitted to the receiving terminal.

Further, the radio frequency transceiver is connected to the signal amplifier and the power amplifier, which are in turn connected to the filtering unit connected to at least one antenna. In the process of transmitting signals by the antenna system, the signal amplifier is used for improving a signal-to-noise ratio of the signals output by the radio frequency transceiver and then transmitting the signals to the filtering unit: the power amplifier is used for amplifying the power of the signals output by the radio frequency transceiver and then transmitting the signals to the filtering unit: the filtering unit specifically includes a duplexer and a filtering circuit, the filtering unit combines signals output by the signal amplifier and the power amplifier and filters noise waves and then transmits the signals to the antenna, and the antenna radiates the signals. In the process of receiving signals by the antenna system, the signals received by the antenna are transmitted to the filtering unit, which filters noise waves in the signals received by the antenna and then transmits the signals to the signal amplifier and the power amplifier, and the signal amplifier gains the signals received by the antenna to increase the signal-to-noise ratio of the signals; the power amplifier amplifies the power of the signals received by the antenna. The signals received by the antenna are processed by the power amplifier and the signal amplifier and then transmitted to the radio frequency transceiver, and the radio frequency transceiver transmits the signals to the transceiver unit.

In some examples, the signal amplifier may include various types of signal amplifiers, such as a low noise amplifier, without limitation.

In some examples, the electronic device provided by the embodiments of the present disclosure further includes a power management unit connected to the power amplifier to provide the power amplifier with a voltage for amplifying the signal.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A radio frequency apparatus, comprising a first dielectric substrate and a second dielectric substrate opposite to each other, a first phase shifting structure and a second phase shifting structure between the first dielectric substrate and the second dielectric substrate; wherein the radio frequency apparatus further comprises a first connection electrode and a second connection electrode; the first phase shifting structure and the second phase shifting structure each have a first end and a second end, the first end of the first phase shifting structure and the first end of the second phase shifting structure are electrically connected to each other by the first connection electrode; the second end of the first phase shifting structure and the second end of the second phase shifting structure are electrically connected to each other by the second connection electrode, to form a ring circuit structure;

wherein the first phase shifting structure comprises at least one first phase shifting unit; the second phase shifting structure comprises at least one second phase shifting unit;

the at least one first phase shifting unit comprises a first transmission line, a plurality of first patch electrodes at intervals, and a first tunable dielectric layer; the first transmission line is on a side of the first dielectric substrate close to the second dielectric substrate, the plurality of first patch electrodes are on a side of the second dielectric substrate close to the first dielectric substrate, and the first tunable dielectric layer is between a layer where the first transmission line is located and a layer where the plurality of first patch electrodes are located, and an orthographic projection of each of the plurality of first patch electrodes on the first dielectric substrate at least partially overlaps with an orthographic projection of the first transmission line on the first dielectric substrate;

the at least one second phase shifting unit comprises a second transmission line, a plurality of second patch electrodes at intervals, and a second tunable dielectric layer; the second transmission line is on a side of the first dielectric substrate close to the second dielectric substrate, the plurality of second patch electrodes are on a side of the second dielectric substrate close to the first dielectric substrate, and the second tunable dielectric layer is between a layer where the second transmission line is located and a layer where the plurality of second patch electrodes are located, and an orthographic projection of each of the plurality of second patch electrodes on the first dielectric substrate at least partially overlaps with an orthographic projection of the second transmission line on the first dielectric substrate; and the first transmission line has a first end and a second end opposite to each other in an extending direction of the first transmission line; the second transmission line has a first end and a second end opposite to each other in an extending direction of the second transmission line; the first ends of the first transmission line and the second transmission line are electrically connected to each other by the first connection electrode; the second ends of the first transmission line and the second transmission line are electrically connected to each other by the second connection electrode.

2. The radio frequency apparatus according to claim 1, further comprising a first conductive layer on a side of the first dielectric substrate close to the second dielectric substrate, and a second conductive layer on a side of the second dielectric substrate close to the first dielectric substrate; wherein the first transmission line, the second transmission line, the first connection electrode and the second connection electrode are all in the first conductive layer; and the plurality of first patch electrodes and the plurality of second patch electrodes are in the second conductive layer.

3. The radio frequency apparatus according to claim 1, further comprising a first conductive layer on a side of the first dielectric substrate close to the second dielectric substrate, a second conductive layer on a side of the second dielectric substrate close to the first dielectric substrate, and a third conductive layer on a side of the first dielectric substrate away from the second dielectric substrate; wherein the first transmission line and the second transmission line are in the first conductive layer;

the plurality of first patch electrodes and the plurality of second patch electrodes are in the second conductive layer; and the first connection electrode and the second connection electrode are in the third conductive layer, and the first connection electrode is electrically connected to the first end of the first transmission line and the first end of the second transmission line through a first connection via extending through the first dielectric substrate; the second connection electrode is electrically connected to the second end of the first transmission line and the second end of the second transmission line through a second connection via extending through the first dielectric substrate.

4. The radio frequency apparatus according to claim 1, wherein the first transmission line comprises a first main line and a plurality of first branches, and the plurality of first branches are connected to at least one side of an extending direction of the first main line; at least some of the plurality of first branches and the first patch electrodes are in a one-to-one correspondence with each other, and orthographic projections of the first branches and the first patch electrodes corresponding to each other on the first dielectric substrate at least partially overlap with each other; and the second transmission line comprises a second main line and a plurality of second branches, and the plurality of second branches are connected to at least one side of an extending direction of the second main line; at least some of the plurality of second branches and the second patch electrodes are in a one-to-one correspondence with each other, and orthographic projections of the second branches and the second patch electrodes corresponding to each other on the first dielectric substrate at least partially overlap with each other.

5. The radio frequency apparatus according to claim 4, wherein the plurality of first branches are connected to both sides of the extending direction of the first main line and are in one-to-one correspondence with each other; orthographic projections of the first branches corresponding to each other on the first dielectric substrate at least partially overlap with an orthographic projection of a same first patch electrode on the first dielectric substrate; and the plurality of second branches are connected to both sides of the extending direction of the second main line and are in one-to-one correspondence with each other; orthographic projections of the second branches corresponding to each other on the first dielectric substrate at least partially overlap with an orthographic projection of a same second patch electrode on the first dielectric substrate.

6. The radio frequency apparatus according to claim 4, wherein the plurality of first branches are connected to both sides of the extending direction of the first main line, connection nodes between the plurality of first branches and the first main line are staggered, and at least some first branches have different shapes; and the plurality of second branches are connected to both sides of the extending direction of the second main line, connection nodes between the plurality of second branches and the second main line are staggered, and at least some second branches have different shapes.

7. The radio frequency apparatus according to claim 6, wherein some of the plurality of first branches are in a one-to-one correspondence with the plurality of first patch electrodes, and orthographic projections of the first branch and the first patch electrode corresponding to each other on the first dielectric substrate at least partially overlap with each other; and/or some of the plurality of second branches are in a one-to-one correspondence with the plurality of second patch electrodes, and orthographic projections of the second branch and the second patch electrode corresponding to each other on the second dielectric substrate at least partially overlap with each other.

8. The radio frequency apparatus according to claim 1, wherein the plurality of first patch electrodes are in a one-to-one correspondence with the plurality of second patch electrodes, and the first patch electrode and the second patch electrode corresponding to each other are connected together to have a one-piece structure.

9. The radio frequency apparatus according to claim 1, wherein the at least one first phase shifting unit comprises a plurality of first phase shifting units and the at least one second phase shifting unit comprises a plurality of second phase shifting units; a first combiner, a second combiner, a third combiner and a fourth combiner; wherein the first combiner comprises a first main path and a plurality of first branch paths electrically connected to the first main path; the second combiner comprises a second main path and a plurality of second branch paths electrically connected to the second main path; the third combiner comprises a third main path and a plurality of third branch paths electrically connected to the third main path; the fourth combiner comprises a fourth main path and a plurality of fourth branch paths electrically connected to the fourth main path; the first ends of the first transmission lines in the plurality of first phase shifting units are connected to the first branch paths of the first combiner in a one-to-one correspondence; the second ends of the first transmission lines in the plurality of first phase shifting units are connected to the second branch paths of the second combiner in a one-to-one correspondence; the first ends of the second transmission lines in the plurality of second phase shifting units are connected to the third branch paths of the third combiner in a one-to-one correspondence; the second ends of the second transmission lines in the plurality of second phase shifting units are connected to the fourth branch paths of the fourth combiner in a one-to-one correspondence; and the first main path of the first combiner and the third main path of the third combiner are electrically connected to each other by the first connection electrode; and the second main path of the second combiner and the fourth main path of the fourth combiner are electrically connected to each other by the second connection electrode.

10. A radio frequency apparatus, comprising a first dielectric substrate and a second dielectric substrate opposite to each other, a first phase shifting structure and a second phase shifting structure between the first dielectric substrate and the second dielectric substrate; wherein the radio frequency apparatus further comprises a first connection electrode and a second connection electrode; the first phase shifting structure and the second phase shifting structure each have a first end and a second end, the first end of the first phase shifting structure and the first end of the second phase shifting structure are electrically connected to each other by the first connection electrode; the second end of the first phase shifting structure and the second end of the second phase shifting structure are electrically connected to each other by the second connection electrode, to form a ring circuit structure, wherein the first phase shifting structure comprises at least one first phase shifting unit; the second phase shifting structure comprises at least one second phase shifting unit;

the at least one first phase shifting unit comprises a first transmission line, a third transmission line and a first tunable dielectric layer; the first transmission line is on a side of the first dielectric substrate close to the second dielectric substrate, and the third transmission line is on a side of the second dielectric substrate close to the first dielectric substrate; the first tunable dielectric layer is between a layer where the first transmission line is located and a layer where the third transmission line is located, and orthographic projections of the first transmission line and the third transmission line on the first dielectric substrate at least partially overlap with each other;

the at least one second phase shifting unit comprises a second transmission line, a fourth transmission line and a second tunable dielectric layer; the second transmission line is on a side of the first dielectric substrate close to the second dielectric substrate, and the fourth transmission line is on a side of the second dielectric substrate close to the first dielectric substrate; the second tunable dielectric layer is between a layer where the second transmission line is located and a layer where the fourth transmission line is located, and orthographic projections of the second transmission line and the fourth transmission line on the first dielectric substrate at least partially overlap with each other; and the first transmission line, the second transmission line, the third transmission line and the fourth transmission line each have a first end and a second end opposite to each other in the respective extending directions; the first end of the first transmission line and the first end of the second transmission line are electrically connected to each other through the first connection electrode; the second end of the third transmission line and the second end of the fourth transmission line are electrically connected to each other through the second connection electrode.

11. The radio frequency apparatus according to claim 10, further comprising a first conductive layer on a side of the first dielectric substrate close to the second dielectric substrate, and a second conductive layer on a side of the second dielectric substrate close to the first dielectric substrate; wherein the first transmission line, the second transmission line and the first connection electrode are all in the first conductive layer; and the third transmission line, the fourth transmission line and the second connection electrode are all in the second conductive layer.

12. The radio frequency apparatus according to claim 10, wherein the first transmission line comprises a first main line and a plurality of first branches, and the plurality of first branches are connected to at least one side of an extending direction of the first main line; the second transmission line comprises a second main line and a plurality of second branches, and the plurality of second branches are connected to at least one side of an extending direction of the second main line; the third transmission line comprises a third main line and a plurality of third branches, and the plurality of third branches are connected to at least one side of an extending direction of the third main line; the fourth transmission line comprises a fourth main line and a plurality of fourth branches, and the plurality of fourth branches are connected to at least one side of an extending direction of the fourth main line; and orthographic projections of one first branch and one third branch on the first dielectric substrate at least partially overlap with each other; orthographic projections of one second branch and one fourth branch on the first dielectric substrate at least partially overlap with each other.

13. The radio frequency apparatus according to claim 12, wherein the plurality of first branches are in a one-to-one correspondence with the plurality of third branches, and the plurality of second branches are in a one-to-one correspondence with the plurality of fourth branches.

14. A radio frequency apparatus, comprising a first dielectric substrate and a second dielectric substrate opposite to each other, a first phase shifting structure and a second phase shifting structure between the first dielectric substrate and the second dielectric substrate; wherein the radio frequency apparatus further comprises a first connection electrode and a second connection electrode; the first phase shifting structure and the second phase shifting structure each have a first end and a second end, the first end of the first phase shifting structure and the first end of the second phase shifting structure are electrically connected to each other by the first connection electrode; the second end of the first phase shifting structure and the second end of the second phase shifting structure are electrically connected to each other by the second connection electrode, to form a ring circuit structure, wherein the first phase shifting structure comprises at least one first phase shifting unit; the second phase shifting structure comprises at least one second phase shifting unit;

the at least one first phase shifting unit comprises a fifth main line, a plurality of fifth branches, a plurality of third patch electrodes, and a first tunable dielectric layer; the plurality of fifth branches are connected to one side of an extending direction of the fifth main line; the fifth main line, the plurality of fifth branches, and the plurality of third patch electrodes are all on a side of the first dielectric substrate close to the second dielectric substrate, and orthographic projections of the plurality of third patch electrodes and the plurality of fifth branches on the first dielectric substrate are alternately arranged; the first tunable dielectric layer is between the first dielectric substrate and the second dielectric substrate;

the at least one second phase shifting unit comprises a sixth main line, a plurality of sixth branches, a plurality of fourth patch electrodes, and a first tunable dielectric layer; the plurality of sixth branches are connected to one side of an extending direction of the sixth main line; the sixth main line, the plurality of sixth branches and the plurality of fourth patch electrodes are all on the side of the first dielectric substrate close to the second dielectric substrate, and orthographic projections of the plurality of fourth patch electrodes and the plurality of sixth branches on the first dielectric substrate are alternately arranged; the second tunable dielectric layer is between the first dielectric substrate and the second dielectric substrate; and the fifth main line has a first end and a second end opposite to each other in an extending direction of the fifth main line; and the sixth main line has a first end and a second end opposite to each other in an extending direction of the sixth main line; the first end of the fifth main line and the first end of the sixth main line are electrically connected to each other by the first connection electrode; the second end of the fifth main line and the second end of the sixth main line are electrically connected to each other by the second connection electrode.

15. The radio frequency apparatus according to claim 14, further comprising a first conductive layer on a side of the first dielectric substrate close to the second dielectric substrate; wherein the first connection electrode, the second connection electrode, the fifth main line, the plurality of fifth branches, the plurality of third patch electrodes, the sixth main line, the plurality of sixth branches and the plurality of fourth patch electrodes are in the first conductive layer.

16. The radio frequency apparatus according to claim 14, wherein the first connection electrode and the second connection electrode each have a width greater than a width of the fifth main line.

17. The radio frequency apparatus according to claim 14, wherein the at least one first phase shifting unit further comprises a plurality of fifth patch electrodes on a side of the second dielectric substrate close to the first dielectric substrate; orthographic projections of a fifth patch electrode and a fifth branch corresponding to each other on the first dielectric substrate at least partially overlap with each other; and the at least one second phase shifting unit further comprises a plurality of sixth patch electrodes on a side of the second dielectric substrate close to the first dielectric substrate; orthographic projections of a sixth patch electrode and a sixth branch corresponding to each other on the first dielectric substrate at least partially overlap with each other.

18. An antenna, comprising the radio frequency apparatus according to claim 1.

19. An electronic device, comprising the antenna according to claim 18.

* * * * *